(12) United States Patent
Tucker

(10) Patent No.: US 8,109,293 B2
(45) Date of Patent: Feb. 7, 2012

(54) VALVE CARTRIDGE WITH ISOLATED FRICTION AND CARTRIDGE LOADS

(75) Inventor: W. Randall Tucker, Oberlin, OH (US)

(73) Assignee: Moen Incorporated, North Olmsted, OH (US)

( * ) Notice: Subject to any disclaimer, the term of this patent is extended or adjusted under 35 U.S.C. 154(b) by 1011 days.

(21) Appl. No.: 12/023,729

(22) Filed: Jan. 31, 2008

(65) Prior Publication Data

US 2009/0032128 A1 Feb. 5, 2009

Related U.S. Application Data

(60) Provisional application No. 60/898,580, filed on Jan. 31, 2007.

(51) Int. Cl.
*F16K 11/06* (2006.01)
(52) U.S. Cl. ................... 137/625.4; 251/235
(58) Field of Classification Search ............. 137/625.17, 137/625.4; 251/231, 235
See application file for complete search history.

(56) References Cited

U.S. PATENT DOCUMENTS

| | | | |
|---|---|---|---|
| 2,020,286 A * | 11/1935 | Bittle | 137/625.13 |
| 3,072,426 A | 1/1963 | Gilbert | |
| 3,661,180 A * | 5/1972 | Lyon | 137/625.17 |
| 3,680,592 A * | 8/1972 | Hayman | 137/625.4 |
| 3,693,660 A * | 9/1972 | Wheelock | 137/625.4 |
| 3,788,354 A * | 1/1974 | Symmons | 137/625.4 |
| 3,854,493 A | 12/1974 | Farrell | |
| 3,952,764 A | 4/1976 | Keller, III | |
| 4,130,136 A | 12/1978 | Garnier et al. | |
| 4,301,830 A | 11/1981 | Keller, III | |
| 4,314,673 A * | 2/1982 | Rudelick | 239/443 |
| 4,325,403 A | 4/1982 | Uhlmann | |
| 4,331,176 A | 5/1982 | Parkison | |
| 4,502,507 A * | 3/1985 | Hayman | 137/625.4 |
| 4,733,688 A | 3/1988 | Lorch | |
| 4,782,853 A | 11/1988 | Moen | |
| 4,887,642 A | 12/1989 | Bernat | |
| 4,903,943 A * | 2/1990 | Hochstrasser | 251/235 |
| 4,936,347 A | 6/1990 | Oracz et al. | |
| 4,957,135 A | 9/1990 | Knapp | |
| 4,969,483 A * | 11/1990 | Knapp | 137/218 |
| 5,082,023 A | 1/1992 | D'Alayer de Costemore D'Arc | |
| 5,375,624 A | 12/1994 | Knapp | |
| 5,535,943 A | 7/1996 | Kahle et al. | |
| 5,615,709 A | 4/1997 | Knapp | |
| 5,927,597 A | 7/1999 | Bolgar et al. | |
| 6,311,948 B1 | 11/2001 | Weaver | |
| 6,907,903 B1 | 6/2005 | Pochang | |
| 6,920,899 B2 | 7/2005 | Haenlein et al. | |
| 6,935,568 B2 | 8/2005 | Mace et al. | |
| 7,032,272 B2 | 4/2006 | Haenlein | |
| 2004/0231735 A1 | 11/2004 | Haenlein et al. | |
| 2006/0016491 A1 | 1/2006 | Rosko et al. | |

* cited by examiner

*Primary Examiner* — John Fox
(74) *Attorney, Agent, or Firm* — Calfee, Halter & Griswold LLP

(57) ABSTRACT

A one-handle valve cartridge includes a spring that isolates frictional forces between dynamic sealing elements in the valve cartridge and loads applied to the valve cartridge and transmitted to the dynamic sealing elements from an actuating mechanism of the valve cartridge.

14 Claims, 55 Drawing Sheets

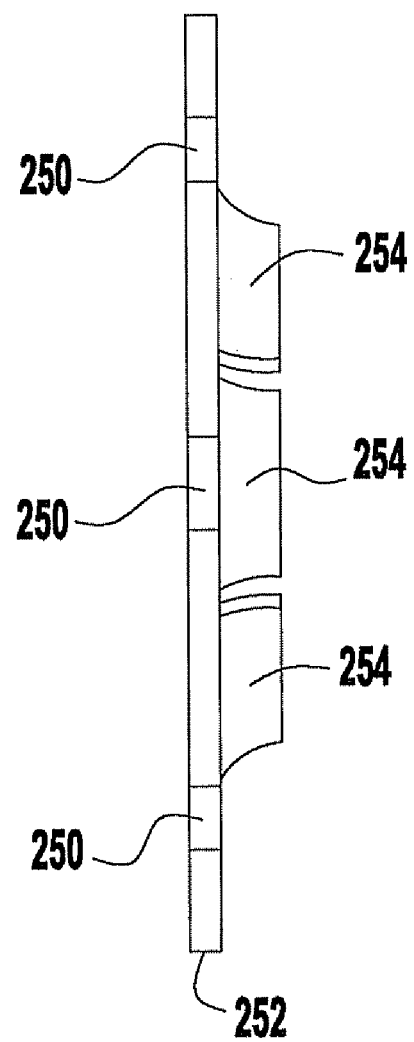

SECTION A-A

SECTION A-A

SECTION B-B

SECTION A-A

SECTION B-B

SECTION A-A

SECTION A-A

SECTION A-A

SECTION A-A

SECTION A-A

SECTION B-B

VALVE CARTRIDGE WITH ISOLATED FRICTION AND CARTRIDGE LOADS

RELATED APPLICATION

The present application is being filed as a non-provisional patent application claiming priority under 35 U.S.C. §119(e) from, and any other benefit of, U.S. Provisional Patent Application No. 60/898,580 filed on Jan. 31, 2007, the entire disclosure of which is herein incorporated by reference.

FIELD

The invention relates generally to valve cartridges and, more particularly, to a valve cartridge in which frictional forces between dynamic sealing elements in the valve cartridge and loads applied to the valve cartridge and transmitted to the dynamic sealing elements are isolated from an actuating mechanism of the valve cartridge.

BACKGROUND

Typically, for a plumbing fixture (e.g., a faucet, a tub spout, a shower head), a valve body conveys water flowing from a main water source to a desired destination (a sink, a tub, a basin). The valve body generally has two water inlet passages through which cold water and hot water from the main water source can respectively flow. The valve body also has a water outlet passage through which the cold water, the hot water or a mixture of the cold and hot water can be discharged to an outlet portion of the plumbing fixture (e.g., a spout). In a one-handle version of the valve body, the valve body has a cavity for receiving a valve cartridge which allows a user to control the flow rate and the temperature of the water flowing through the water inlet passages to the water outlet passage using a single valve actuating mechanism.

One type of valve cartridge is a structural assembly including a housing in which two or more disks, plates or the like are disposed. The disks are generally made of a hard material (e.g., ceramic or metal). At least one of the disks (i.e., a fixed disk) is fixed with respect to the housing. Another of the disks (i.e., a movable disk) is disposed above the fixed disk and is movable with respect to the fixed disk. The valve cartridge includes the actuating mechanism that is directly or indirectly connected at one end to the movable disk. Another end of the actuating mechanism extends through an opening in the housing for manipulation by a user. The end of the actuating mechanism extending through the opening in the housing can be connected to a handle, knob or the like to assist the user in operating the valve cartridge.

In a one-handle version of this type of valve cartridge for use in the one-handle version of the valve body, the fixed disk includes two inlet openings (i.e., a cold water inlet opening and a hot water inlet opening) that substantially align with the water inlet passages of the valve body when the valve cartridge is installed in the valve body. Furthermore, the fixed disk includes an outlet opening that substantially aligns with the water outlet passage of the valve body when the valve cartridge is installed in the valve body. The actuating mechanism is connected to the movable disk via a coupling. The actuating mechanism can be pivoted to cause translational movement of the movable disk. The actuating mechanism can be rotated to cause angular movement of the movable disk.

In this manner, the movable disk can assume different positions with respect to the fixed disk. In particular, pivoting of the actuating mechanism changes the flow rate of the water from zero to a maximum flow rate, whereas rotation of the coupling changes the temperature of the water. Accordingly, a one-handle actuating mechanism can control both the flow rate and the temperature of the water flowing through the valve cartridge.

The valve cartridge also includes one or more seals for preventing water from leaking out of the valve cartridge. The seals can be located, for example, below, between and/or above the disks in the valve cartridge. When the valve cartridge is installed in the valve body, a retention nut is used to secure the valve cartridge in the valve body. The retention nut engages the housing of the valve cartridge such that the seals in the valve cartridge are compressed and, thus, apply a loading force to the components (including the disks) in the valve cartridge. Accordingly the fixed disk and the movable disk are kept in water tight contact after installation of the valve cartridge in the valve body.

As one example, a conventional valve cartridge 100 is illustrated in FIGS. 1A-1C and also illustrated in U.S. Pat. No. 7,063,106. As shown in FIGS. 1A-1B, the conventional valve cartridge 100 has several discrete components including a housing 102, a lower seal 104, a bottom member 106, an upper seal 108, a fixed plate 110, a mobile plate 112, a carrier 114, a rotatable support member 116, an operating lever 118 and a cover 120. The housing 102 has a tubular shape for receiving the components of the valve cartridge 100.

The operating lever 118 is part of the actuating mechanism of the valve cartridge 100. The operating lever 118 is connected to the rotatable support member 116 via a pin 122. A lower surface of the rotatable support member 116 rests on an upper surface of the carrier 114. The rotatable support member 116 can rotate relative to the housing 102. A portion of the operating lever 118 extends below the rotatable support member 116 and into the housing 102 which facilitates connecting the operating lever 118 to the mobile plate 112 via the carrier 114, as described below. A portion of the operating lever 118 extends above the rotatable support member 116 and out of the housing 102 which facilitates connecting the operating lever 118 to an operating member (not shown), such as a handle, a knob or the like.

The housing 102 has an internal shoulder 124 formed near a lower opening of the housing 102, wherein the internal shoulder 124 is shaped to receive a correspondingly shaped portion of the bottom member 106. The cover 120 has teeth 126 that snap fit into openings 128 formed near an upper opening of the housing 102. Accordingly, the lower opening of the housing 102 is closed by the bottom member 106 and the upper opening of the housing 102 is closed by the cover 120, thereby securing the components in the valve cartridge 100.

The fixed plate 110 has a pair of water inlet passages 130 (only one of which is visible in FIGS. 1A-1C) and a water outlet passage 132. The fixed plate 110 is disposed above the bottom member 106. The mobile plate 112 is supported on top of the fixed plate 110 and can slide on top of the fixed plate 110. The mobile plate 112 includes a mixing chamber 134 for mixing cold and hot water flowing into the valve cartridge 100 through the respective water inlet passages 130 in the fixed plate 110. The mixed water then flows out of the valve cartridge 100 through the water outlet passage 132 in the fixed plate 110.

The carrier 114 and the rotatable support member 116 function to translate movement of the operating lever 118 into movement of the mobile plate 112. A lower portion of the carrier 114 engages an upper portion of the mobile plate 112. An upper portion of the carrier 114 has a recess 136 for receiving a lower end 138 of the operating lever 118, thereby connecting the operating lever 118 (which is connected to the rotatable support member 116 via the pin 122) to the carrier 114 and the mobile plate 112.

The lower seal 104 fits in a recess on a lower surface of the bottom member 106 and the upper seal 108 fits in a recess on an upper surface of the bottom member 106. The lower seal 104 forms a water tight seal between a valve body 140 in which the valve cartridge 100 is installed and the bottom member 106 (see FIG. 1C). The upper seal 108 forms a water tight seal between the bottom member 106 and the fixed plate 110 (see FIG. 1B). The lower seal 104 and the upper seal 108 prevent water from leaking out of the valve cartridge 100.

As shown in FIG. 1C, when the valve cartridge 100 is installed in the valve body 140 of the plumbing fixture 142 (e.g., a faucet), a retention nut 144 is used to secure the valve cartridge 100 in the valve body 140. The retention nut 144 engages the housing 102 of the valve cartridge 100 such that the seals 104 and 108 in the valve cartridge 100 are compressed and, thus, apply a loading force to the components (including the fixed plate 110 and the mobile plate 112) in the valve cartridge 100. Accordingly the fixed plate 110 and the mobile plate 112 are kept in water tight contact after installation of the valve cartridge 100 in the valve body 140.

The position and the orientation of the mobile plate 112 relative to the fixed plate 110 are controlled by the operating lever 118 projecting out of the housing 102. In particular, the operating lever 118 can be pivoted within the rotatable support member 116 about the pin 122 and can cause the rotatable support member 116 to rotate with the operating lever 118. The operating member (not shown) can be connected to the operating lever 118 to facilitate manipulation of the operating lever 118 by the user. Accordingly, after the valve cartridge 100 is installed in the valve body 140, the user can manipulate the operating member which moves the operating lever 118 to change the position and/or orientation of the mobile plate 112 relative to the fixed plate 110, thereby controlling the flow rate and/or the temperature of the water flowing through the valve cartridge 100 and out the plumbing fixture 142, such as through a spout 146 (see FIG. 1C).

Because the components in the valve cartridge 100 (e.g., the bottom member 106, the fixed plate 110, the mobile plate 112, the carrier 114 and the rotatable support member 116) are stacked on top of one another, the compression of the lower seal 104 and the upper seal 108 forces the components against one another when the retention nut 144 is tightened down on the housing 102. Because there is no isolation of the loading force within the valve cartridge 100, the loading force goes from the seals 104, 108 up to the plates (i.e., the fixed plate 110 and the mobile plate 112) and on through to the actuating mechanism including the carrier 114, the rotatable support member 116 and the operating lever 118. Consequently, the feel of the actuating mechanism by the user is affected by the magnitude of and variations in the loading force. For example, the more force that is applied to the valve cartridge 100, such as by tightening of the retention nut 144, the rougher the actuating mechanism feels during operation by the user.

Because the operating lever 118 is pivoted about the pin 122 relative to the rotatable support member 116 to control the flow rate of the water, and the rotatable support member 116 is itself moved relative to the housing 102 to control the temperature of the water, different frictional forces result from controlling the flow rate and the temperature of the water. Furthermore, because there is no isolation of the frictional forces within the valve cartridge 100, the frictional force between the plates (i.e., the fixed plate 110 and the mobile plate 112), which varies depending on the loading force applied by the retention nut 144, is transmitted up to the actuating mechanism such that the user may experience an inconsistent, imprecise and/or rough feel during operation of the valve cartridge 100.

Accordingly, there is a need in the art for a valve cartridge wherein the loading force on the actuating mechanism is isolated from the loading force applied to the valve cartridge.

Furthermore, there is a need in the art for a valve cartridge having a consistent actuating frictional force that is isolated from other frictional forces within the valve cartridge.

SUMMARY

In view of the above, it is an exemplary aspect to provide a valve cartridge wherein a loading force applied to an actuating mechanism of the valve cartridge is isolated from a loading force applied to the valve cartridge.

It is another exemplary aspect to provide a valve cartridge wherein the frictional forces associated with an actuating mechanism of the valve cartridge are isolated from other frictional forces in the valve cartridge, for example, the frictional force between the dynamic sealing elements in the valve cartridge.

It is still another exemplary aspect to provide a valve cartridge for a one-handle plumbing fixture, wherein the actuating mechanism of the valve cartridge has a consistent, precise and smooth feel during control of the flow rate and the temperature of the water flowing through the valve cartridge.

BRIEF DESCRIPTION OF THE DRAWINGS

The above aspects and additional aspects, features and advantages will become readily apparent by describing in detail exemplary embodiments thereof with reference to the attached drawings, wherein like reference numerals denote like elements, and:

FIG. 1A shows the valve cartridge in unassembled form, as a cross-section. FIG. 1B shows the valve cartridge of FIG. 1A in assembled form, as a cross-section. FIG. 1C shows the valve cartridge of FIG. 1B after installation in a plumbing fixture, as a cross-section.

FIGS. 5A-5C show an exemplary spring used in the exemplary valve cartridge of FIG. 2. FIG. 5A is a perspective view of the spring. FIG. 5B is a plan view of the spring. FIG. 5C is a side elevational view of the spring.

FIG. 6A is a perspective view of the bushing. FIG. 6B is a side elevational view of the bushing. FIG. 6C is a bottom view of the bushing. FIG. 6D is a cross-sectional view of the bushing of FIG. 6C, along line A-A.

FIG. 7A is a perspective view of the flow plate. FIG. 7B is a plan view of the flow plate. FIG. 7C is a cross-sectional view of the flow plate of FIG. 7B, along line A-A. FIG. 7D is a cross-sectional view of the flow plate of FIG. 7B, along line B-B.

FIG. 9A is a top perspective view of the base seal. FIG. 9B is a bottom perspective view of the base seal.

FIG. 10A is a plan view of the valve cartridge in assembled form. FIG. 10B is a cross-sectional view of the valve cartridge of FIG. 10A, along line A-A. FIG. 10C is a cross-sectional view of the valve cartridge of FIG. 10A, along line B-B.

FIG. 13A is a perspective view of the upper housing. FIG. 13B is a side elevational view of the upper housing. FIG. 13C is a cross-sectional view of the upper housing of FIG. 13B, along line A-A.

FIG. 15A is a perspective view of the spring. FIG. 15B is a plan view of the spring. FIG. 15C is a cross-sectional view of the spring of FIG. 15B, along line A-A.

FIG. 16A is a side elevational view of the bushing. FIG. 16B is a cross-sectional view of the bushing of FIG. 16A along line A-A. FIG. 16C is a plan view of the bushing.

FIG. 17A is a perspective view of the carrier. FIG. 17B is a plan view of the carrier. FIG. 17C is a bottom view of the carrier. FIG. 17D is a side elevational view of the carrier.

FIG. 18A is a plan view of the movable disk. FIG. 18B is a cross-sectional view of the movable disk of FIG. 18A, along line A-A. FIG. 18C is a bottom view of the movable disk.

FIG. 19A is a top perspective view of the fixed disk. FIG. 19B is a bottom perspective view of the fixed disk. FIG. 19C is a plan view of the fixed disk. FIG. 19D is a bottom view of the fixed disk.

FIG. 20A is a top perspective view of the base seal. FIG. 20B is a plan view of the base seal.

FIG. 21A is a top perspective view of the lower housing. FIG. 21B is a bottom perspective view of the lower housing. FIG. 21C is a plan view of the lower housing. FIG. 21D is a bottom view of the lower housing.

FIG. 22A is a plan view of the valve cartridge in assembled form. FIG. 22B is a cross-sectional view of the valve cartridge of FIG. 22A, along line A-A. FIG. 22C is a cross-sectional view of the valve cartridge of FIG. 22A, along line B-B.

DETAILED DESCRIPTION

Figure 1A:
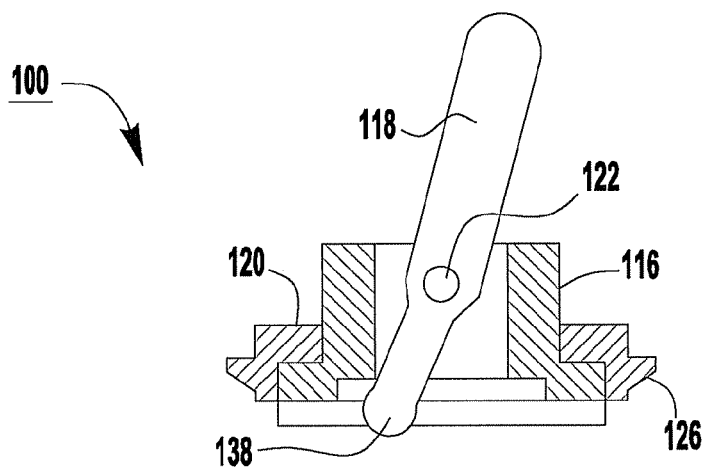
FIGS. 1A-1C show a conventional valve cartridge in which frictional forces within the valve cartridge and loading forces on the valve cartridge are transmitted to an actuating mechanism of the valve cartridge.
Figure 1A:
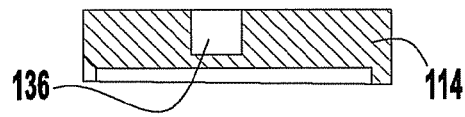
Figure 1A:
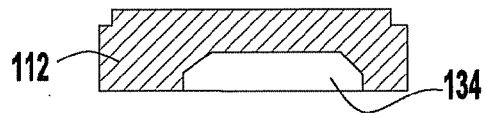
Figure 1A:
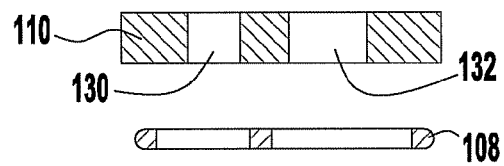
Figure 1A:
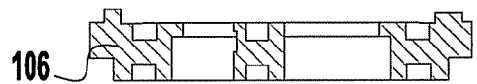
Figure 1A:
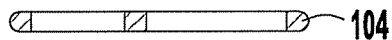
Figure 1A:
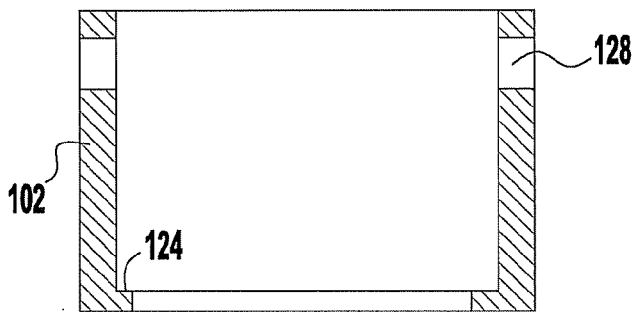
Figure 1B:
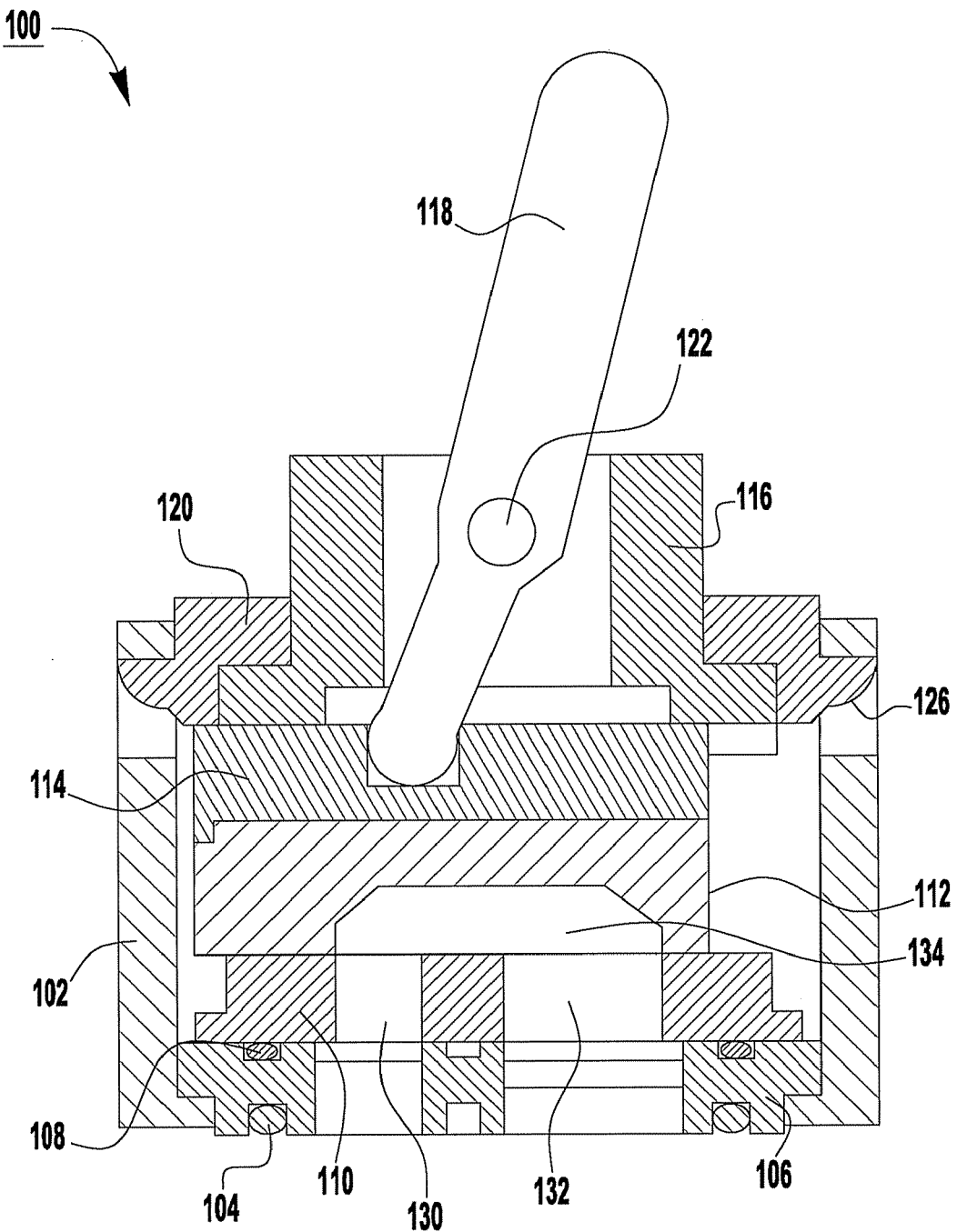
Figure 1C:
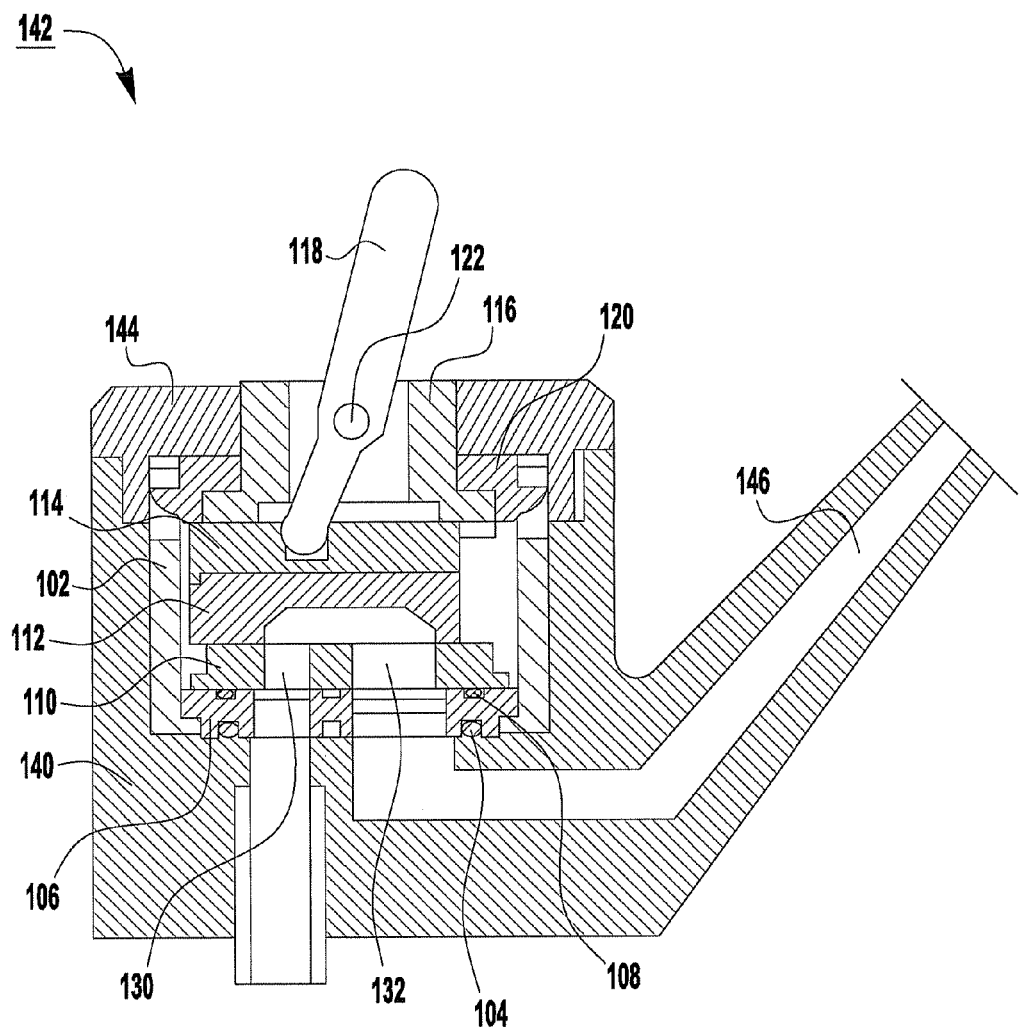

While the general inventive concept is susceptible of embodiment in many different forms, there are shown in the drawings and will be described herein in detail specific embodiments thereof with the understanding that the present disclosure is to be considered as an exemplification of the principles of the general inventive concept. Accordingly, the general inventive concept is not intended to be limited to the specific embodiments illustrated herein.

A one-handle valve cartridge 200, according to an exemplary embodiment, has structure that isolates a loading force applied to the valve cartridge 200 from a loading force applied to an actuating mechanism of the valve cartridge 200. Furthermore, the valve cartridge 200 has structure that isolates frictional forces within the valve cartridge 200, including a frictional force between dynamic sealing elements of the valve cartridge 200, from frictional forces associated with the actuating mechanism of the valve cartridge 200. Accordingly, the actuating mechanism of the valve cartridge 200 produces a consistent, precise and smooth feel during operation of the actuating mechanism.

As shown in FIGS. 2 and 10A-10C, the exemplary valve cartridge 200 includes a housing 202, a ball-stem 204, a pin 206, a spring 208, a bushing 210, a flow plate 212, a manifold 214 and a base seal 216. The flow plate 212 and/or the manifold 214 are made of a hard material. For example, the flow plate 212 and/or the manifold 214 can be made of stainless steel. The housing 202, for example, can be made of plastic or metal.

Figure 3:
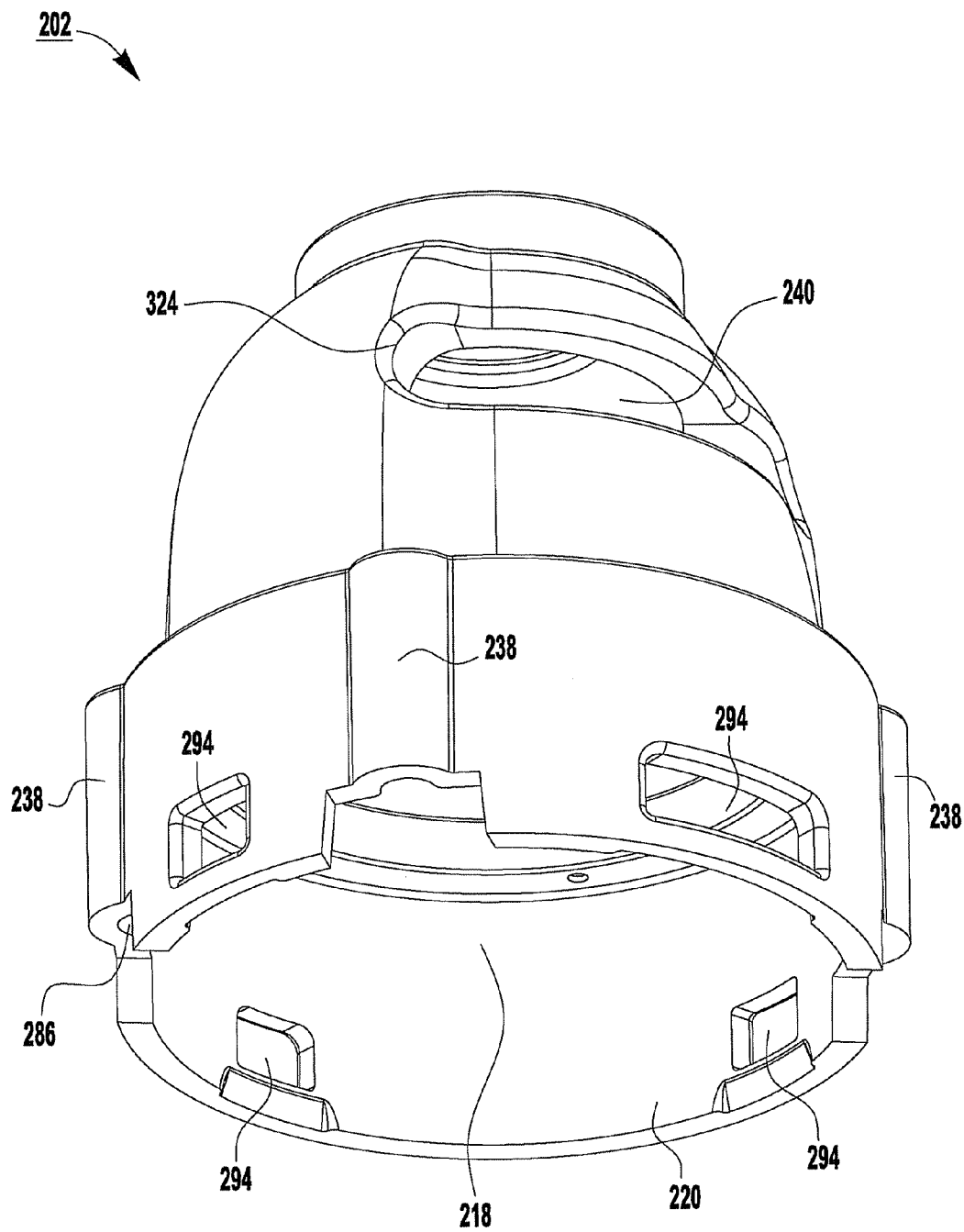
FIG. 3 is a perspective view of an exemplary housing of the exemplary valve cartridge of FIG. 2.
Figure 11:
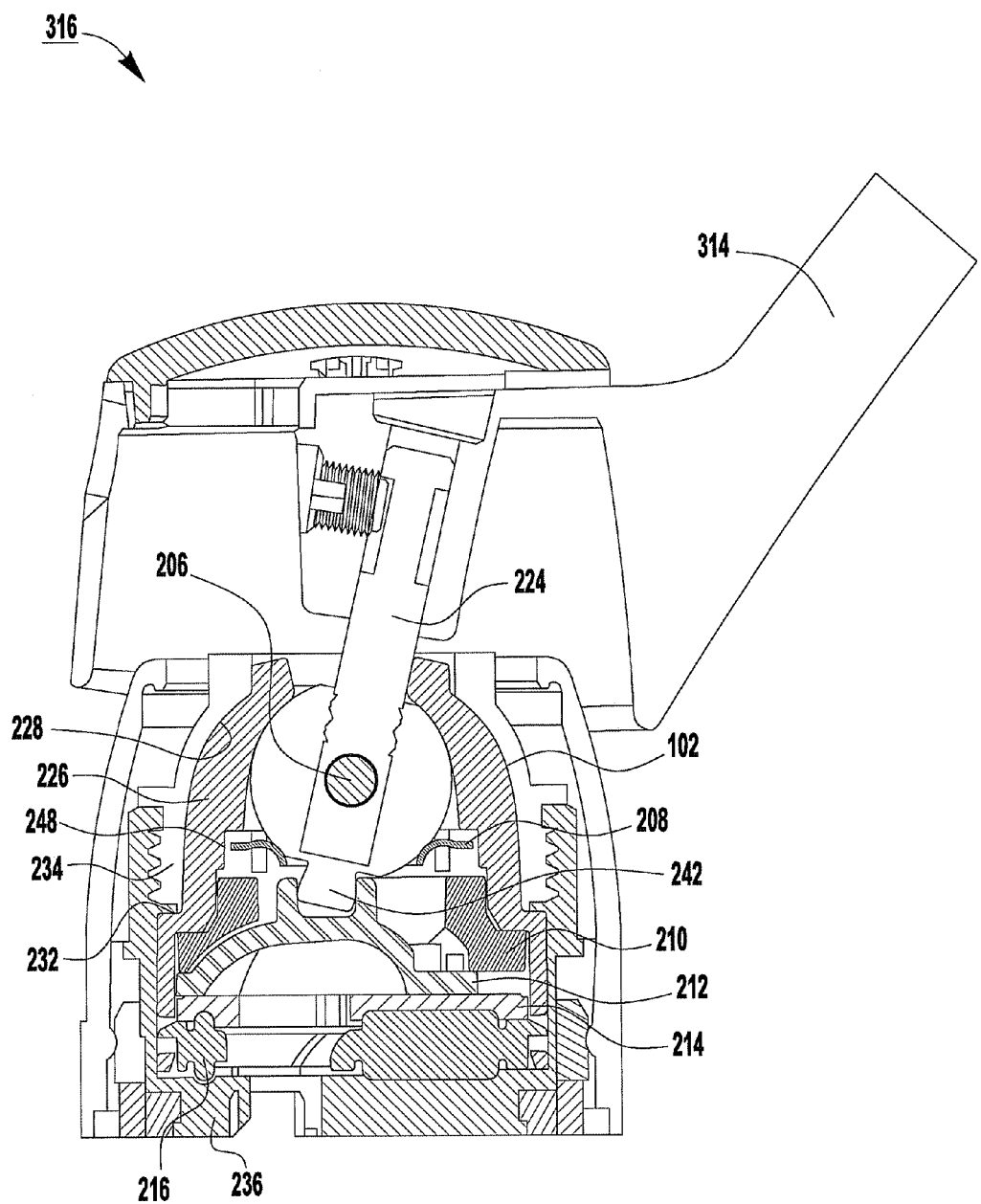
FIG. 11 is a mirror image of a cross-sectional view (along line B-B in FIG. 10A) of the exemplary valve cartridge of FIG. 2 after installation in a plumbing fixture.

As shown in FIG. 3, the housing 202 has a cavity 218 formed therein for receiving the remaining components of the valve cartridge 200. The housing 202 includes a lower opening 220 through which the components can be inserted into the housing 202. The housing 202 also includes an upper opening 222 through which a stem portion 224 of the ball-stem 204 extends. The cavity 218 in the housing 202 is wider near the lower opening 220 than near the upper opening 222. The portion of the cavity 218 near the upper opening 222 of the housing 202 receives a ball portion 226 of the ball-stem 204. Accordingly, a first inner surface 228 of the portion of the cavity 218 near the upper opening 222 has a shape that substantially conforms to a shape of the ball portion 226 of the ball-stem 204 (see FIGS. 10B-10C and 11).

The portion of the cavity 218 near the lower opening 220 of the housing 202 receives the bushing 210, the flow plate 212, the manifold 214 and the base seal 216. A diameter of the cavity 218 near the lower opening 220 is substantially the same as a diameter of the base seal 216, the manifold 214 and a flat annular portion 230 of the bushing 210, such that only a small gap is present between these components and the housing 202 when the components are received in the housing 202. The portion of the cavity 218 near the lower opening 220 of the housing 202 forms an installation ledge 232 on an outer surface of the housing 202 (see FIGS. 2 and 10B-10C). A retention nut 234 engages the housing 202 and/or the installation ledge 232 of the housing 202 to secure the valve cartridge 200 in a valve body 236 (see FIG. 11). Furthermore, the housing 202 has one or more keys 238 that each engage a complementary-shaped recess (not shown) in the valve body 236 to prevent rotation of the housing 202 relative to the valve body 236 after the valve cartridge 200 is installed. The one or more keys 238 can have a lobular shape. The housing 202 also includes a pair of slots 240 formed on opposing sides of the housing 202 that interface with distal ends of the pin 206 to function as temperature-limit stops, as described below.

Figure 4:
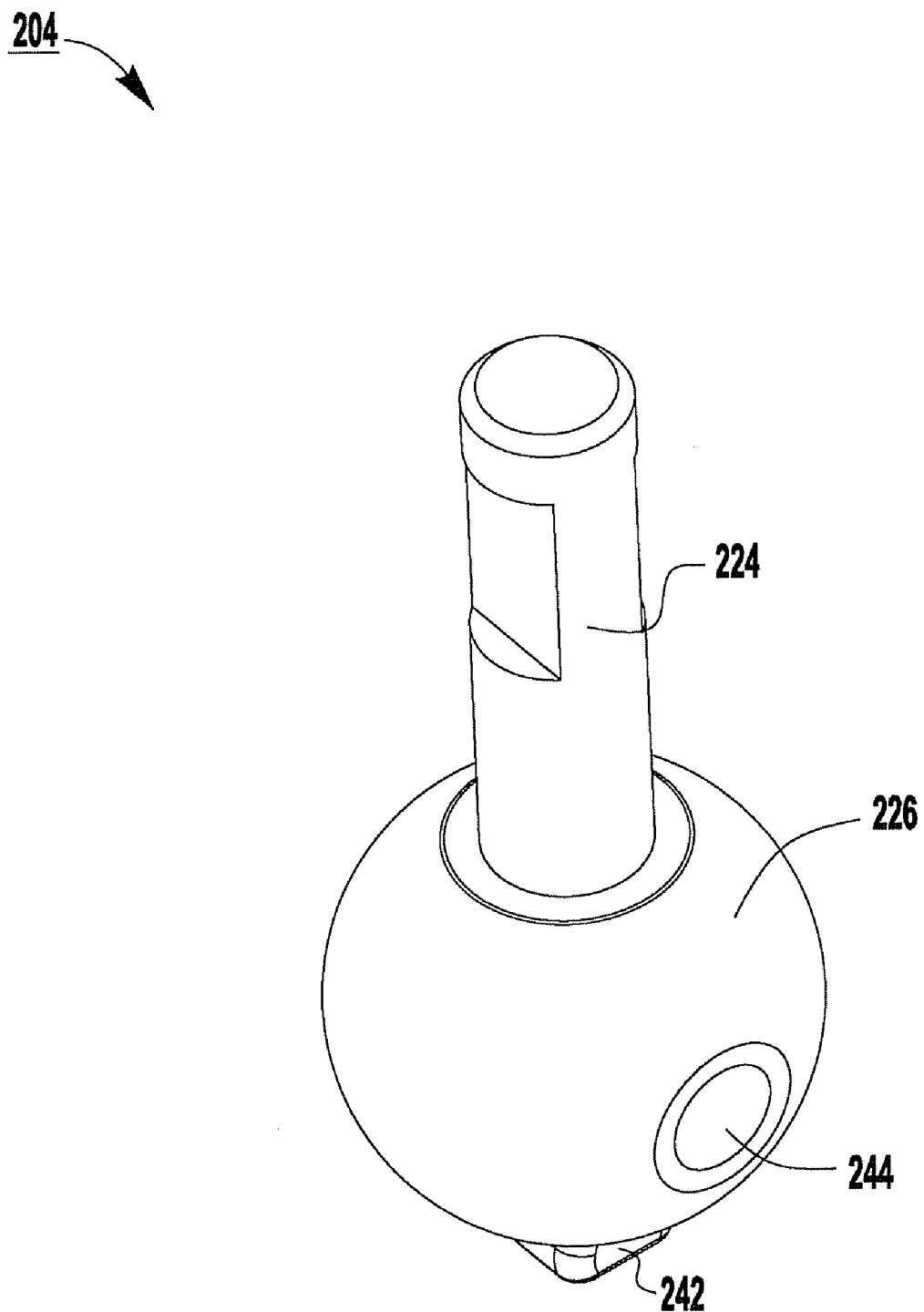
FIG. 4 is a perspective view of an exemplary ball-stem of the exemplary valve cartridge of FIG. 2.

As shown in FIG. 4, the ball-stem 204 is the actuating mechanism for the valve cartridge 200. The ball-stem 204 includes the ball portion 226 and the stem portion 224. The ball portion 226 and the stem portion 224 can be discrete components or can be formed integrally. The ball portion 226 includes a projection 242 extending from a side of the ball portion 226 that is opposite a side of the ball portion 226 from which the stem portion 224 extends. The projection 242 acts as a coupling device for connecting the ball-stem 204 to the flow plate 212, as described below. The ball portion 226 and the projection 242 can be discrete components or can be formed integrally.

A bore 244 is formed through a center of the ball portion 226 of the ball-stem 204. The bore 244 is orthogonal to the stem portion 224 of the ball-stem 204. After the ball-stem 204 is inserted into the cavity 218 of the housing 202, the pin 206 can be inserted through one of the slots 240 in the housing 202 and into the bore 244 of the ball-stem 204. In this manner, the pin 206 retains the ball-stem 204 in the housing 202.

Figure 5A:
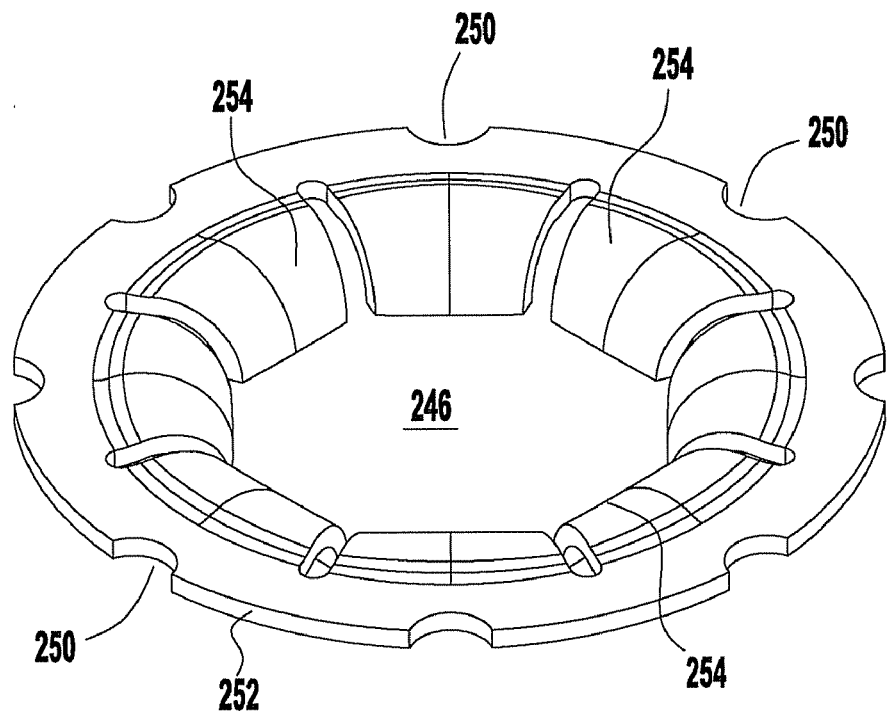
Figure 5B:
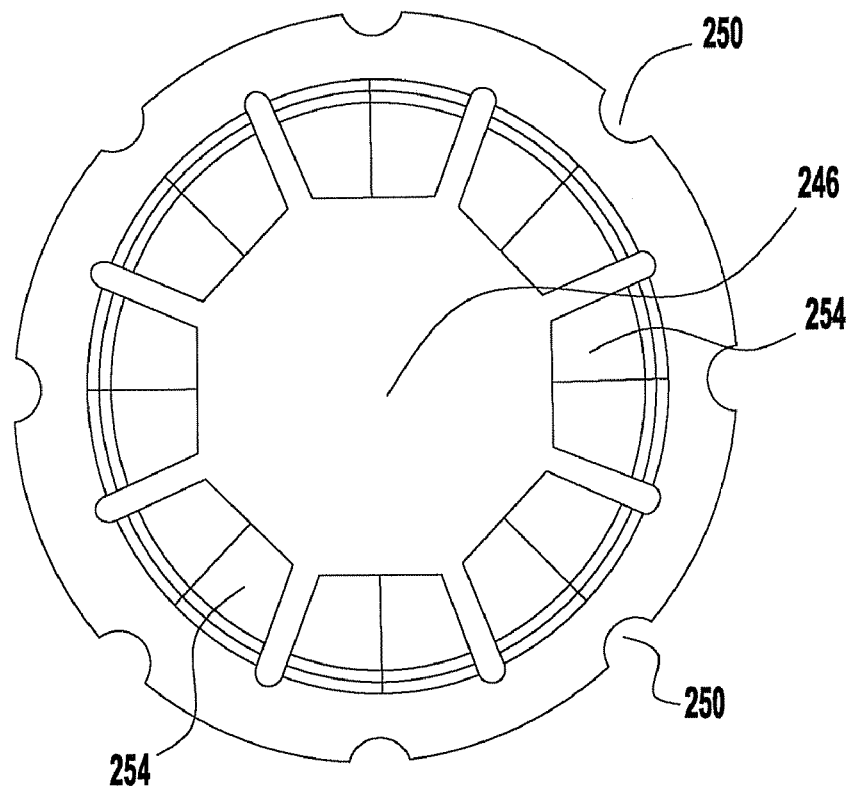
Figure 6A:
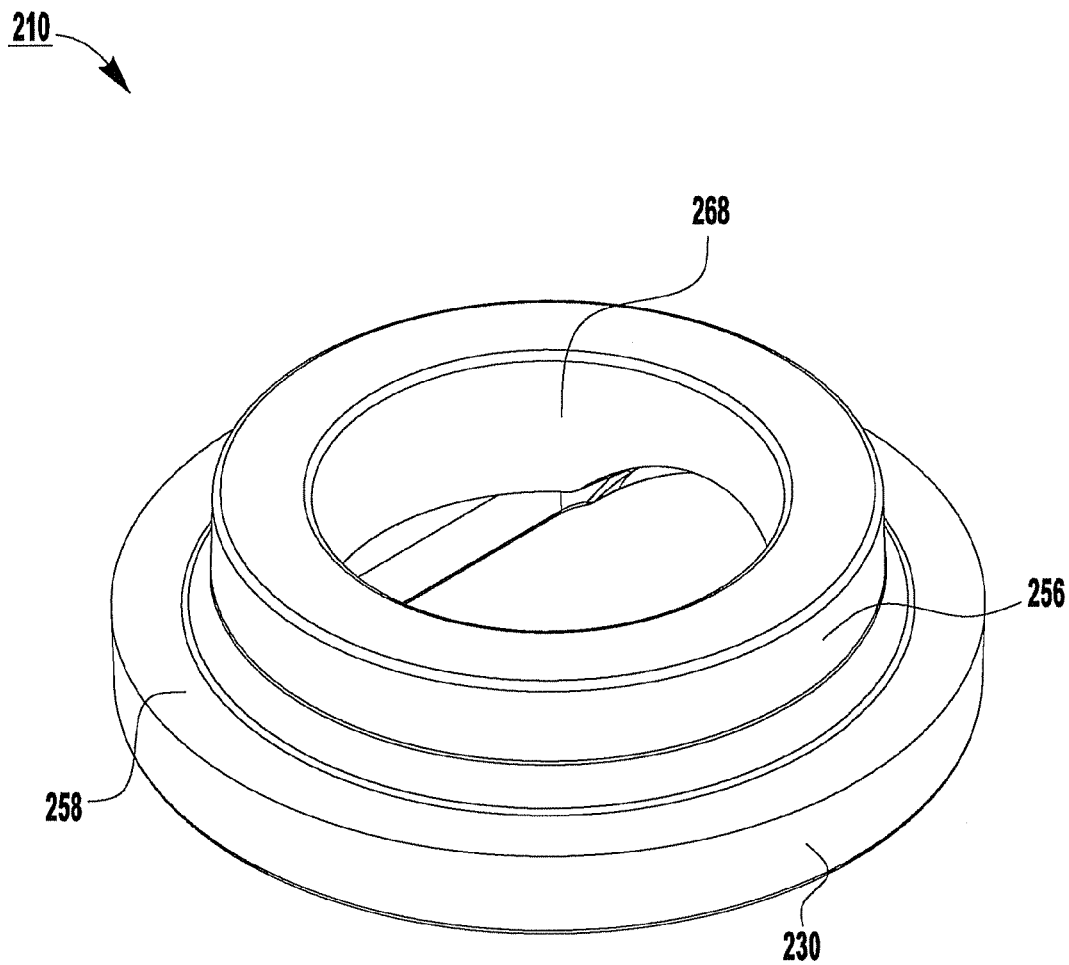
FIGS. 6A-6D show an exemplary bushing used in the exemplary valve cartridge of FIG. 2.
Figure 6B:
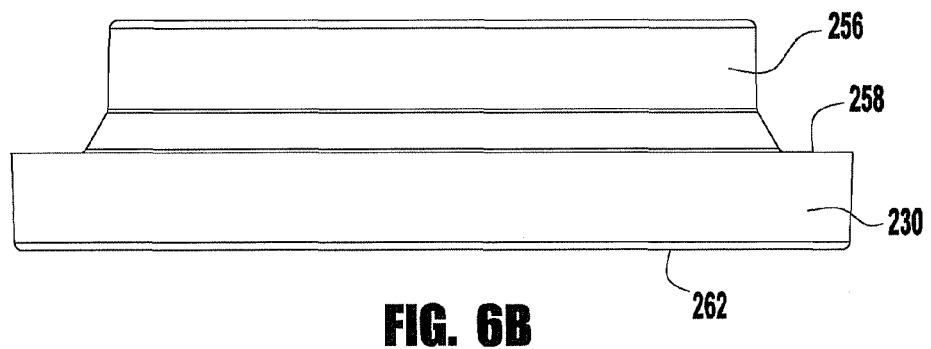
Figure 6C:
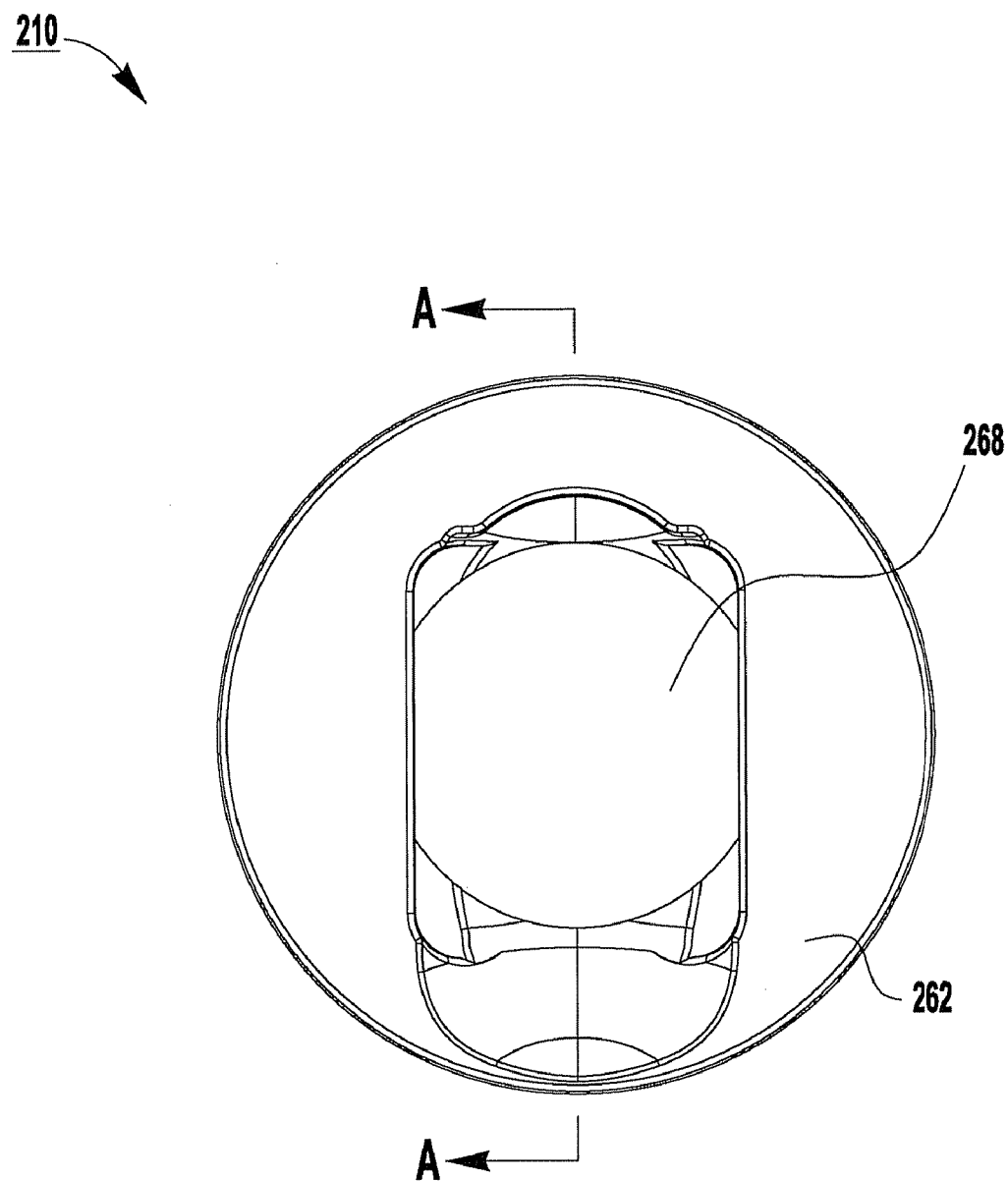
Figure 6D:
Figure 6D:
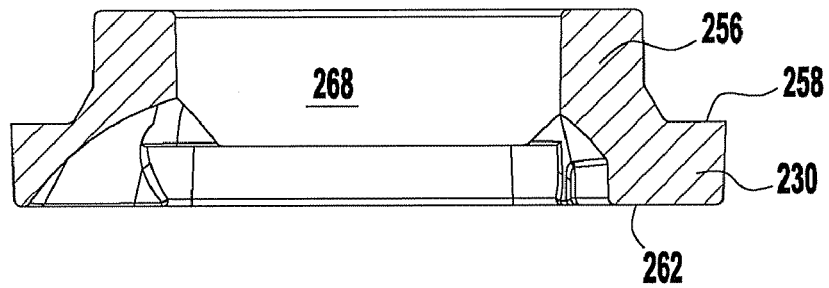
Figure 7A:
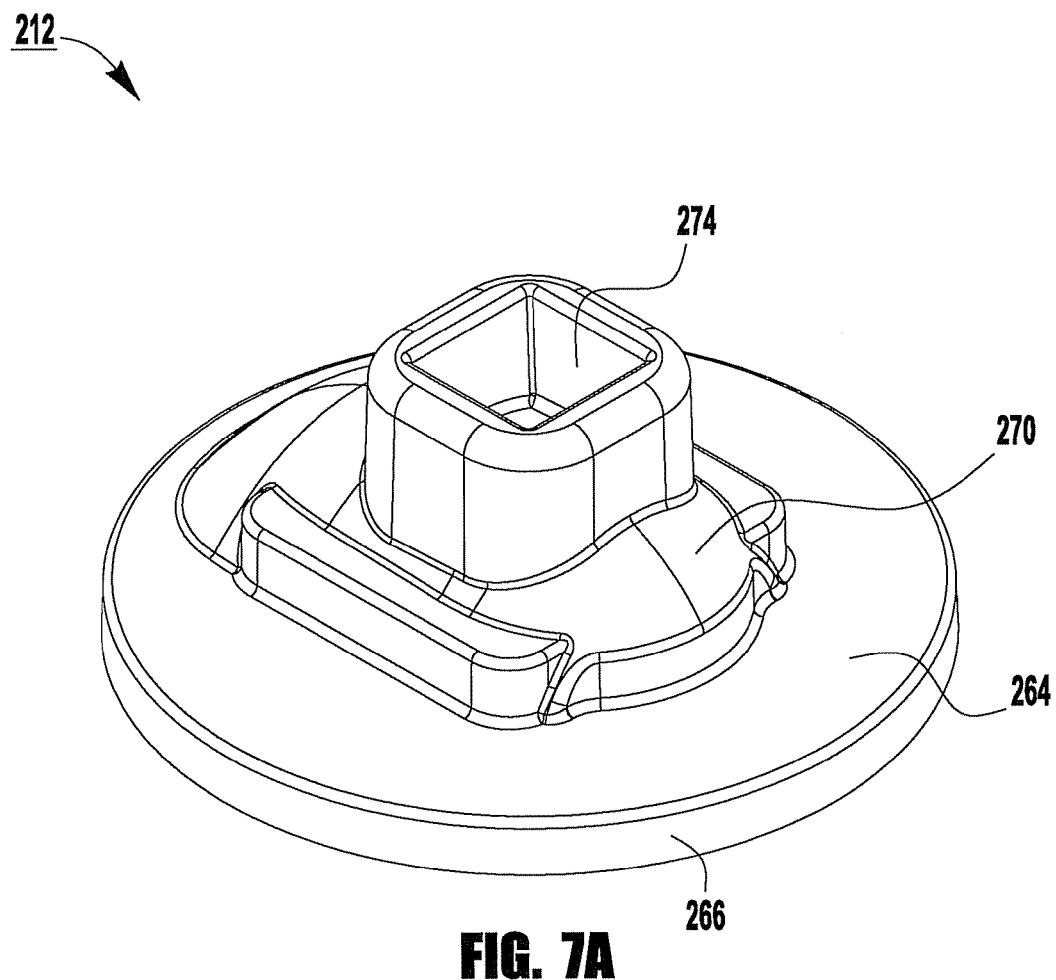
FIGS. 7A-7D show an exemplary flow plate used in the exemplary valve cartridge of FIG. 2.
Figure 7B:
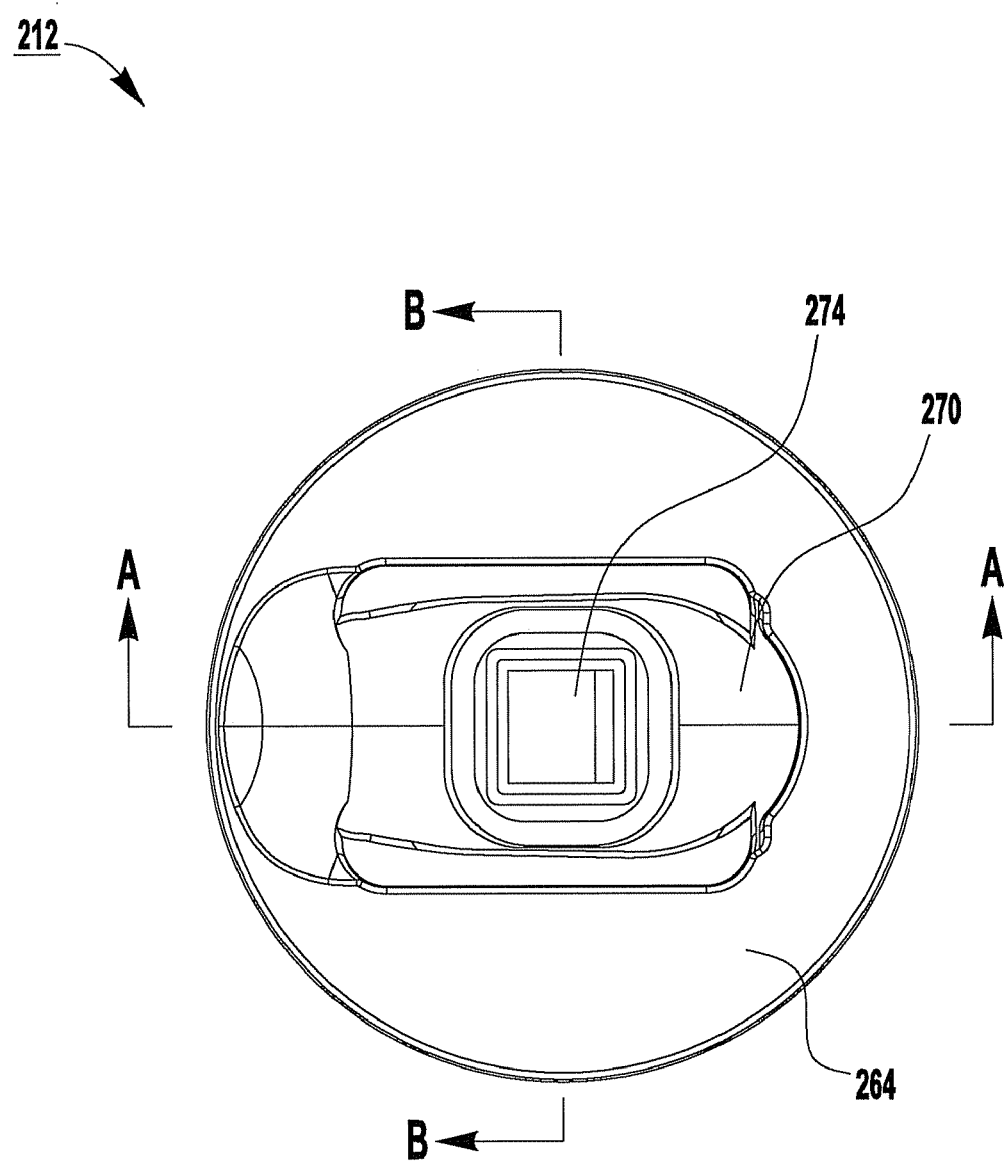
Figure 7C:
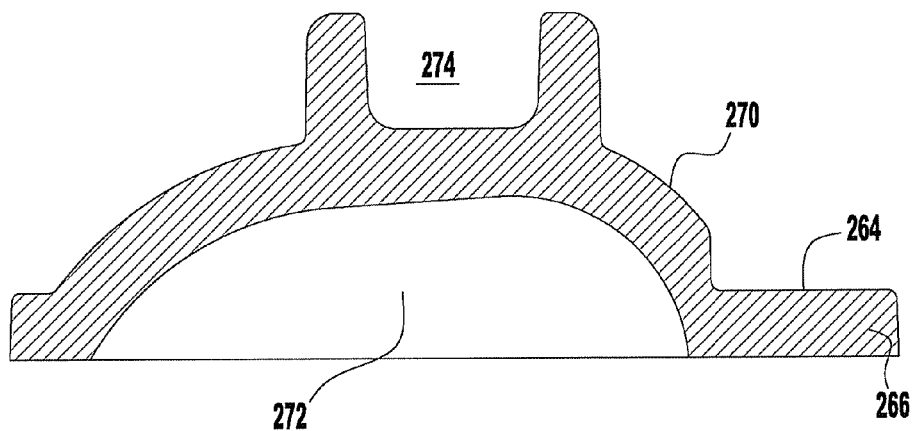
Figure 7D:
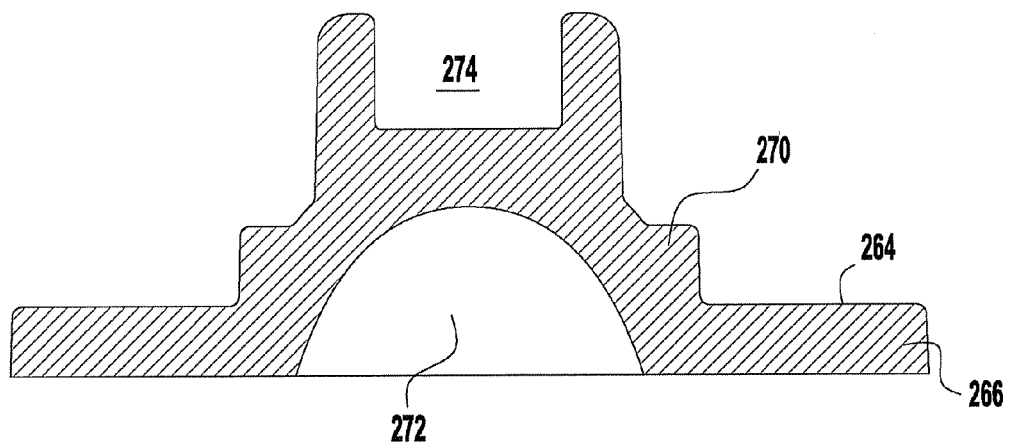

As shown in FIGS. 5A-5C, the spring 208 has an annular shape with a central opening 246. The spring 208 is disposed below the ball portion 226 of the ball-stem 204 in the housing 202 (see FIGS. 10B-10C). The spring 208 is connected to a second inner surface 248 of the housing 202 (e.g., by or through threading, friction fitting, snap fitting, welding), such that the spring 208 also retains the ball-stem 204 in the housing 202. In another exemplary embodiment, separate structure (e.g., an annular plate) is connected to the second inner surface 248 of the housing 202 to hold the spring 208 in place. The spring 208 has a plurality of notches 250 formed on an outer periphery 252 of the spring 208. The notches 250 engage corresponding tabs (not shown) formed on the second inner surface 248 of the housing 202, thereby securing the spring 208 within the housing 202 below the ball-stem 204. As one example, the tabs are welded to the notches 250.

The projection 242 of the ball-stem 204 extends through the central opening 246 in the spring 208. Some of the ball portion 226 of the ball-stem 204 can also extend through the central opening 246 in the spring 208. The spring includes a plurality of elastic flanges 254 surrounding the central opening 246. The elastic flanges 254 of the spring 208 contact the ball portion 226 of the ball-stem 204 and urge the ball portion 226 of the ball-stem 204 against the complementary-shaped first inner surface 228 of the housing 202.

It will be appreciated that notwithstanding the exemplary embodiments described herein, the general inventive concept encompasses any structure within the valve cartridge 200 that separates an actuating mechanism (e.g., the ball-stem 204) from other components within the valve cartridge (e.g., the flow plate 212 and the manifold 214) and/or exerts a preloading force on the actuating mechanism.

In the exemplary embodiment disclosed above, the structure is a resilient member (i.e., the spring 208) disposed below the actuating mechanism (i.e., the ball-stem 204) having a predetermined resiliency. The resilient member separates the actuating mechanism from the flow plate 212 and the manifold 214 and exerts an upward force on the actuating mechanism. Furthermore, the force exerted by the resilient member on the actuating mechanism is uniform at points of contact between the resilient member and the actuating mechanism.

Notwithstanding the exemplary embodiment disclosed above, other structures that separate the actuating mechanism from other components within the valve cartridge and/or exert a preloading force on the actuating mechanism are contemplated. For example, in an alternative embodiment, the structure(s) can be a plate and/or an O-ring. The plate is disposed below the actuating mechanism, such that the plate separates the actuating mechanism from the other components in the valve cartridge 200, and/or the O-ring is disposed above the actuating mechanism (and compressed between the actuating mechanism and the housing), such that the O-ring exerts a preloading force on the actuating mechanism.

As shown in FIGS. 6A-6D, the bushing 210 includes the flat annular portion 230 and a raised annular portion 256. A diameter of the flat annular portion 230 is greater than a diameter of the raised annular portion 256. The bushing 210 is disposed below and can be spaced apart from the spring 208 in the cavity 218 of the housing 202 (see FIGS. 10B-10C). An upper surface 258 of the flat annular portion 230 of the bushing 210 contacts a third inner surface 260 of the housing 202, which is located below the installation ledge 232. A lower surface 262 of the flat annular portion 230 of the bushing 210 rests on an upper surface 264 of a flat portion 266 of the flow plate 212. Additionally, the raised portion 256 of the bushing 210 extends into a portion of the cavity 218 of the housing 202 immediately above the installation ledge 232. The raised portion 256 of the bushing 210 is sized to fit closely in that portion of the cavity 218 of the housing 202 receiving the raised portion 256 of the bushing 210. Accordingly, the bushing 210 provides a support surface between the housing 202 and the flow plate 212.

The bushing 210 has an opening 268 that extends through the flat annular portion 230 and the raised annular portion 256 of the bushing 210. A raised portion 270 of the flow plate 212 extends into the opening 268 of the bushing 210. The raised portion 270 of the flow plate 212 forms a mixing chamber 272. A portion of the opening 268 of the bushing 210 has an inner surface shaped to conform to a shape of the raised portion 270 (see FIGS. 6C-6D). Additionally, a coupling recess 274 is formed on the raised portion 270 of the flow plate 212 (see FIGS. 7A-7D). After the flow plate 212 is installed in the valve cartridge 200, the coupling recess 274 is positioned within the opening 268 of the bushing 210 and surrounded by the raised annular portion 256 of the bushing 210 (see FIGS. 10B-10C).

The coupling recess 274 of the flow plate 212 receives the projection 242 of the ball-stem 204, thereby connecting the actuating mechanism (i.e., the ball-stem 204) and the flow plate 212. The projection 242 of the ball-stem 204 can have four sides that contact four corresponding sides of the coupling recess 274. The projection 242 of the ball-stem 204, however, does not contact a bottom surface of the coupling recess 274. It will be appreciated that notwithstanding the exemplary embodiments described herein, the ball-stem 204 can be connected to the flow plate 212 in any suitable manner that allows the ball-stem 204 to impart translational and angular movement to the flow plate 212.

As shown in FIGS. 7A-7D, the flow plate 212 is a valve member formed as a plate, disk or the like that is movable relative to the housing 202. The flow plate 212 includes the flat portion 266 and the raised portion 270. The flat portion 266 of the flow plate 212 forms a sealing surface that can cover and uncover water inlet apertures 276 and 278 in the manifold 214 to allow only cold water, only hot water or both cold and hot water to flow through the manifold 214. The water flowing through the water inlet apertures 276 and 278 in the manifold 214 enters the mixing chamber 272 (i.e., a cavity formed under the raised portion 270 of the flow plate 212) where the cold and hot water mixes prior to being discharged through a water outlet aperture 280 in the manifold 214. Furthermore, as noted above, the flow plate 212 also includes the coupling recess 274, which is formed on the raised portion 270 of the flow plate 212.

Figure 8:
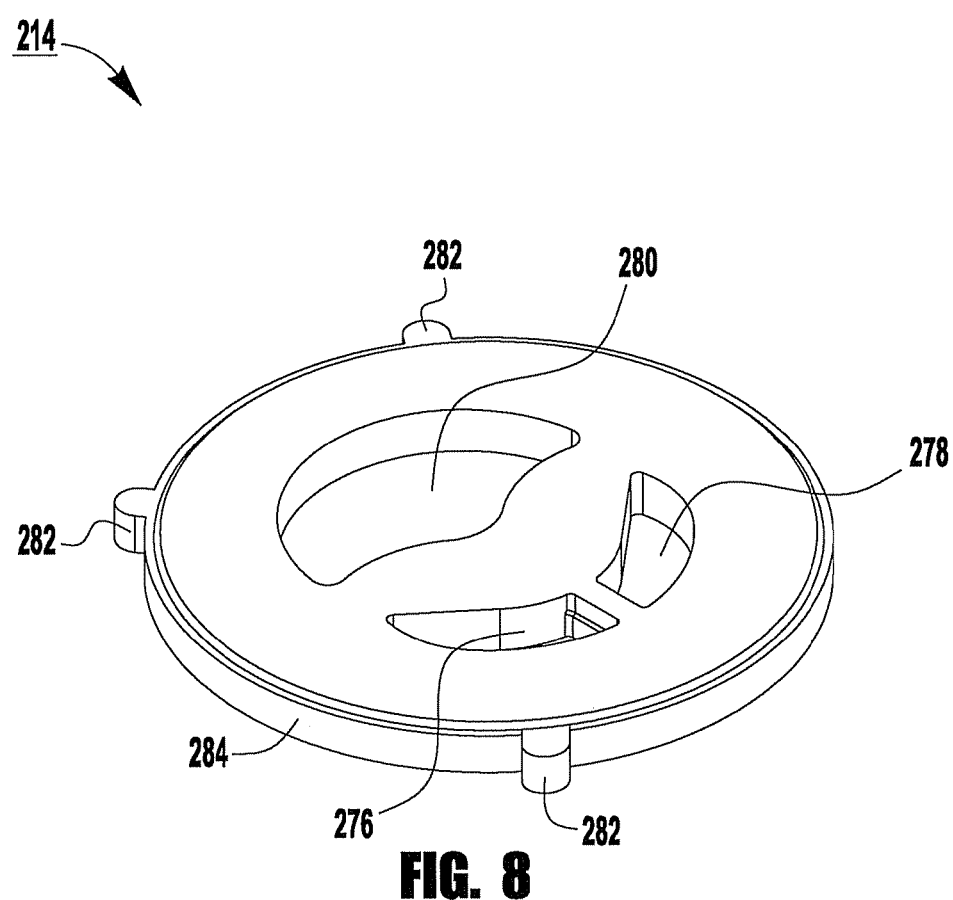
FIG. 8 is a perspective view of an exemplary manifold of the exemplary valve cartridge of FIG. 2.

As shown in FIG. 8, the manifold 214 is a valve member formed as a plate, disk or the like that is fixed relative to the housing 202. The manifold 214 includes one or more projections 282 formed on a periphery 284 of the manifold 214, wherein each of the projections 282 fits inside an internal cavity 286 of one of the keys 238 of the housing 202 (see FIG. 3). The projections 282 fix the manifold 214 relative to the housing 202, thereby preventing rotation of the manifold 214 within the housing 202.

The manifold 214 includes the water inlet apertures 276 and 278, which correspond to a cold water inlet aperture and a hot water inlet aperture, respectively. The manifold 214 also includes the water outlet aperture 280 through which cold water flowing through the cold water inlet aperture 276, hot water flowing through the hot water inlet aperture 278 or a mixture of the cold and hot water can flow to a water outlet passage (not shown) of the valve body 236.

Figure 9A:
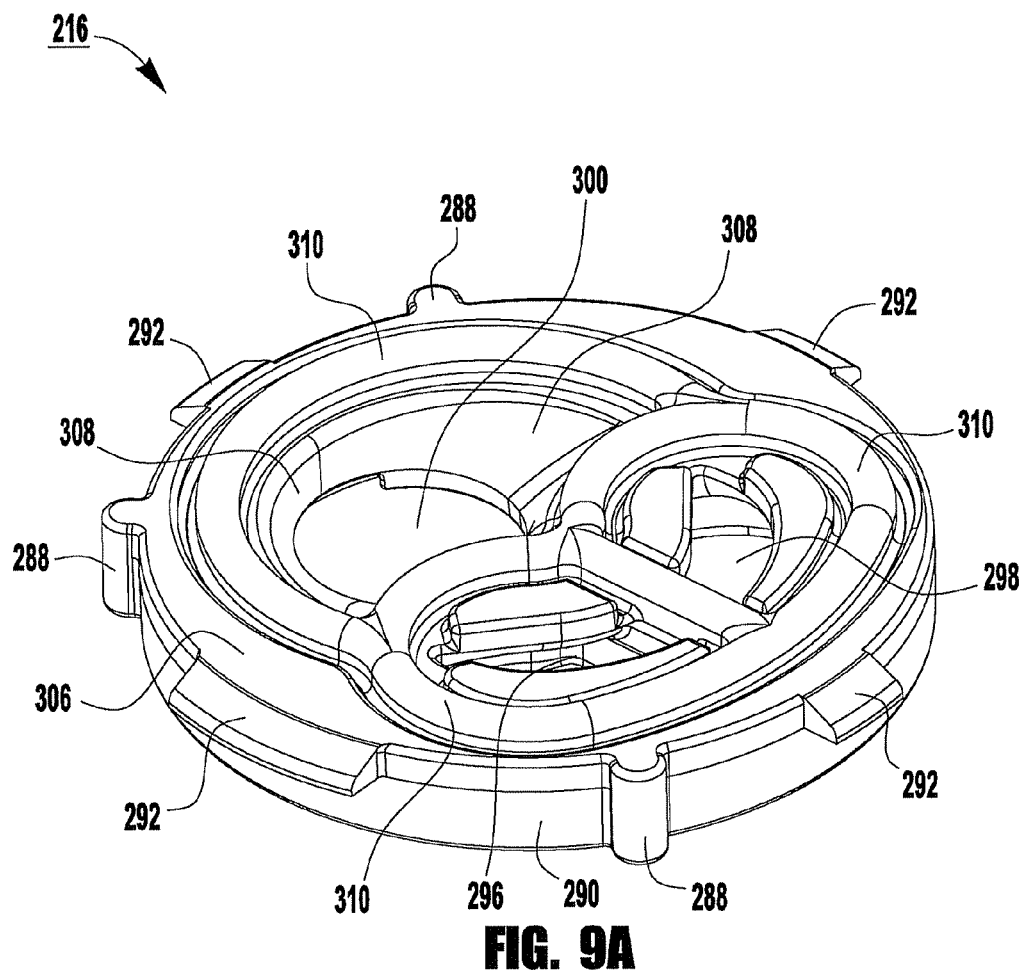
FIGS. 9A-9B show an exemplary base seal used in the exemplary valve cartridge of FIG. 2.
Figure 9B:
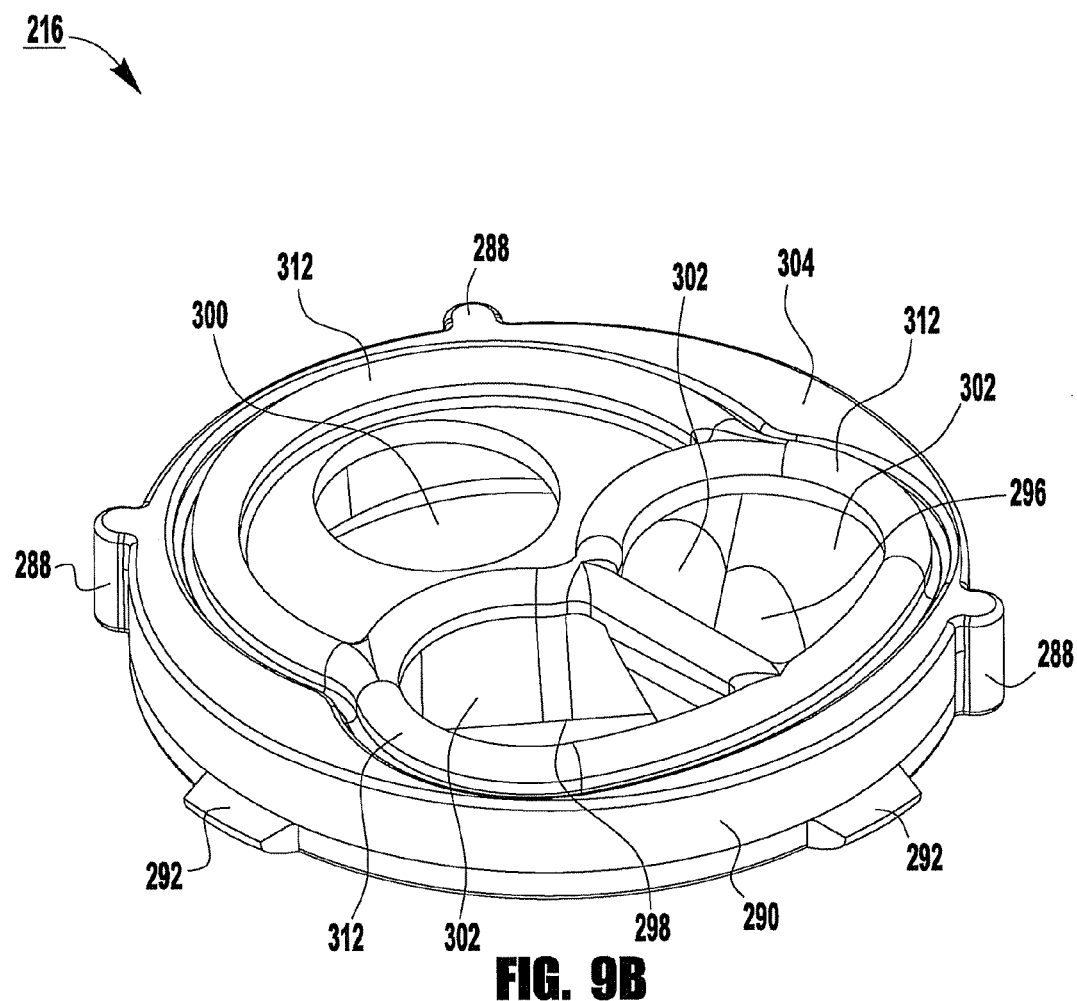

As shown in FIGS. 9A-9B, the base seal 216 is a sealing member formed of an elastic material (e.g., rubber). The base seal 216 includes one or more projections 288 formed on a periphery 290 of the base seal 216, wherein each of the projections 288 fits inside the internal cavity 286 of one of the keys 238 of the housing 202. The projections 288 fix the base seal 216 relative to the housing 202, thereby preventing rotation of the base seal 216 within the housing 202. The base seal 216 also includes one or more tabs 292 formed on the periphery 290 of the base seal 216, wherein the one or more tabs 292 are deformable to fit in and extend through a corresponding one or more openings 294 formed in the housing 202 to secure the base seal 216 in the housing 202. The one or more tabs 292 can have different sizes.

Like the manifold 214, the base seal 216 has a cold water inlet aperture 296, a hot water inlet aperture 298 and a water outlet aperture 300. The cold water inlet aperture 296 and the hot water inlet aperture 298 of the base seal 216 each have walls 302 that slope from near a lower surface 304 of the base seal 216 to near an upper surface 306 of the base seal 216 to improve the flow of water through the base seal 216 and into the valve cartridge 200. The water outlet aperture 300 of the base seal 216 has walls 308 that slope from near the upper surface 306 of the base seal 216 to near the lower surface 304 of the base seal 216 to improve the flow of water through the base seal 216 and out of the valve cartridge 200.

It is important that the apertures 276, 278 and 280 in the manifold 214 are aligned with the apertures 296, 298 and 300 in the base seal 216 when the valve cartridge 200 is assembled. Accordingly, the projections 282 on the manifold 214 and the projections 288 on the base seal 216 insure that the manifold 214 and the base seal 216 fit into the housing 202 in only one orientation, wherein the apertures 276, 278 and 280 in the manifold 214 are aligned with the apertures 296, 298 and 300 in the base seal 216 in this orientation.

A ridge 310 surrounds the apertures 296, 298 and 300 in the base seal 216 on the upper surface 306 of the base seal 216 (see FIG. 9A). Similarly, a ridge 312 surrounds the apertures 296, 298 and 300 in the base seal 216 on the lower surface 304 of the base seal 216 (see FIG. 9B). The ridges 310 and 312 of the base seal 216 are compressed when the valve cartridge 200 is installed in the valve body 236 (see FIGS. 10B-10C and 11 which show the ridges 310 and 312 overlapped with the compressing structure for purposes of illustration only). In particular, as the retention mit 234 is tightened down on the housing 202 and/or the installation ledge 232 of the housing 202, the base seal 216 is compressed between a seating surface of the valve body 236 and the manifold 214 of the valve cartridge 200 (see FIG. 11). It should be noted that although the projections 282 of the manifold 214 prevent the manifold 214 from rotating within the housing 202, the projections 282 nonetheless allow the manifold 214 to move axially within the housing 202. In this manner, the compression of the ridges 310 and 312 of the base seal 216 exerts a loading force on the flow plate 212 and the manifold 214. Accordingly, the flow plate 212 and the manifold 214 are kept in water-tight engagement with one another, after installation of the valve cartridge 200.

The position and the orientation of the flow plate 212 relative to the manifold 214 are controlled by the stem portion 224 of the ball-stem 204 projecting out of the housing 202 through the upper opening 222. For example, pivoting the stem portion 224 about the pin 206 changes the position of the flow plate 212 relative to the manifold 214, and rotating the stem portion 224 changes the orientation of the flow plate 212 relative to the manifold 214.

An operating member 314 such as a handle, knob or the like (see FIG. 11) can be connected to the stem portion 224 of the ball-stem 204 to facilitate manipulation of the stem portion 224 by the user. Accordingly, after the valve cartridge 200 is installed in the valve body 236, the user can manipulate the operating member 314 which moves the stem portion 224 of the ball-stem 204 to change the position and/or orientation of the flow plate 212 relative to the manifold 214, thereby controlling the flow rate and temperature of the water flowing through the valve cartridge 200 and out a plumbing fixture 316, such as through a spout (not shown) of the plumbing fixture 316 (see FIG. 11).

Pivoting of the stem portion 224 of the ball-stem 204 about the pin 206 can be limited by the stem portion 224 contacting opposing surfaces of the upper opening 222 of the housing 202. Thus, the stem portion 224 of the ball-stem 204 contacts a first surface 320 of the upper opening 222 of the housing 202 when the valve cartridge 200 is in a fully closed position corresponding to a flow rate of zero (see FIG. 10C). The stem portion 224 of the ball-stem 204 contacts a second surface 322 of the upper opening 222 of the housing 202 when the valve cartridge 200 is in a fully open position corresponding to a maximum flow rate.

Figure 2:
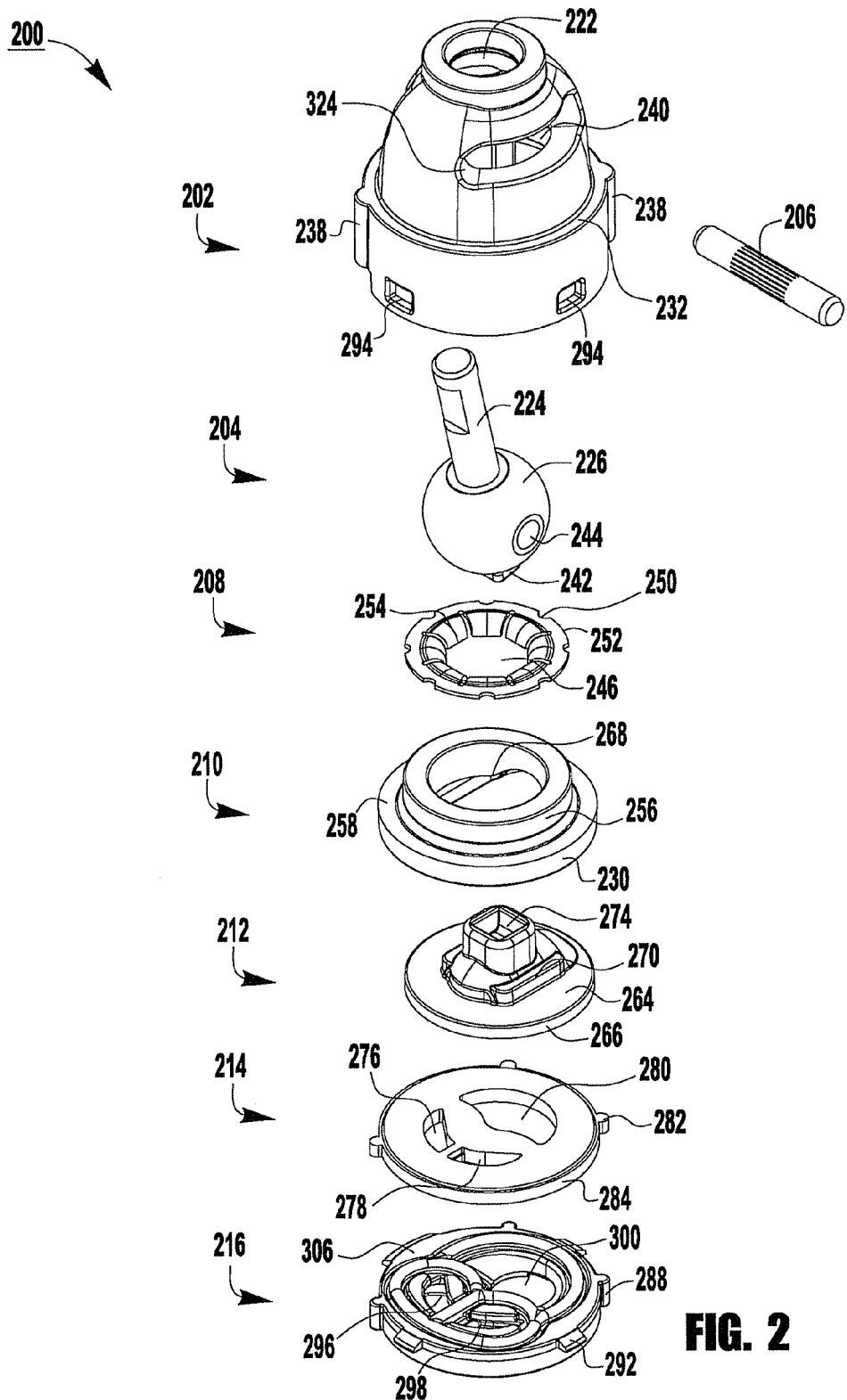
FIG. 2 is a perspective exploded view of a valve cartridge, according to an exemplary embodiment.
Figure 10A:
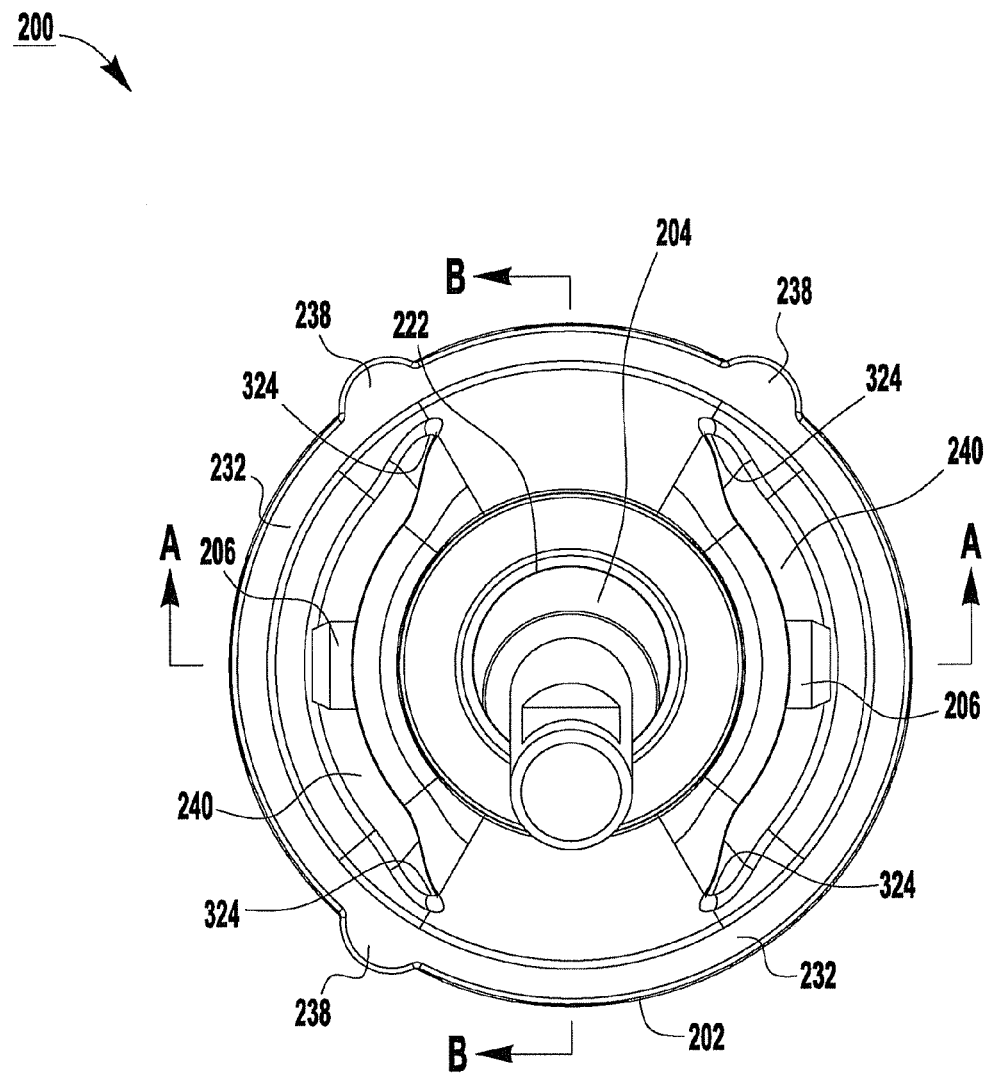
FIGS. 10A-10C show the exemplary valve cartridge of FIG. 2 in assembled form.
Figure 10B:
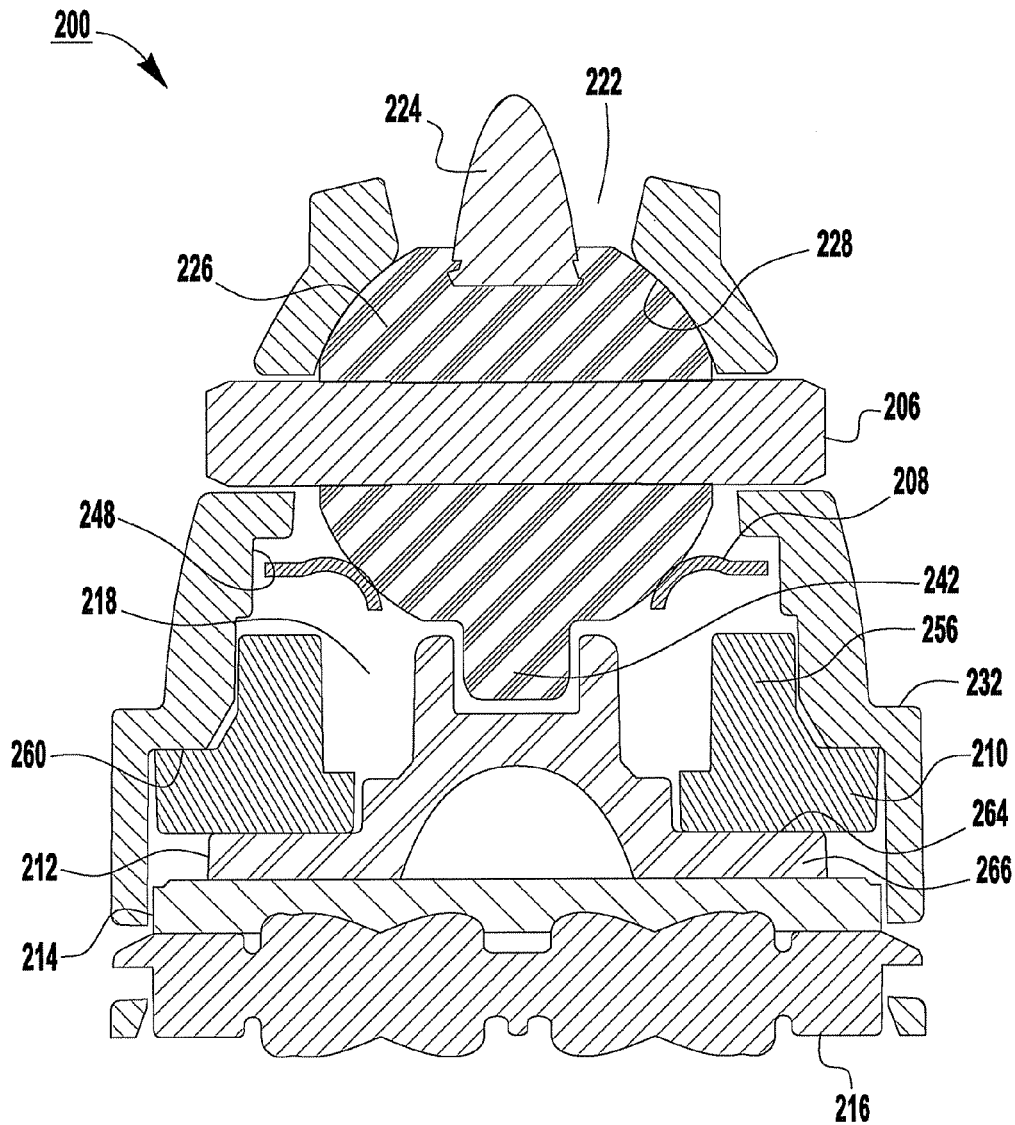
Figure 10C:
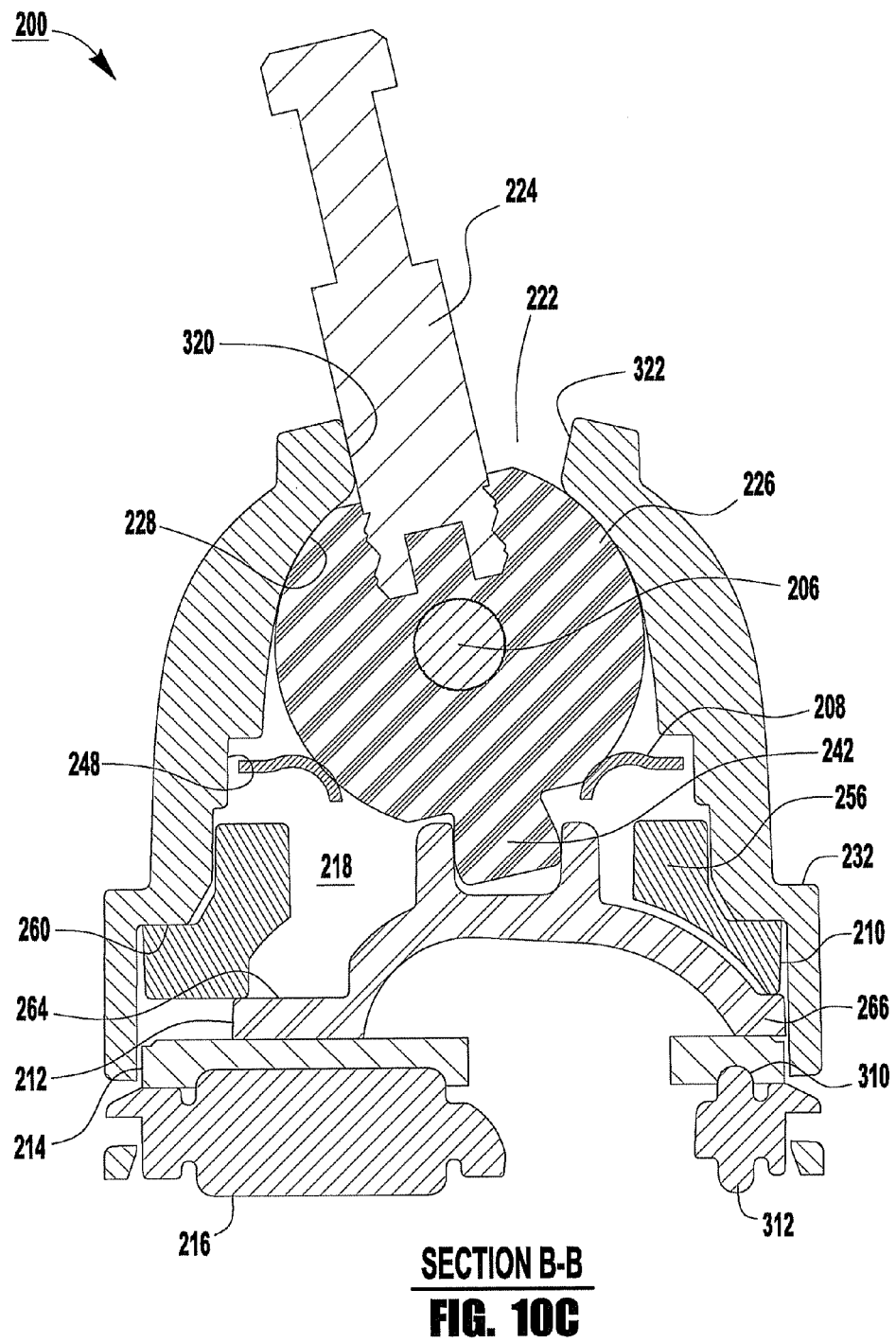

Rotation of the stem portion 224 of the ball-stem 204 can be limited by the distal ends of the pin 206 contacting end portions 324 of the slots 240 (see FIGS. 2-3 and 10A). Accordingly, the length of the slots 240, which function as temperature limit stops, define the range of temperatures for which the valve cartridge 200 can deliver the water.

During assembly of the valve cartridge 200, the spring 208 is connected to the second inner surface 248 of the housing 202. In this manner, the spring 208 secures the ball-stem 204 in the housing 202 independently of the bushing 210, the flow plate 212, the manifold 214 and the base seal 216 being inserted in the housing 202. The spring 208 exerts an upward force (i.e., a preloading force) on the ball-stem 204. As noted above, when the assembled valve cartridge 200 is installed in the valve body 236 by tightening the retention nut 234 down on the housing 202 and/or the installation ledge 232 of the housing 202, the ridges 310 and 312 of the base seal 216 are compressed. This compression of the ridges 310 and 312 of the base seal 216 results in a loading force being transferred up through the components of the valve cartridge 200. However, because the spring 208 exerts the upward (preloading) force on the ball-stem 204, which is distinct from the loading force, and the projection 242 of the ball-stem 204 does not bottom out in the coupling recess 274, the ball-stem 204 (as the actuating mechanism) is decoupled from the components of the valve cartridge 200 disposed below the spring 208 (e.g., the bushing 210, the flow plate 212, the manifold 214 and the base seal 216). Accordingly, the spring 208 isolates the ball-stem 204 from the loading force attributable to the compression of the ridges 310 and 312 of the base seal 216, such that the ball-stem 204 is influenced primarily by the preloading force of the spring 208. As a result, the user realizes a consistent, precise and smooth feel during operation of the valve cartridge 200. Furthermore, the characteristics (e.g., the resiliency) of the spring 208 can be selected to achieve the desired feel.

Because the spring 208 uniformly surrounds and pushes on a lower portion of the ball portion 226 of the ball-stem 204, the frictional force between an upper portion of the ball portion 226 of the ball-stem 204 and the first inner surface 228 of the housing 202 is the same in any direction of movement of the ball-stem 204. Accordingly, the frictional force associated with the actuating mechanism (i.e., the ball-stem 204) is the same for controlling the flow rate and the temperature of the water flowing through the valve cartridge 200, such that the user realizes a consistent, precise and smooth feel during operation of the valve cartridge 200.

Furthermore, as noted above, the spring 208 exerts the preloading force on the ball-stem 204 which decouples the ball-stem 204 from the underlying components of the valve cartridge 200, including the flow plate 212 and the manifold 214. As a result, the frictional forces in the valve cartridge 200 below the spring 208 (e.g., the frictional force between the flow plate 212 and the manifold 214) are isolated from the frictional forces in the valve cartridge 200 above the spring 208 (e.g., the frictional force between the ball-stem 204 and the first inner surface 228). Accordingly, the frictional force associated with operating the ball-stem 204 is not adversely affected by other frictional forces present in the valve cartridge 200, such that the user realizes a consistent, precise and smooth feel during operation of the valve cartridge 200.

In addition to providing the user with a consistent feel for all movements of the ball-stem 204, the spring 208 insures the user is provided with a consistent feel over time. The dynamic bearing surfaces of the valve cartridge 200, such as the ball portion 226 of the ball-stem 204 and the first inner surface 228 of the housing 202, are subject to wear over time from repeated use. The individual elastic flanges 254 of the spring 208 flex to accommodate for changes in the ball portion 226 of the ball-stem 204 and/or the first inner surface 228 of the housing 202, such that the user experiences the same feel during operation of the valve cartridge 200 regardless of the wear on the dynamic bearing surfaces.

A one-handle valve cartridge 400, according to another exemplary embodiment, has structure that isolates a loading force applied to the valve cartridge 400 from a loading force applied to an actuating mechanism of the valve cartridge 400. Furthermore, the valve cartridge 400 has structure that isolates frictional forces within the valve cartridge 400, including a frictional force between dynamic sealing elements of the valve cartridge 400, from frictional forces associated with the actuating mechanism of the valve cartridge 400. Accordingly, the actuating mechanism of the valve cartridge 400 produces a consistent, precise and smooth feel during operation of the actuating mechanism.

Figure 12:
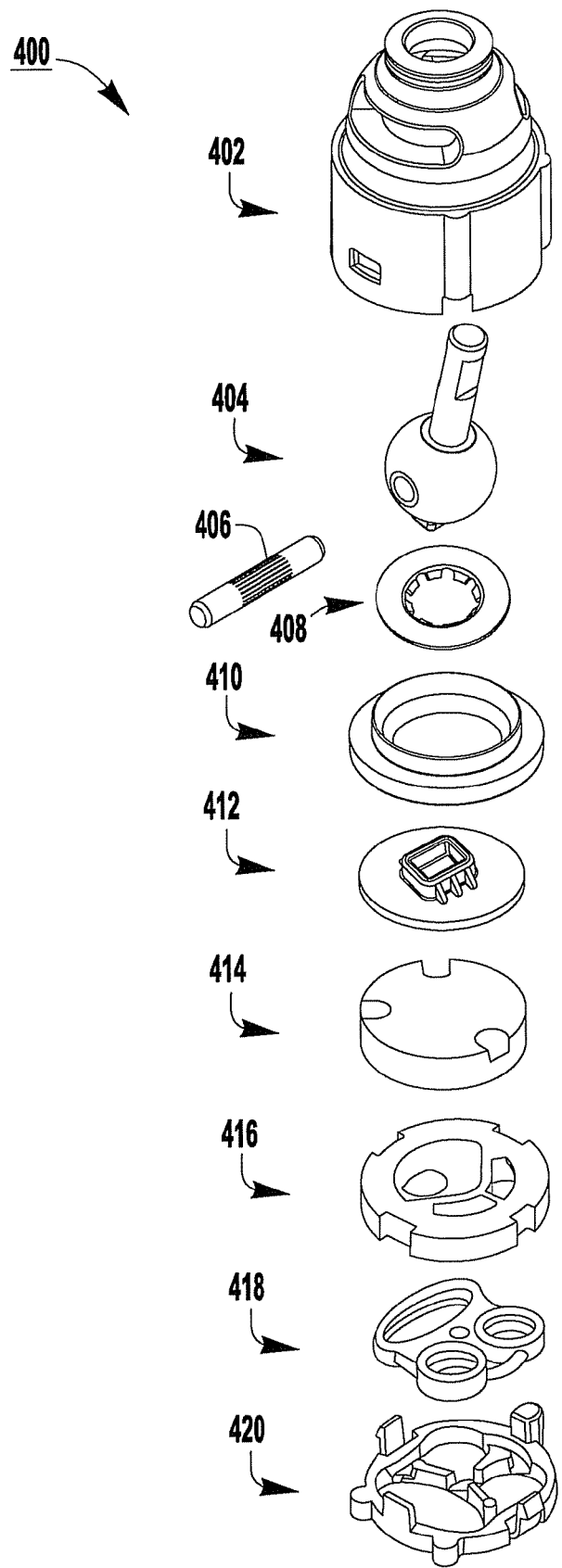
FIG. 12 is a perspective exploded view of a valve cartridge, according to another exemplary embodiment.
Figure 22A:
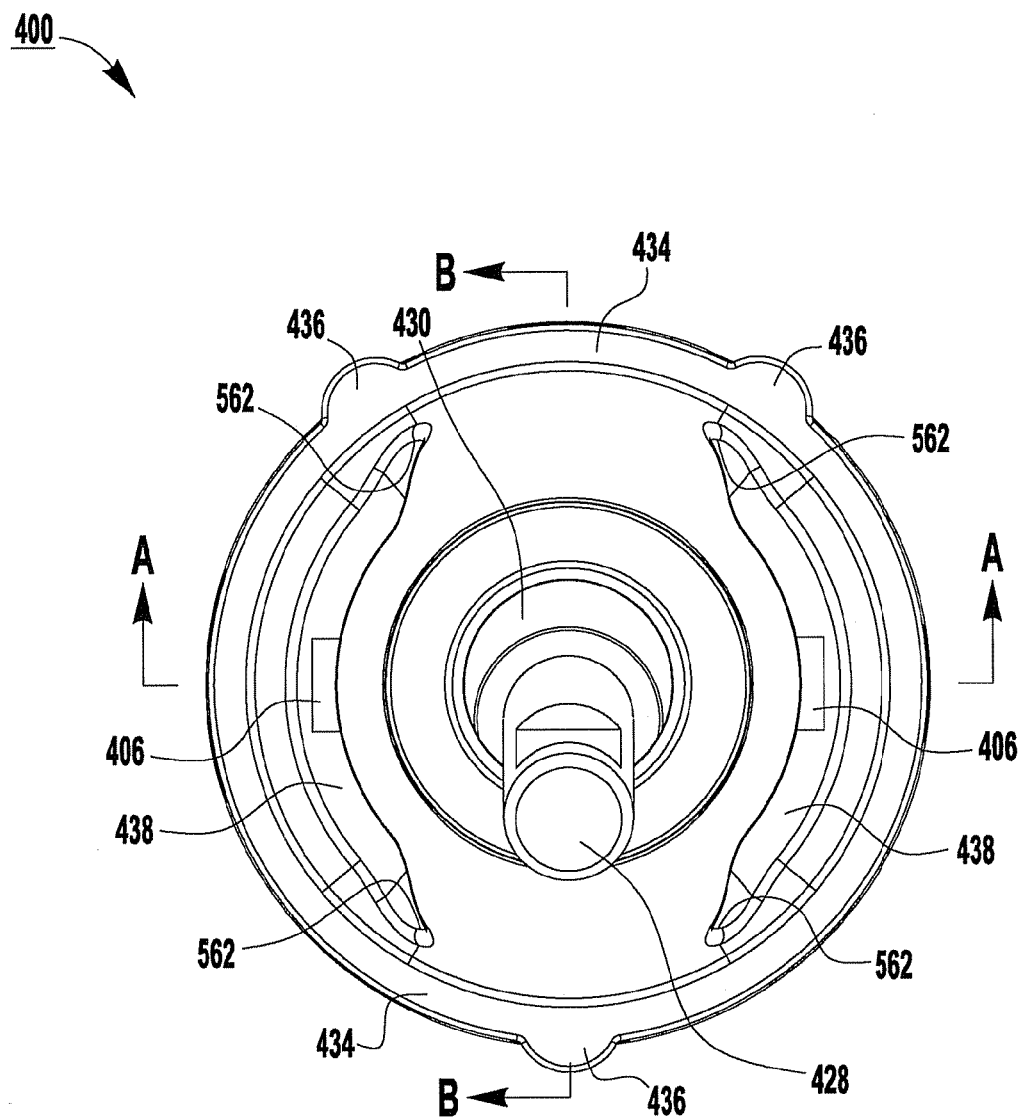
FIGS. 22A-22C show the exemplary valve cartridge of FIG. 12 in assembled form.
Figure 22B:
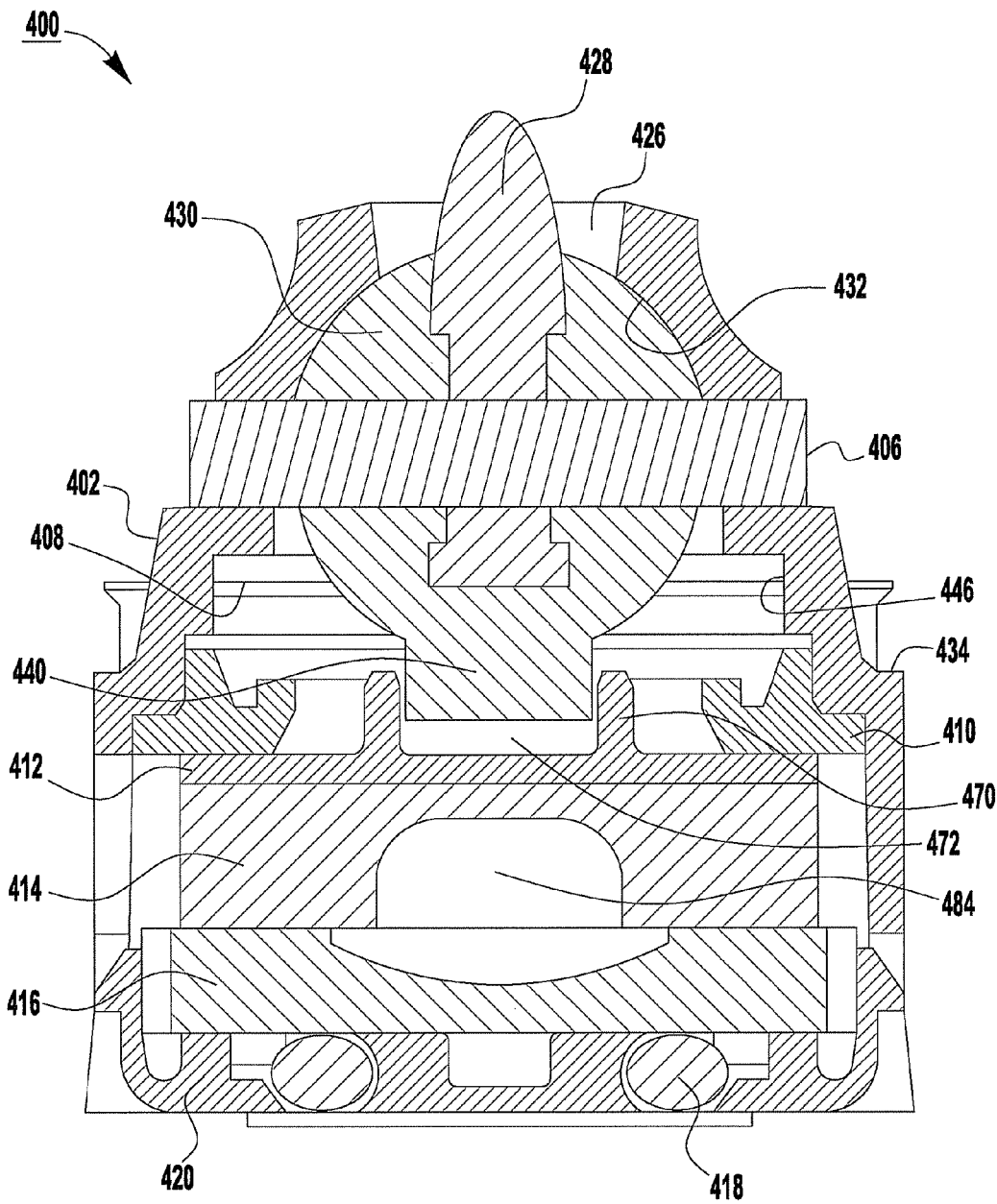
Figure 22C:
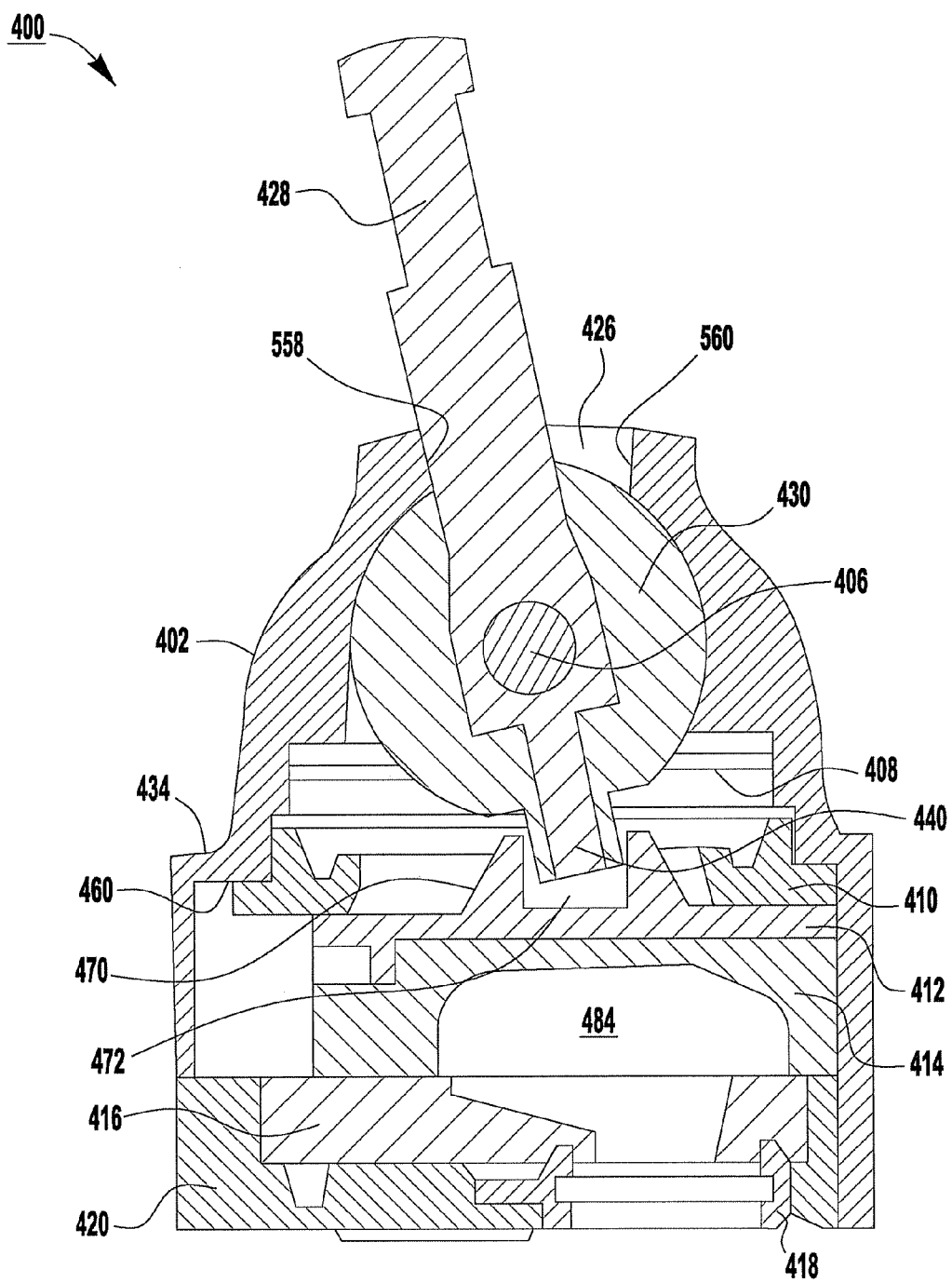

As shown in FIGS. 12 and 22B-22C, the exemplary valve cartridge 400 has several discrete components including an upper housing 402, a ball-stem 404, a pin 406, a spring 408, a bushing 410, a carrier 412, a movable disk 414, a fixed disk 416, a base seal 418 and a lower housing 420. The movable disk 414 and/or the fixed disk 416 can be made of a hard material. For example, the movable disk 414 and/or the fixed disk 416 can be made of ceramic. The upper housing 402, for example, can be made of plastic or metal.

Figure 13A:
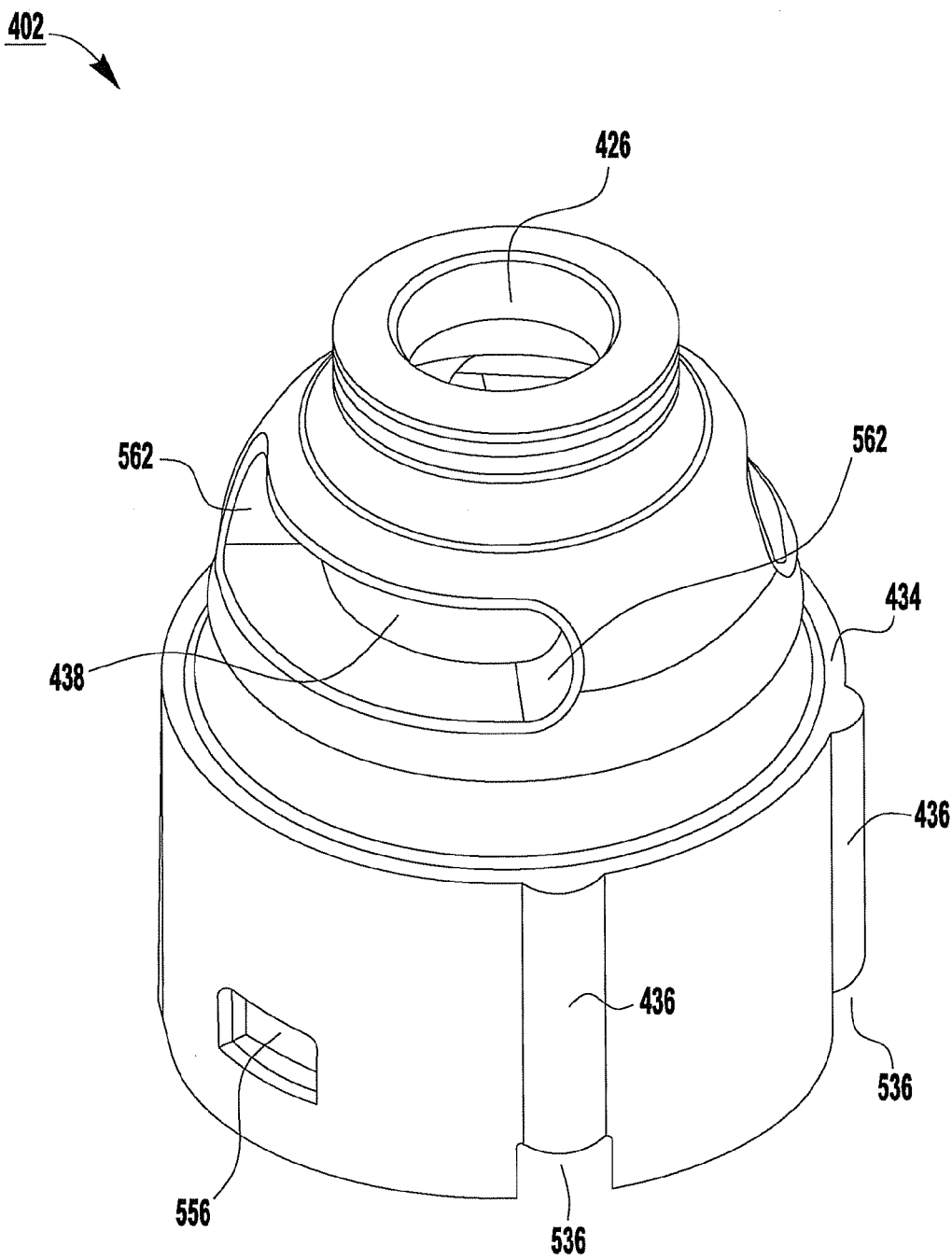
FIGS. 13A-13C show an exemplary upper housing used in the exemplary valve cartridge of FIG. 12.
Figure 13B:
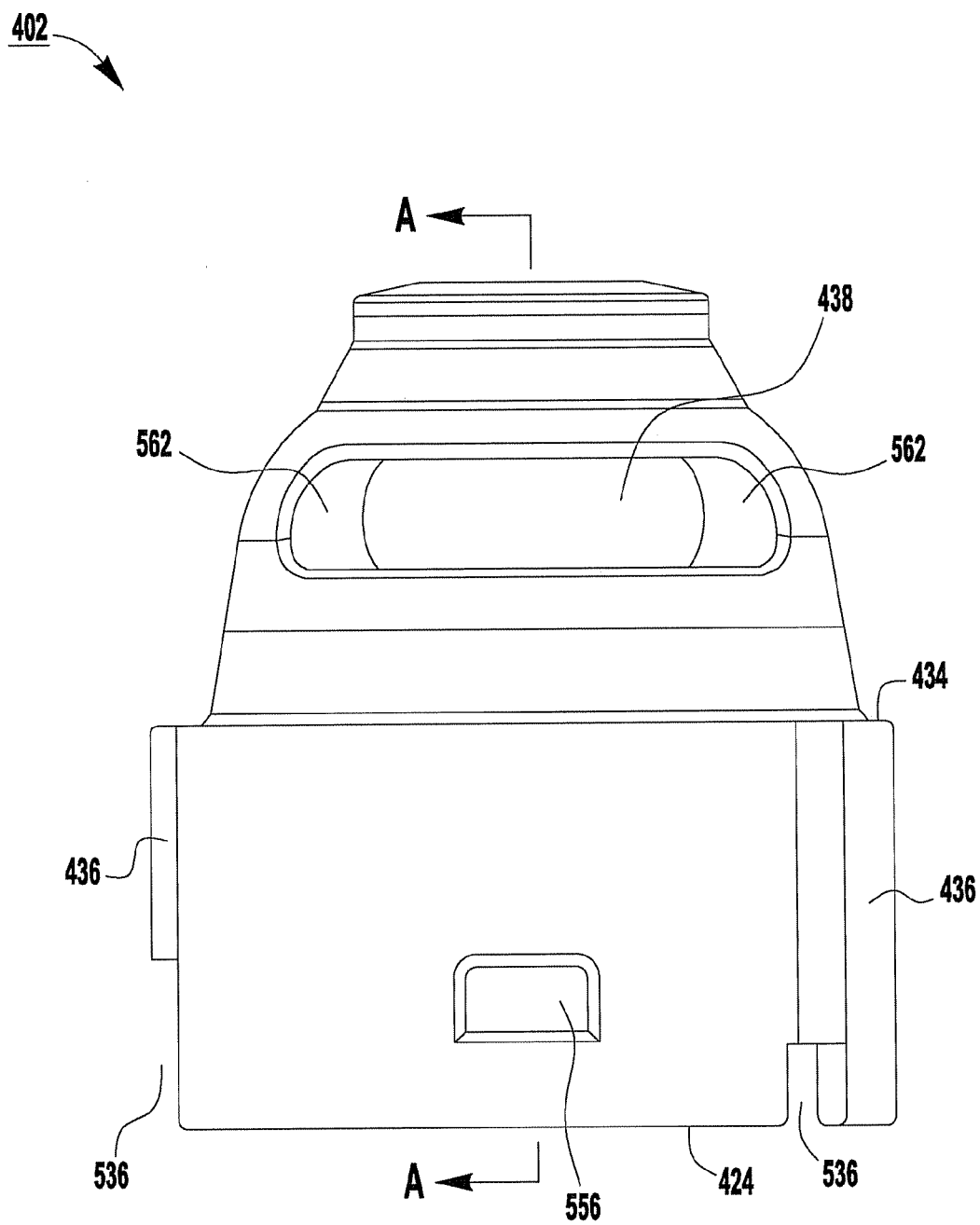
Figure 13C:
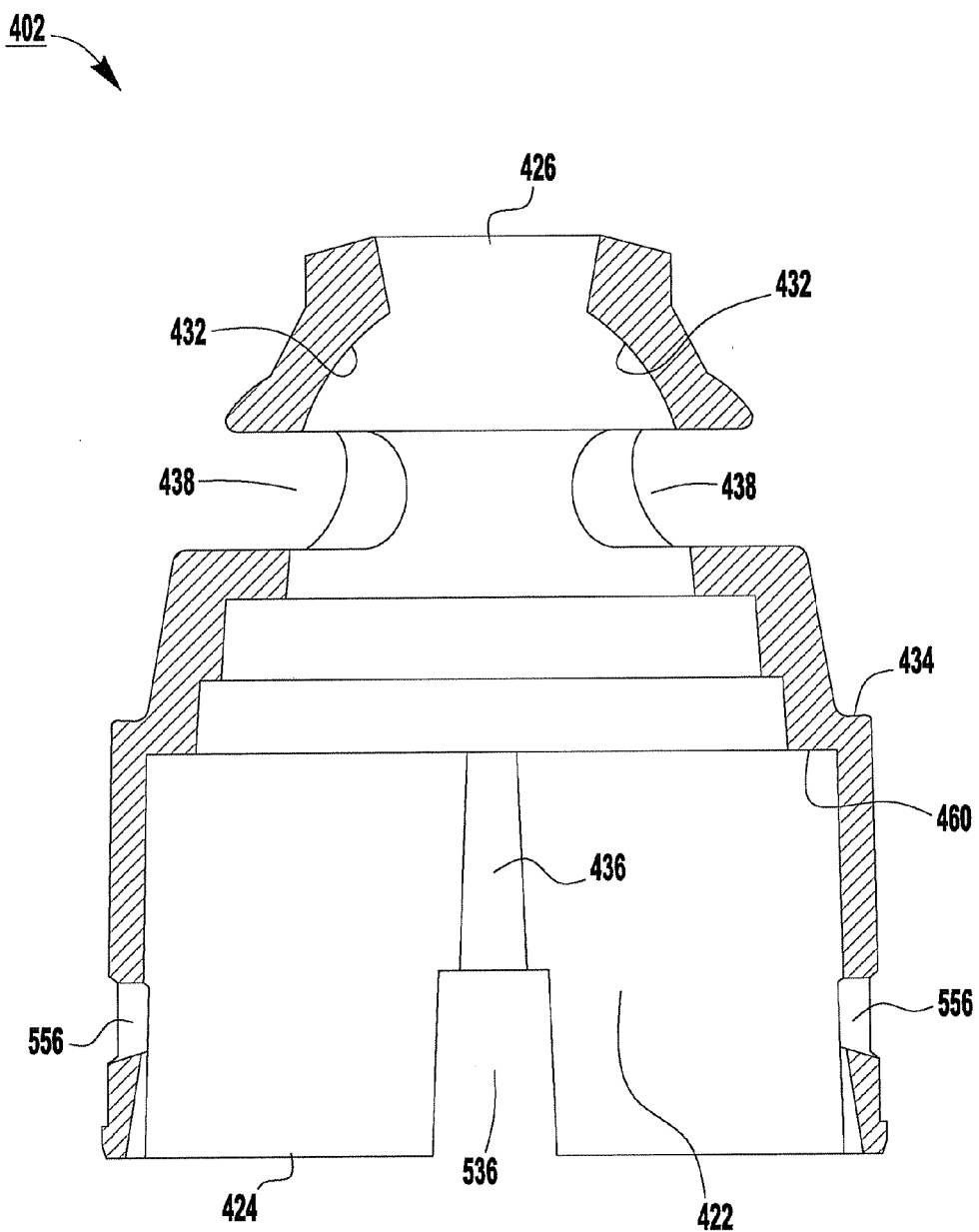

As shown in FIGS. 13A-13C, the upper housing 402 has a cavity 422 formed therein for receiving the remaining components of the valve cartridge 400. The upper housing 402 includes a lower opening 424 through which the components can be inserted into the upper housing 402. The upper housing 402 also includes an upper opening 426 through which a stem portion 428 of the ball-stem 404 extends. The cavity 422 in the upper housing 402 is wider near the lower opening 424 than near the upper opening 426. A portion of the cavity 422 near the upper opening 426 of the upper housing 402 receives a ball portion 430 of the ball-stem 404. Accordingly, a first inner surface 432 of the portion of the cavity 422 near the upper opening 426 has a shape that substantially conforms to a shape of the ball portion 430 of the ball-stem 404 (see FIGS. 13C and 22B).

A portion of the cavity 422 near the lower opening 424 of the upper housing 402 receives the bushing 410, the carrier 412, the movable disk 414, the fixed disk 416 and the base seal 418 (see FIGS. 22B-22C). Furthermore, as described below, the lower housing 420 interfaces with the upper housing 402 to retain these components in the cavity 422 of the upper housing 402 (see FIGS. 22B-22C).

The portion of the cavity 422 near the lower opening 424 of the upper housing 402 forms an installation ledge 434 on an outer surface of the upper housing 402 (see FIGS. 13A-13C and 22A-22C). In one exemplary embodiment, a retention nut (e.g., the retention nut 234 shown in FIG. 11) engages the installation ledge 434 and/or the upper housing 402 above the installation ledge 434 to secure the valve cartridge 400 in a valve body (e.g., the valve body 236 shown in FIG. 11). Furthermore, the upper housing 402 has one or more keys 436 that each engage a complementary-shaped recess in the valve body to prevent rotation of the upper housing 402 relative to the valve body after the valve cartridge 400 is installed. The one or more keys 436 can have a lobular shape. The upper housing 402 also includes a pair of slots 438 formed on opposing sides of the upper housing 402 that interface with distal ends of the pin 406 to function as temperature-limit stops, as described below.

Figure 14:
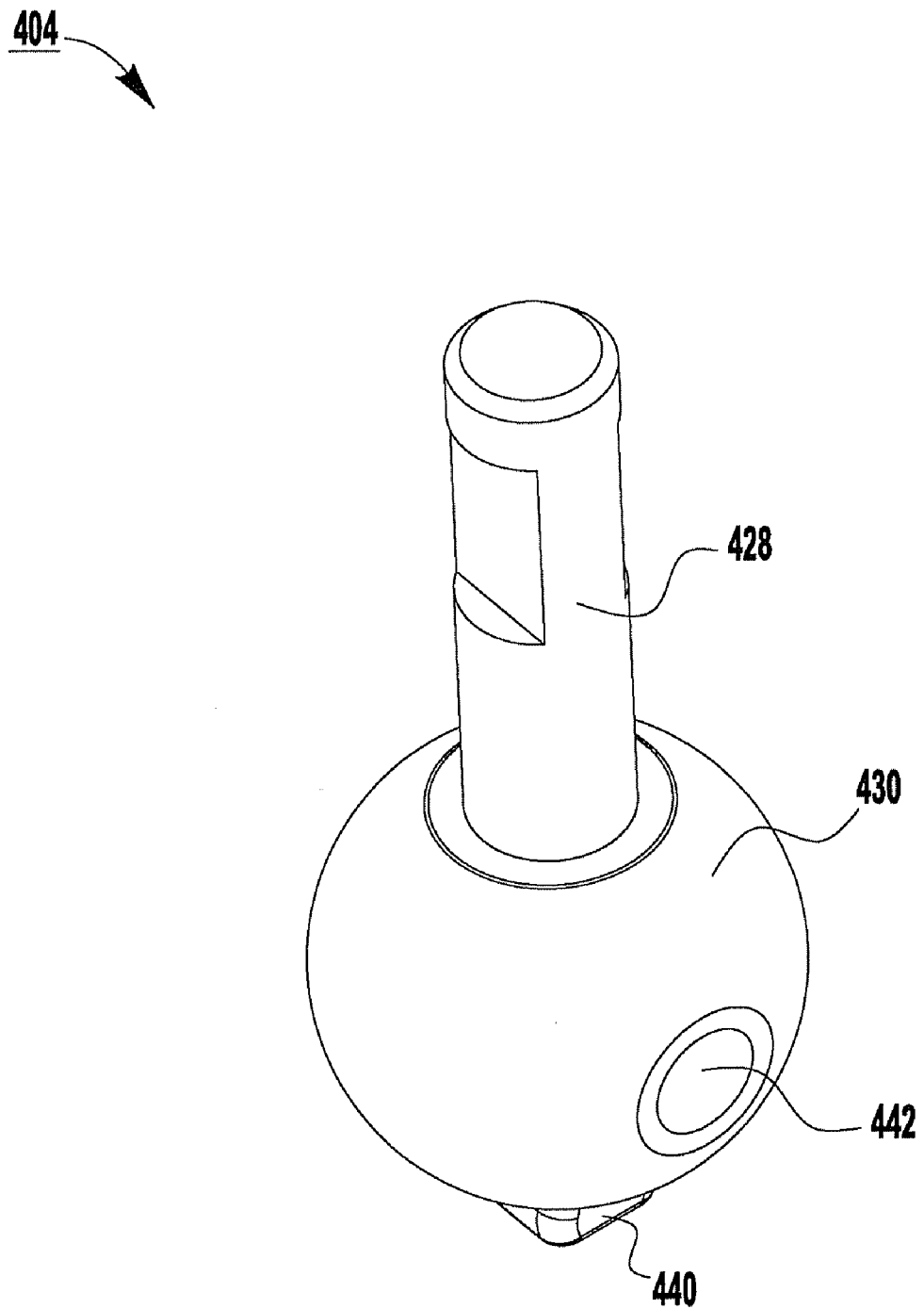
FIG. 14 is a perspective view of an exemplary ball-stem of the exemplary valve cartridge of FIG. 12.

As shown in FIG. 14, the ball-stem 404 is the actuating mechanism for the valve cartridge 400. The ball-stem 404 includes the ball portion 430 and the stem portion 428. The ball portion 430 and the stem portion 428 can be discrete components or can be formed integrally. The ball portion 430 includes a projection 440 extending from a side of the ball portion 430 that is opposite a side of the ball portion 430 from which the stem portion 428 extends. The projection 440 acts as a coupling device for connecting the ball-stem 404 to the carrier 412, as described below. The ball portion 430 and the projection 440 can be discrete components or can be formed integrally.

A bore 442 is formed through a center of the ball portion 430 of the ball-stem 404. The bore 442 is orthogonal to the stem portion 428 of the ball-stem 404. After the ball-stem 404 is inserted into the cavity 422 of the upper housing 402, the pin 406 can be inserted through one of the slots 438 in the upper housing 402 and into the bore 442 of the ball-stem 404. In this manner, the pin 406 retains the ball-stem 404 in the upper housing 402.

Figure 15A:
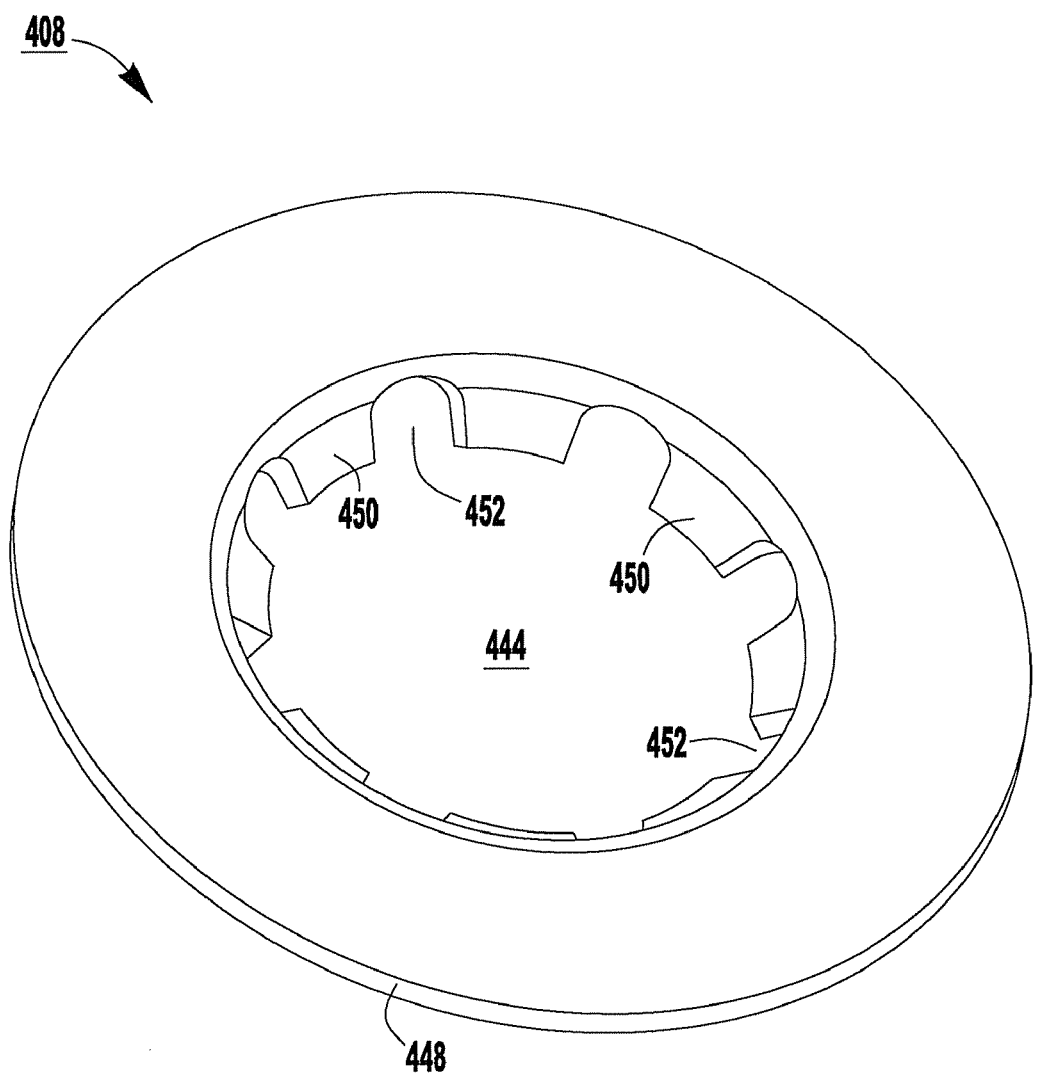
FIGS. 15A-15C show an exemplary spring used in the exemplary valve cartridge of FIG. 12.
Figure 15B:
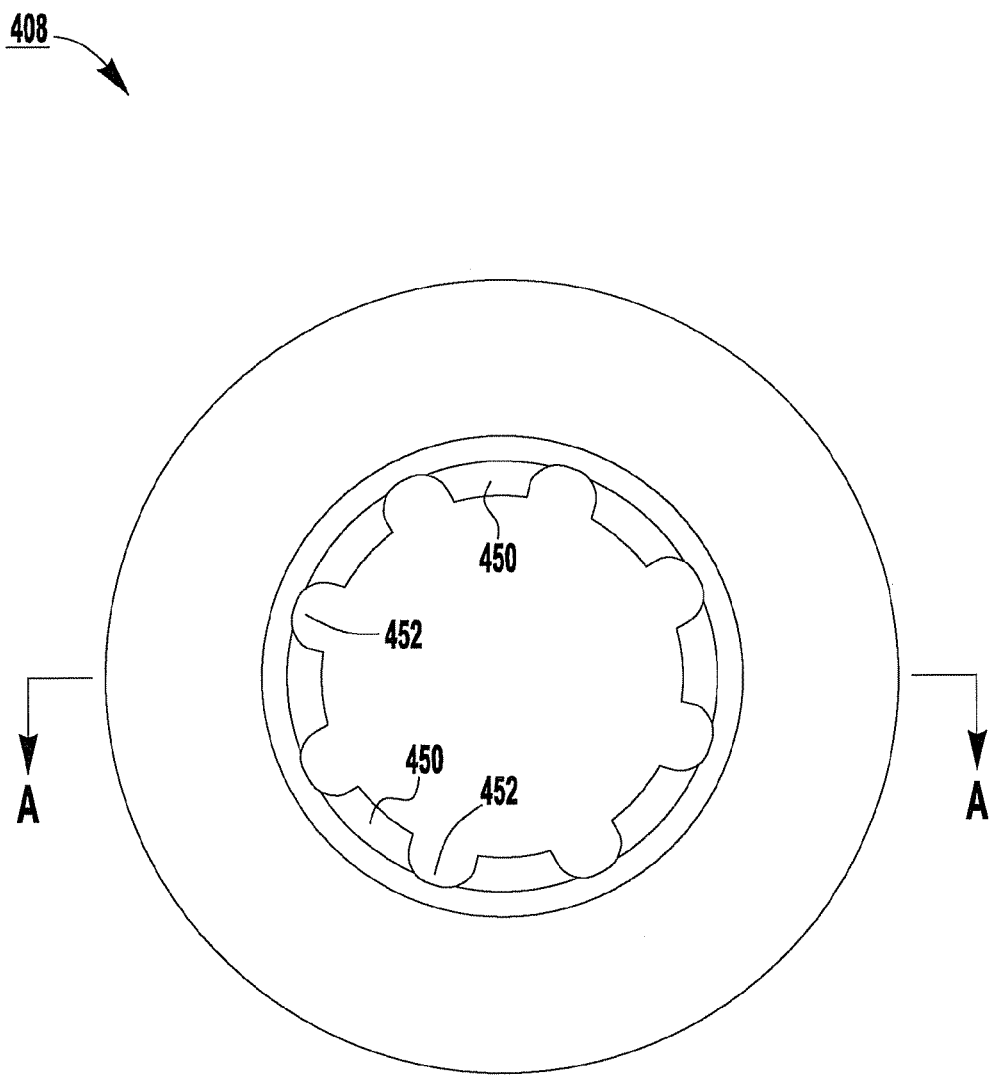
Figure 15C:
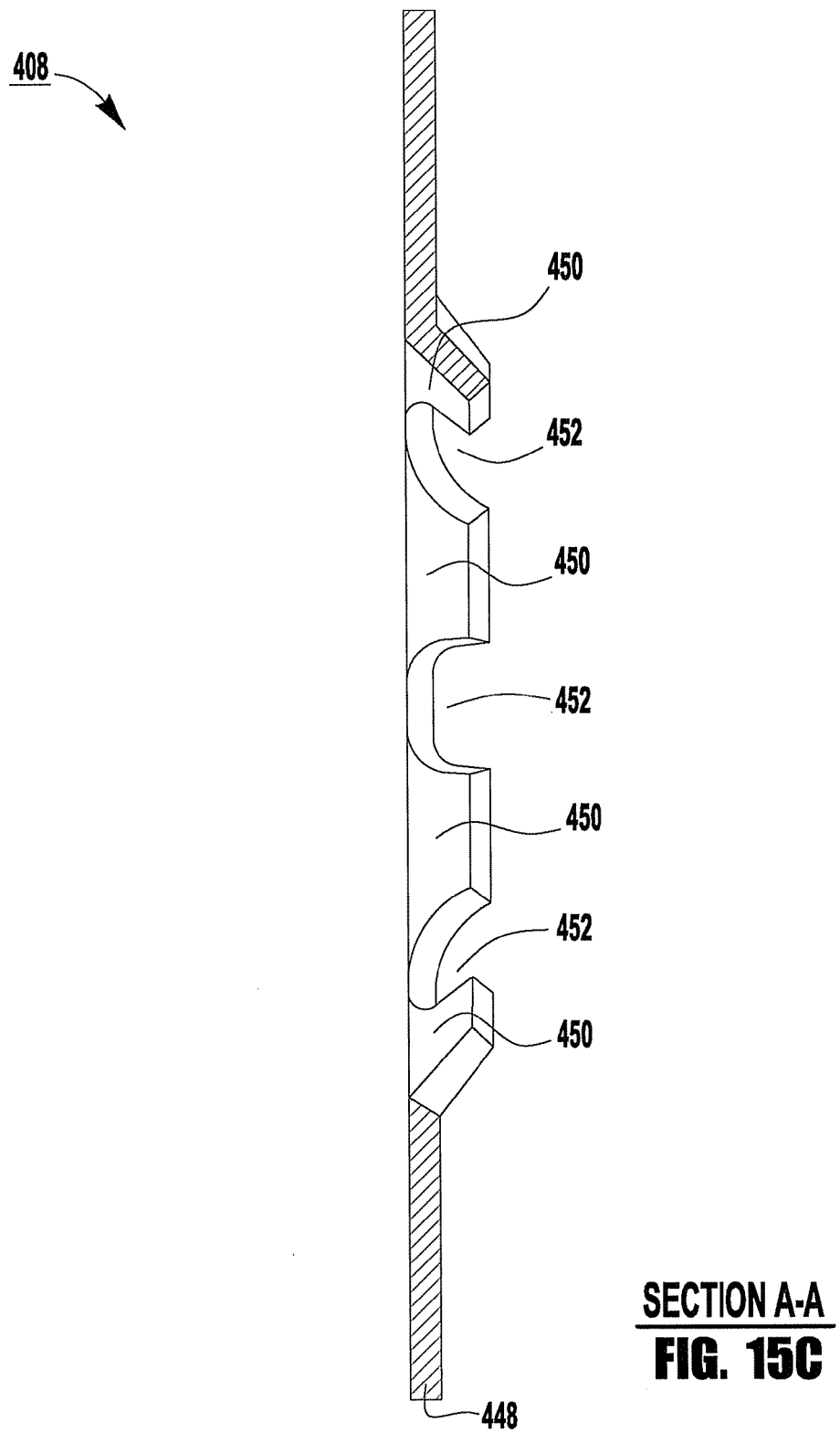

As shown in FIGS. 15A-15C, the spring 408 has an annular shape with a central opening 444. The spring 408 is disposed below the ball portion 430 of the ball-stem 404 in the upper housing 402 (see FIGS. 22B-22C). The spring 408 is connected to a second inner surface 446 of the upper housing 402 (e.g., by or through threading, friction fitting, snap fitting, welding), such that the spring 408 also retains the ball-stem 404 in the upper housing 402 (see FIGS. 13D and 22B). In one exemplary embodiment, at least a portion of an outer periphery 448 of the spring 408 is welded to the second inner surface 446 of the upper housing 402. In another exemplary embodiment, separate structure (e.g., an annular plate) is connected to the second inner surface 248 of the housing 202 to hold the spring 208 in place against the ball portion 430 of the ball-stem 404.

The projection 440 of the ball-stem 404 extends through the central opening 444 in the spring 408. Some of the ball portion 430 of the ball-stem 404 can also extend through the central opening 444 in the spring 408. The spring 408 includes a plurality of elastic flanges 450 surrounding the central opening 444. The elastic flanges 450 are spaced apart from one another such that gaps 452 are formed between the elastic flanges 450. The elastic flanges 450 of the spring 408 contact the ball portion 430 of the ball-stem 404 and urge the ball portion 430 of the ball-stem 404 against the complementary-shaped first inner surface 432 of the upper housing 402. The gaps 452, for example, function to reduce the stress placed on the spring 408 from engaging the ball-stem 404.

It will be appreciated that notwithstanding the exemplary embodiments described herein, the general inventive concept encompasses any structure within the valve cartridge 400 that separates an actuating mechanism (e.g., the ball-stem 404) from other components within the valve cartridge (e.g., the carrier, 412, the movable disk 414 and the fixed disk 416) and/or exerts a preloading force on the actuating mechanism.

In the exemplary embodiment disclosed above, the structure is a resilient member (i.e., the spring 408) disposed below the actuating mechanism (i.e., the ball-stem 404) having a predetermined resiliency. The resilient member separates the actuating mechanism from the movable disk 414 and the fixed disk 416 and exerts an upward force on the actuating mechanism. Furthermore, the force exerted by the resilient member on the actuating mechanism is uniform at points of contact between the resilient member and the actuating mechanism.

Notwithstanding the exemplary embodiment disclosed above, other structures that separate the actuating mechanism from other components within the valve cartridge and/or exert a preloading force on the actuating mechanism are contemplated. For example, in an alternative embodiment, the structure(s) can be a plate and/or an O-ring. The plate is disposed below the actuating mechanism, such that the plate separates the actuating mechanism from the other components in the valve cartridge 400, and/or the O-ring is disposed above the actuating mechanism (and compressed between the actuating mechanism and the housing), such that the O-ring exerts a preloading force on the actuating mechanism.

Figure 16A:
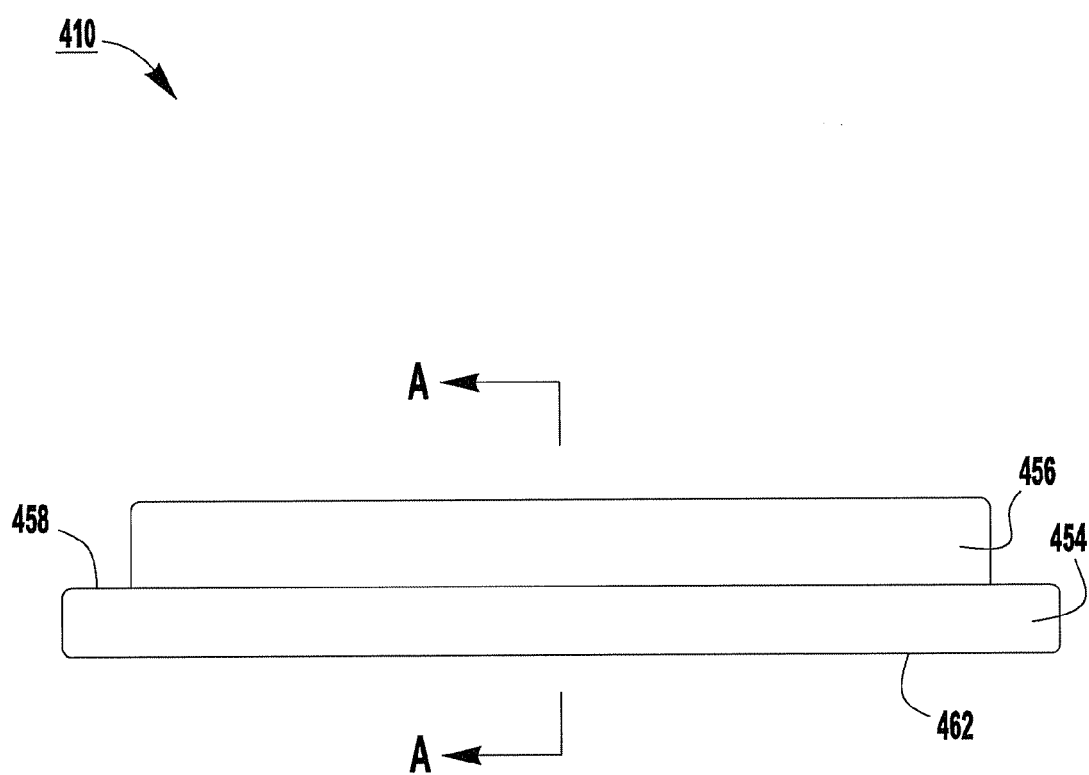
FIGS. 16A-16C show an exemplary bushing used in the exemplary valve cartridge of FIG. 12.
Figure 16B:
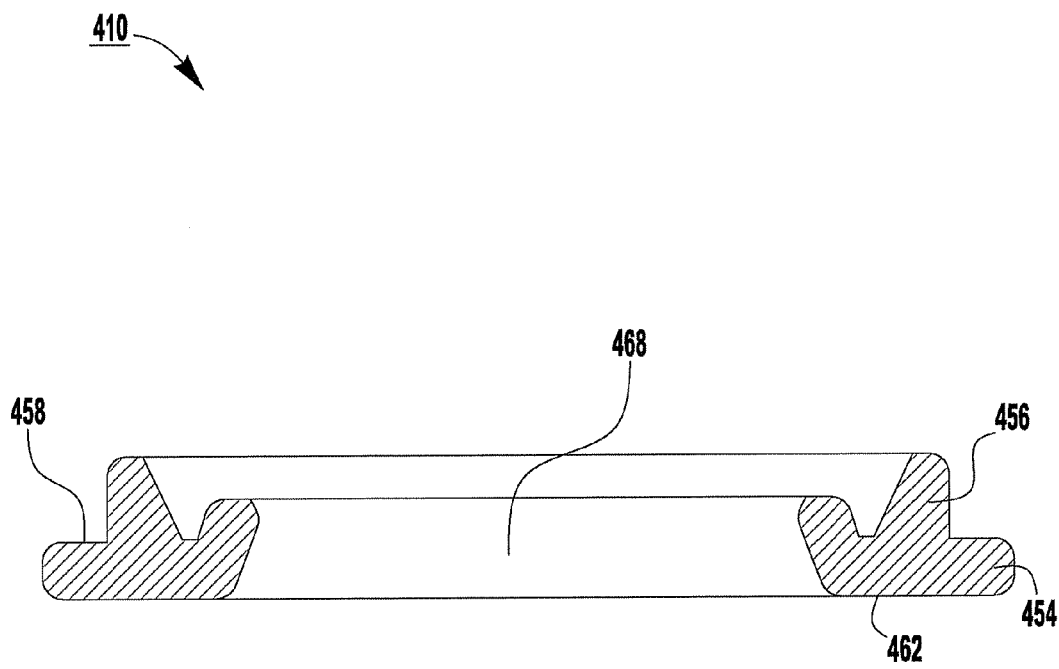
Figure 16C:
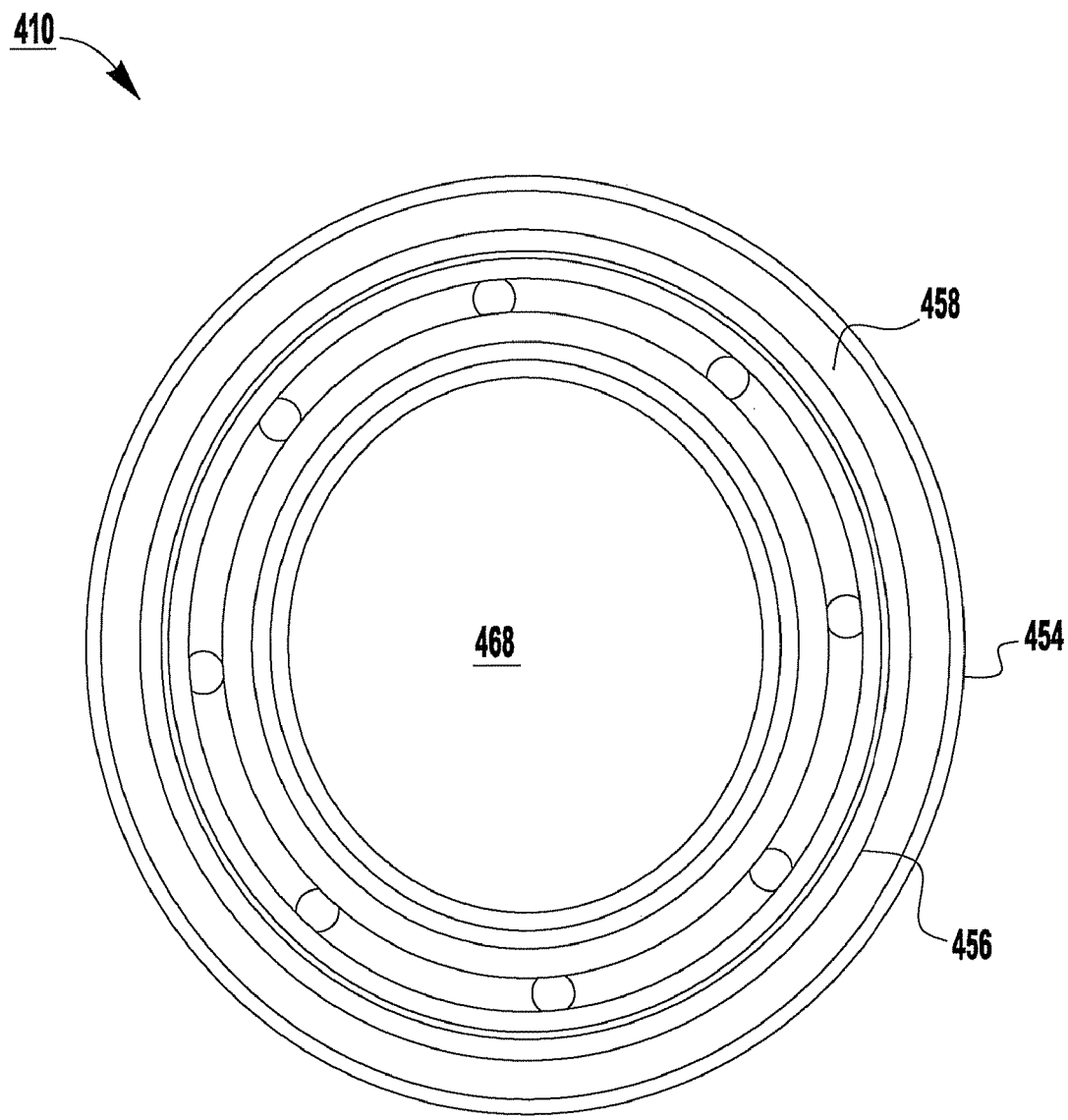
Figure 17A:
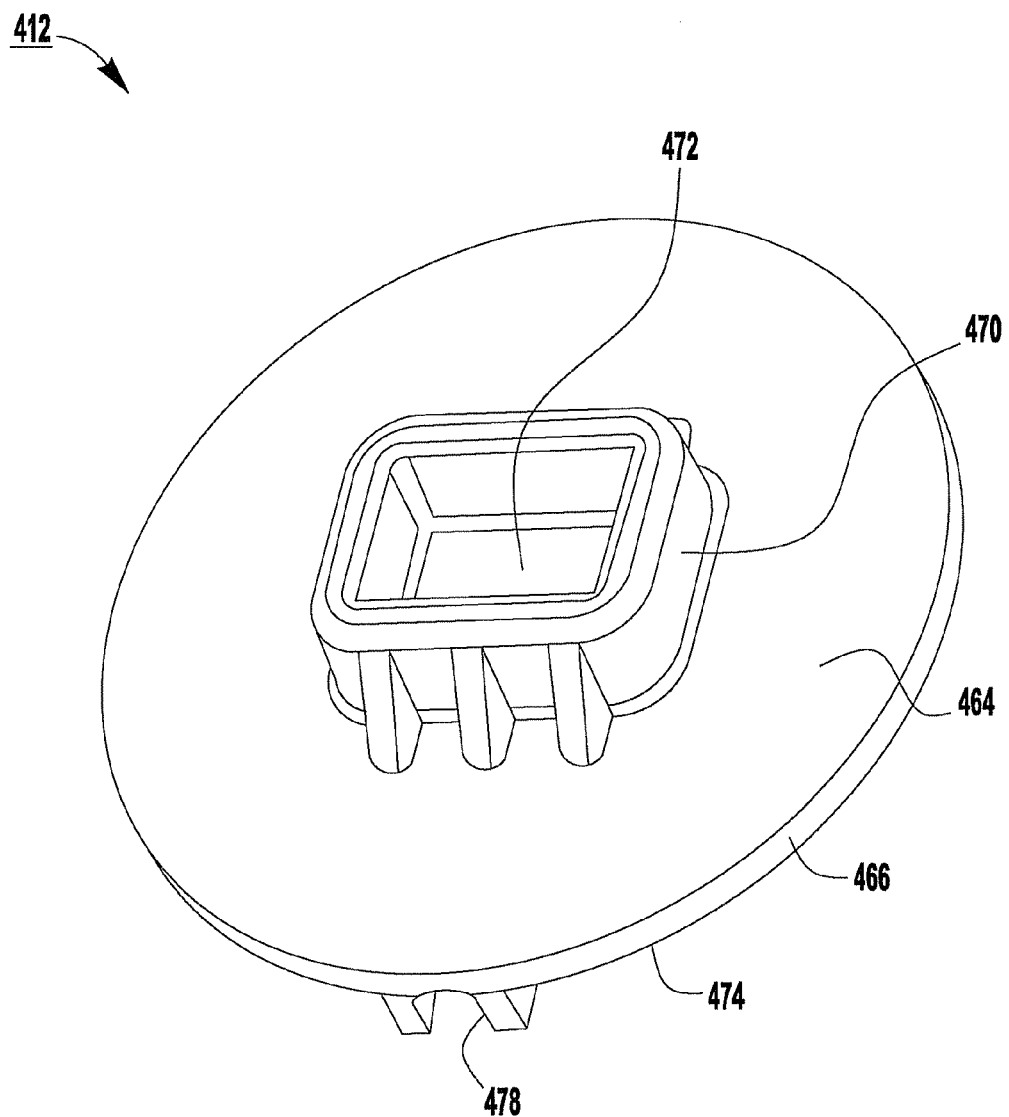
FIGS. 17A-17D show an exemplary carrier used in the exemplary valve cartridge of FIG. 12.
Figure 17B:
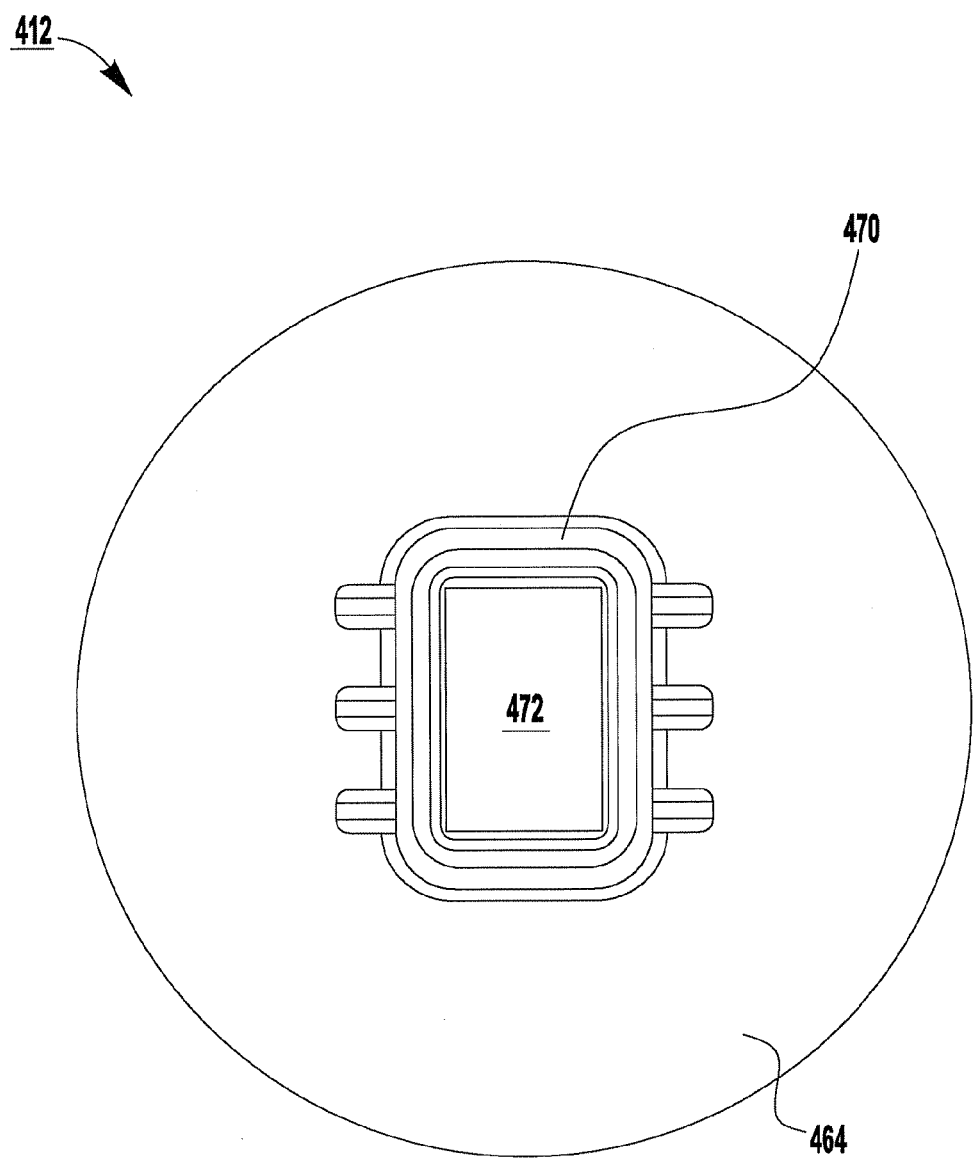
Figure 17C:
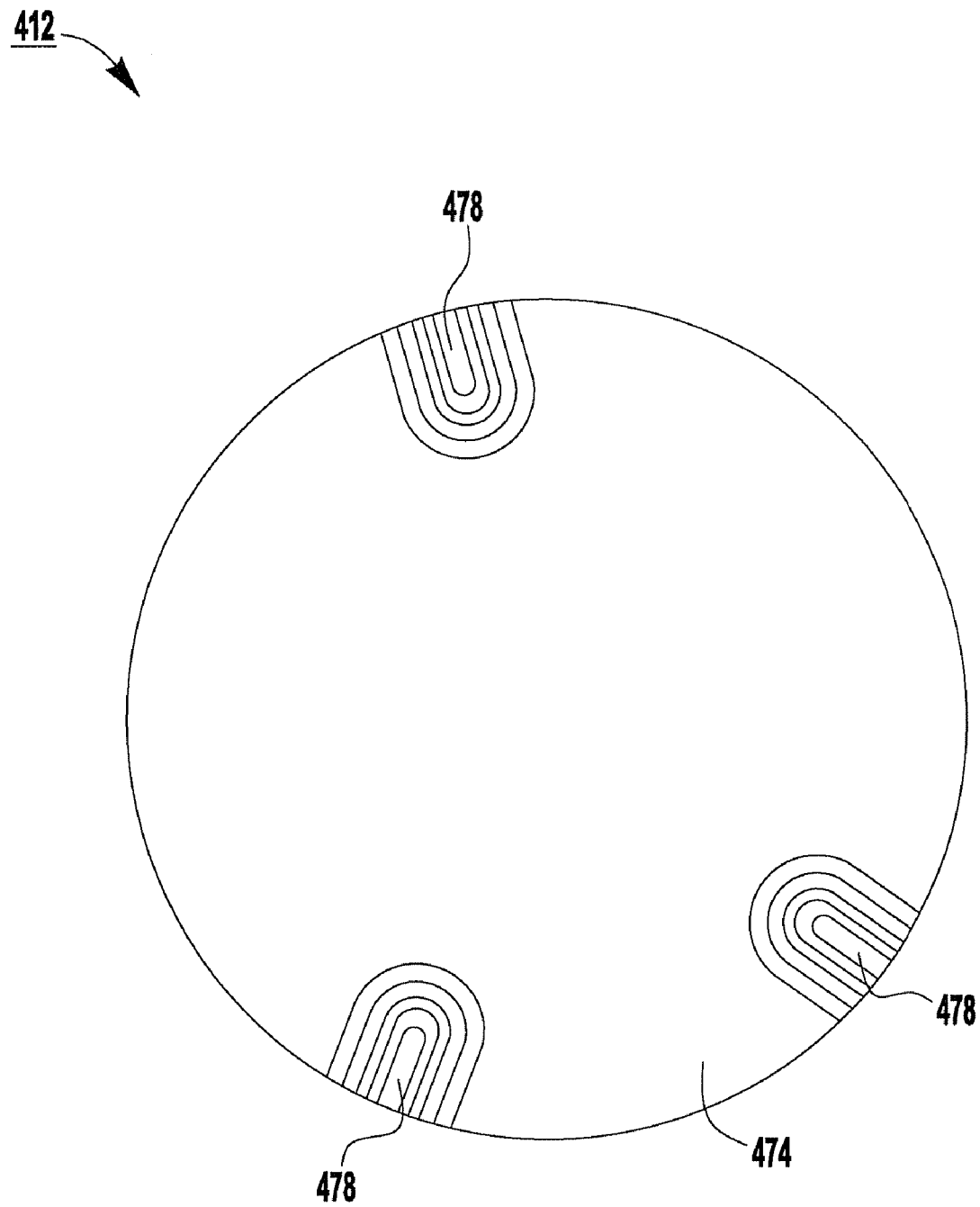
Figure 17D:
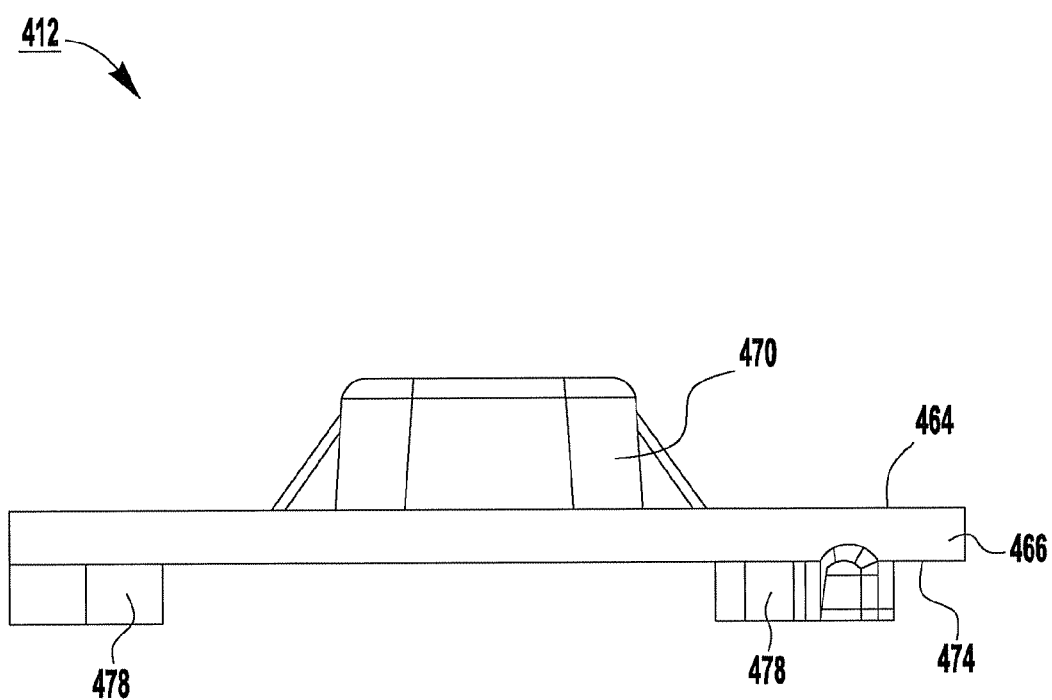

As shown in FIGS. 16A-16C, the bushing 410 includes a flat annular portion 454 and a raised annular portion 456. A diameter of the flat annular portion 454 is greater than a diameter of the raised annular portion 456. The bushing 410 is disposed below and can be spaced apart from the spring 408 in the cavity 422 of the upper housing 402 (see FIGS. 22B-22C). An upper surface 458 of the flat annular portion 454 of the bushing 410 contacts a third inner surface 460 of the upper housing 402, which is located below the installation ledge 434 (see FIGS. 13C and 22C). A lower surface 462 of the flat annular portion 454 of the bushing 410 rests on an upper surface 464 of a flat portion 466 of the carrier 412 (see FIGS. 17A-17B, 17D and 22B-22C). Additionally, the raised annular portion 456 of the bushing 410 extends into a portion of the cavity 422 of the upper housing 402 immediately above (and adjacent to) the installation ledge 434. The raised annular portion 456 of the bushing 410 is sized to fit closely in that portion of the cavity 422 of the upper housing 402 receiving the raised annular portion 456 of the bushing 410. Accordingly, the bushing 410 provides a support surface between the upper housing 402 and the carrier 412.

The bushing 410 has an opening 468 that extends through the flat annular portion 454 and the raised annular portion 456 of the bushing 410. A raised portion 470 of the carrier 412 extends into the opening 468 of the bushing 410 (see FIGS. 17A-17B and 17D). Additionally, a coupling recess 472 is formed in the raised portion 470 of the carrier 412. After the carrier 412 is installed in the valve cartridge 400, the raised portion 470 including the coupling recess 472 is positioned within the opening 468 of the bushing 410 and surrounded by the bushing 410 (see FIGS. 22B-22C).

The coupling recess 472 of the carrier 412 receives the projection 440 of the ball-stem 404, thereby connecting the actuating mechanism (i.e., the ball-stem 404) and the carrier 412 (see FIGS. 22B-22C). The projection 440 of the ball-stem 404 can have four sides that contact four corresponding sides of the coupling recess 472. The projection 440 of the ball-stem 404 does not contact a bottom surface of the coupling recess 472. It will be appreciated that notwithstanding the exemplary embodiments described herein, the ball-stem 404 can be connected to the carrier 412 in any suitable manner that allows the ball-stem 404 to impart translational and angular movement to the carrier 412.

As shown in FIGS. 17A-17D, the carrier 412 includes the flat portion 466 and the raised portion 470. A lower surface 474 of the flat portion 466 of the carrier 412 includes structure for interfacing with an upper surface 476 of the movable disk 414, such that the carrier 412 and the movable disk 414 are joined and do not move relative to one another. In one exemplary embodiment, the lower surface 474 of the carrier 412 includes three U-shaped projections 478 that friction fit into three corresponding U-shaped recesses 480 formed in the upper surface 476 of the movable disk 414. The spacing between adjacent U-shaped projections 478 (and, thus, the corresponding U-shaped recesses 480) can be varied so that the carrier 412 will only interface with the movable disk 414 in one orientation. Furthermore, as noted above, the carrier 412 also includes the coupling recess 472, which is formed in the raised portion 470 of the carrier 412. In this manner, the carrier 412 functions to interconnect the actuating mechanism (e.g., the ball-stem 404) and the dynamic sealing elements (e.g., the movable disk 414), in the valve cartridge 400.

Figure 18A:
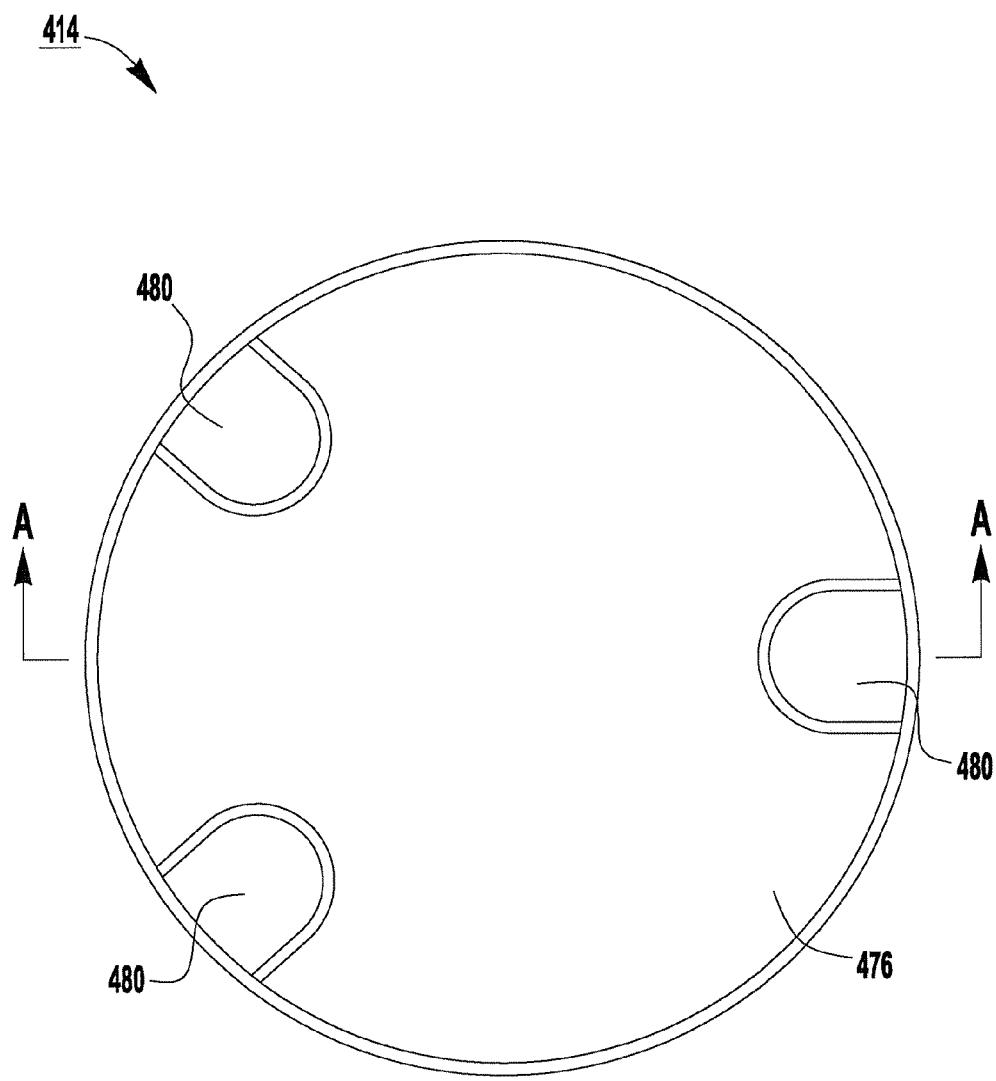
FIGS. 18A-18C show an exemplary movable disk used in the exemplary valve cartridge of FIG. 12.
Figure 18B:
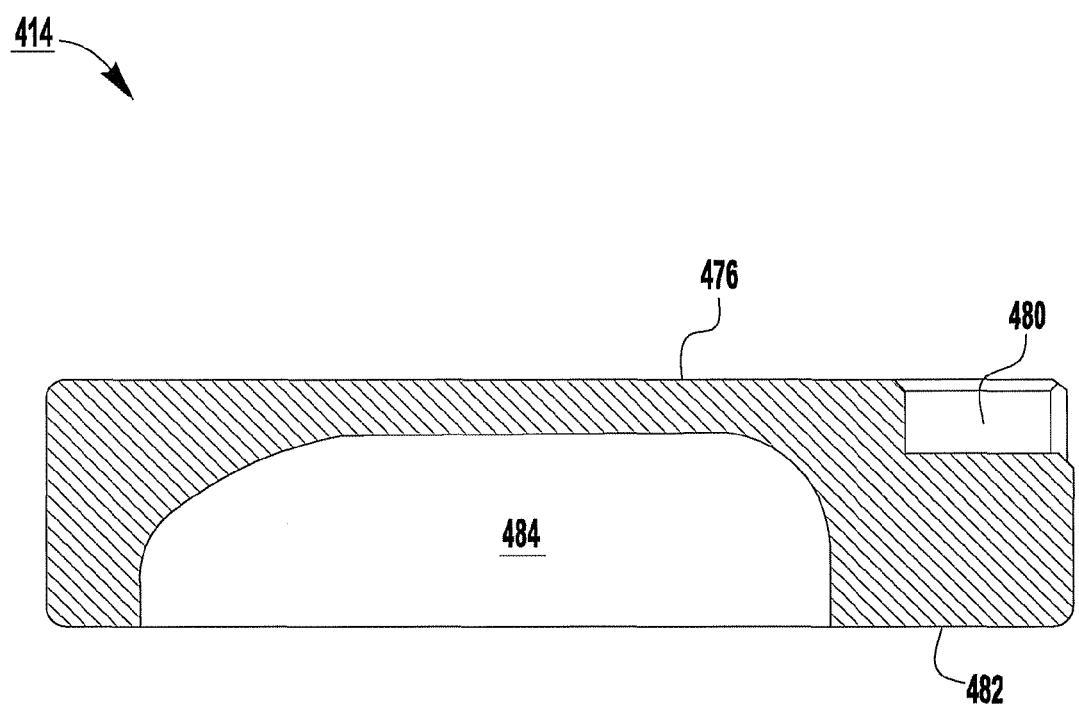
Figure 18C:
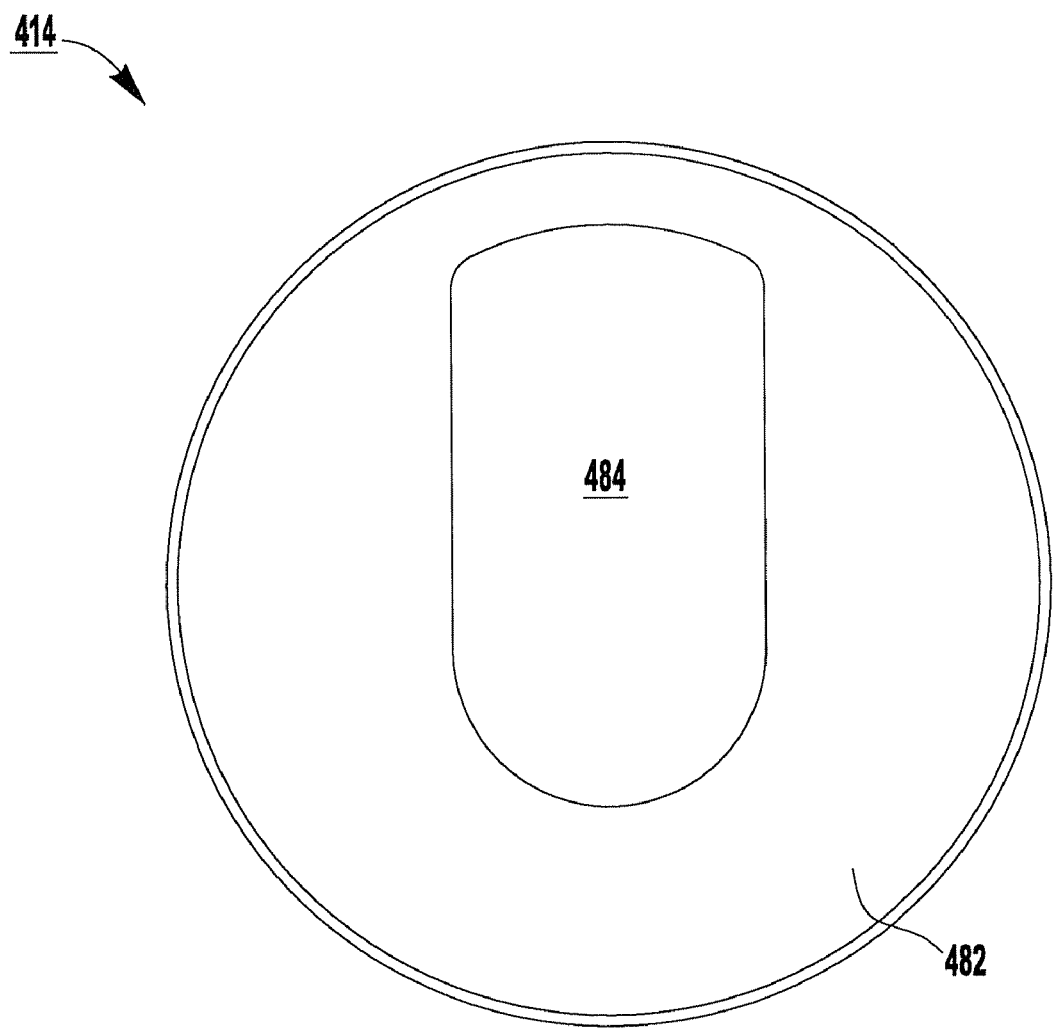
Figure 19A:
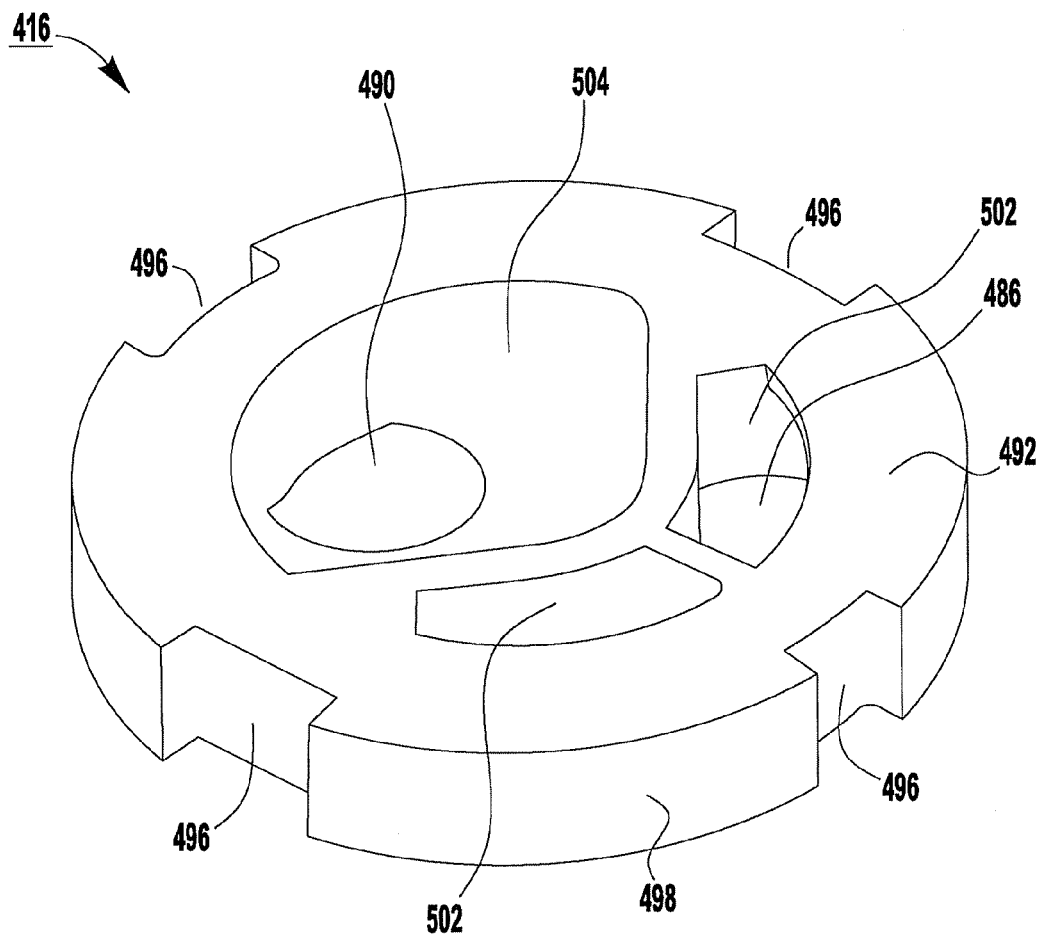
FIGS. 19A-19D show an exemplary fixed disk used in the exemplary valve cartridge of FIG. 12.
Figure 19B:
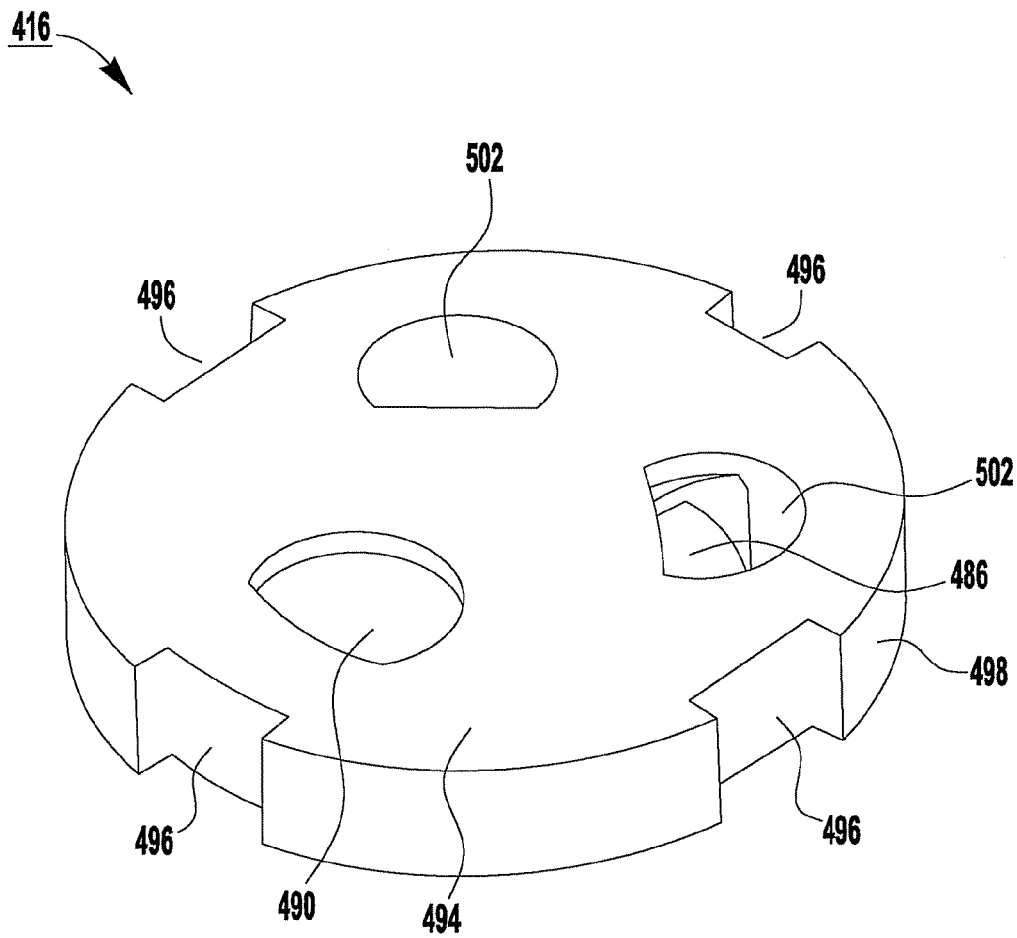
Figure 19C:
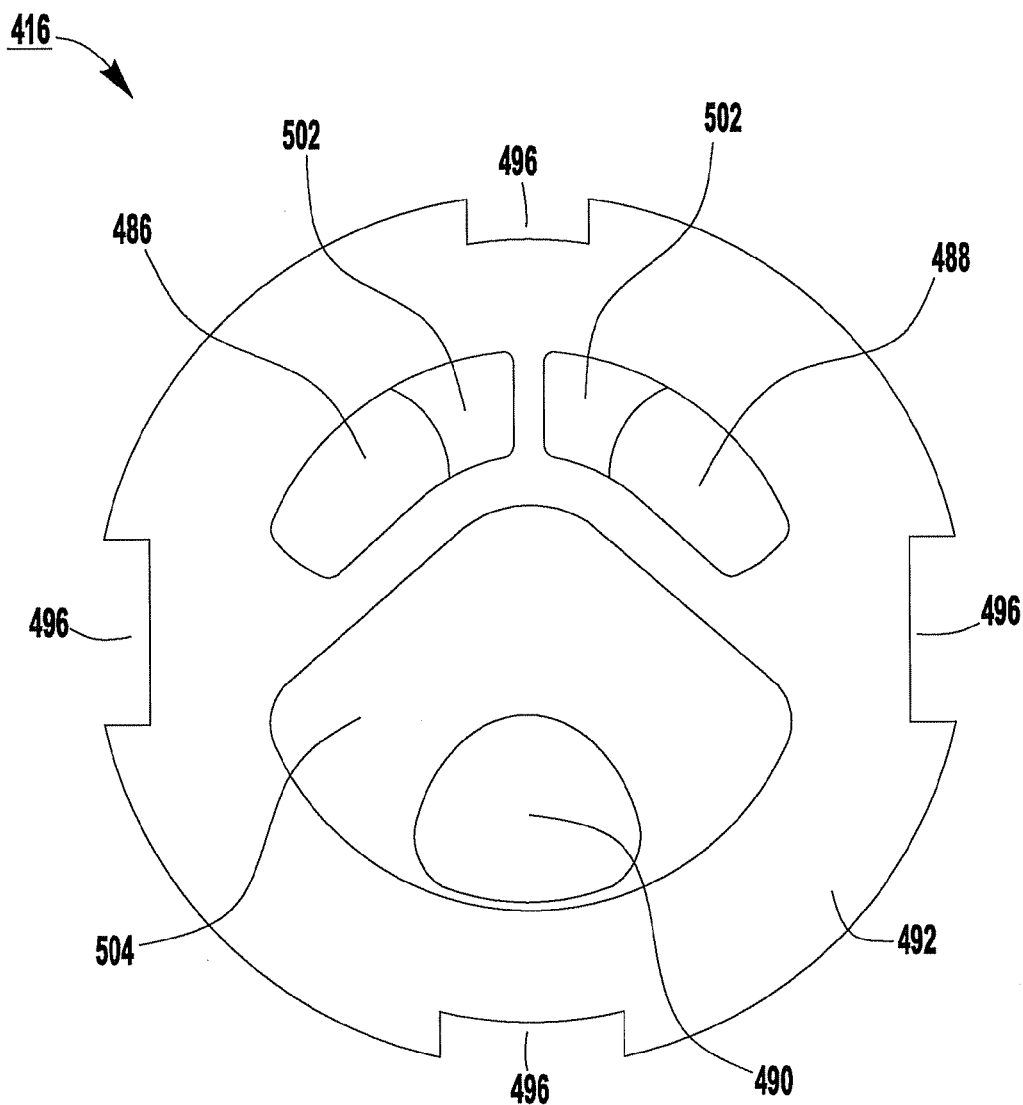
Figure 19D:
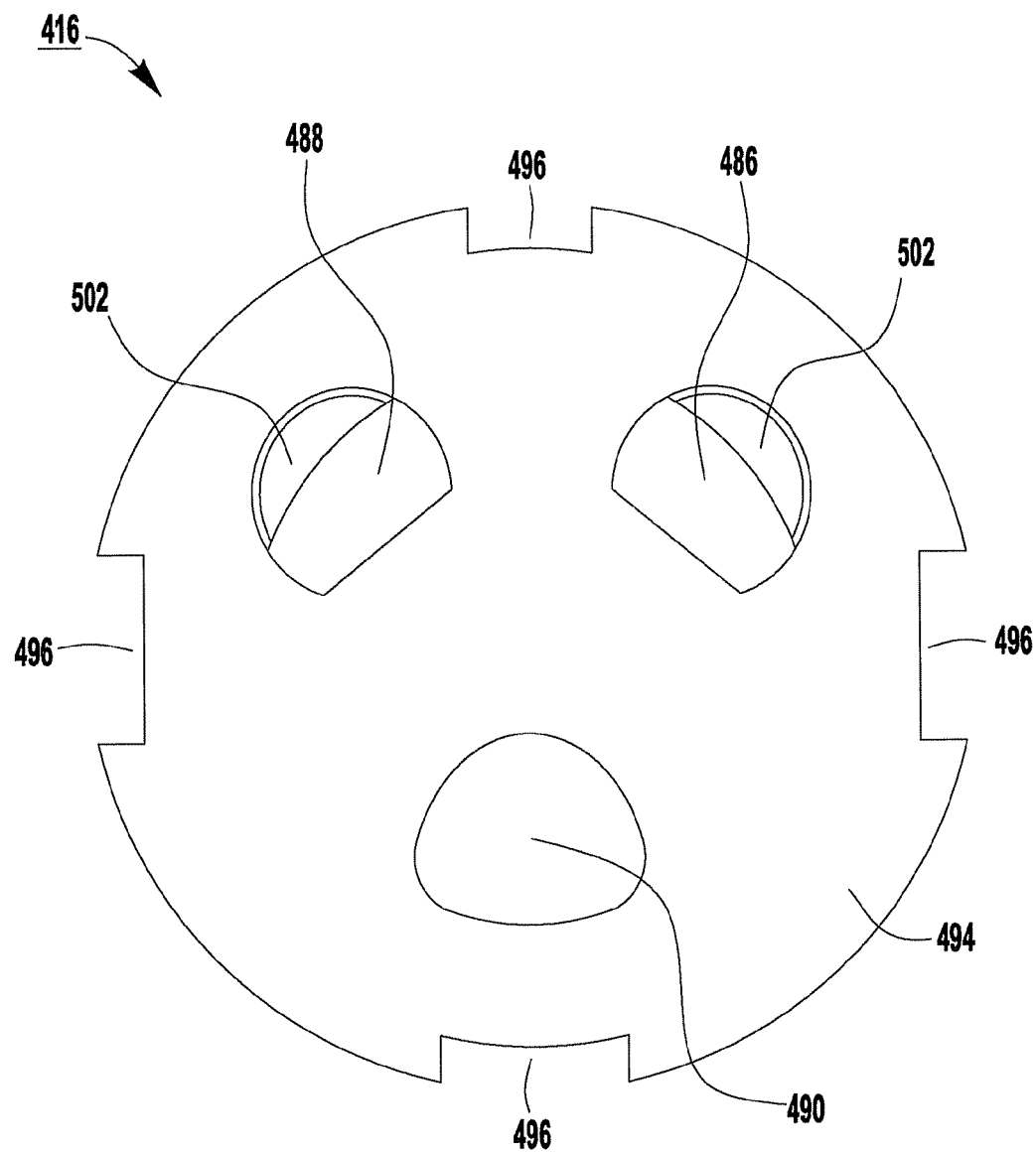

As shown in FIGS. 18A-18C, the movable disk 414 is a valve member formed as a plate, disk or the like that is movable relative to the upper housing 402. As noted above, the upper surface 476 of the movable disk 414 includes the U-shaped recesses 480. The upper surface 476 is substantially flat. A lower surface 482 of the movable disk 414 includes a mixing chamber 484 (i.e., a cavity formed in the movable disk 414). In an alternative exemplary embodiment, the mixing chamber 484 extends through the movable disk 414 (i.e., from the lower surface 482 to the upper surface 476). The lower surface 482 is substantially flat. The lower surface 482 of the movable disk 414 forms a sealing surface that can cover and uncover water inlet apertures 486 and 488 in the fixed disk 416 to allow only cold water, only hot water or both cold and hot water to flow through the fixed disk 416. The water flowing through the water inlet apertures 486 and 488 in the fixed disk 416 enters the mixing chamber 484 where the cold and hot water mix prior to being discharged through a water outlet aperture 490 in the fixed disk 416.

As shown in FIGS. 19A-19D, the fixed disk 416 is a valve member formed as a plate, disk or the like that is fixed relative to the upper housing 402. The fixed disk 416 has an upper surface 492 and a lower surface 494. The fixed disk 416 includes structure for interfacing with the lower housing 420 to fix (i.e., prevent rotation) of the fixed disk 416 relative to the upper housing 402 once the valve cartridge 400 is assembled. For example, four notches 496 are formed along a periphery 498 of the fixed disk 416. One or more notches 496 engage corresponding projections 500 formed on the lower housing 420, thereby preventing the fixed disk 416 from rotating relative to the lower housing 420. In one exemplary embodiment, two notches 496 engage corresponding projections 500. By varying the size of and/or the spacing between the notches 496 (and, thus, the corresponding projections 500), it is possible to insure that the fixed disk 416 will interface with the lower housing 420 in only one orientation. Thus, because the fixed disk 416 is prevented from rotating relative to the lower housing 420 and the lower housing 420 is secured to the upper housing 402, as described below, the fixed disk 416 will not rotate within the upper housing 402.

The fixed disk 416 includes the water inlet apertures 486 and 488, which correspond to a cold water inlet aperture and a hot water inlet aperture, respectively. The fixed disk 416 also includes the water outlet aperture 490 through which cold water flowing through the cold water inlet aperture 486, hot water flowing through the hot water inlet aperture 488 or a mixture of the cold and hot water can flow to a water outlet passage of the valve body. The cold water inlet aperture 486 and the hot water inlet aperture 488 of the fixed disk 416 each have walls 502 that slope from near the lower surface 494 of the fixed disk 416 to near the upper surface 492 of the fixed disk 416 to improve the flow of water through the fixed disk 416 and into the valve cartridge 400. The water outlet aperture 490 of the fixed disk 416 has walls 504 that slope from near the upper surface 492 of the fixed disk 416 to near the lower surface 494 of the fixed disk 416 to improve the flow of water through the fixed disk 416 and out of the valve cartridge 400.

Figure 20A:
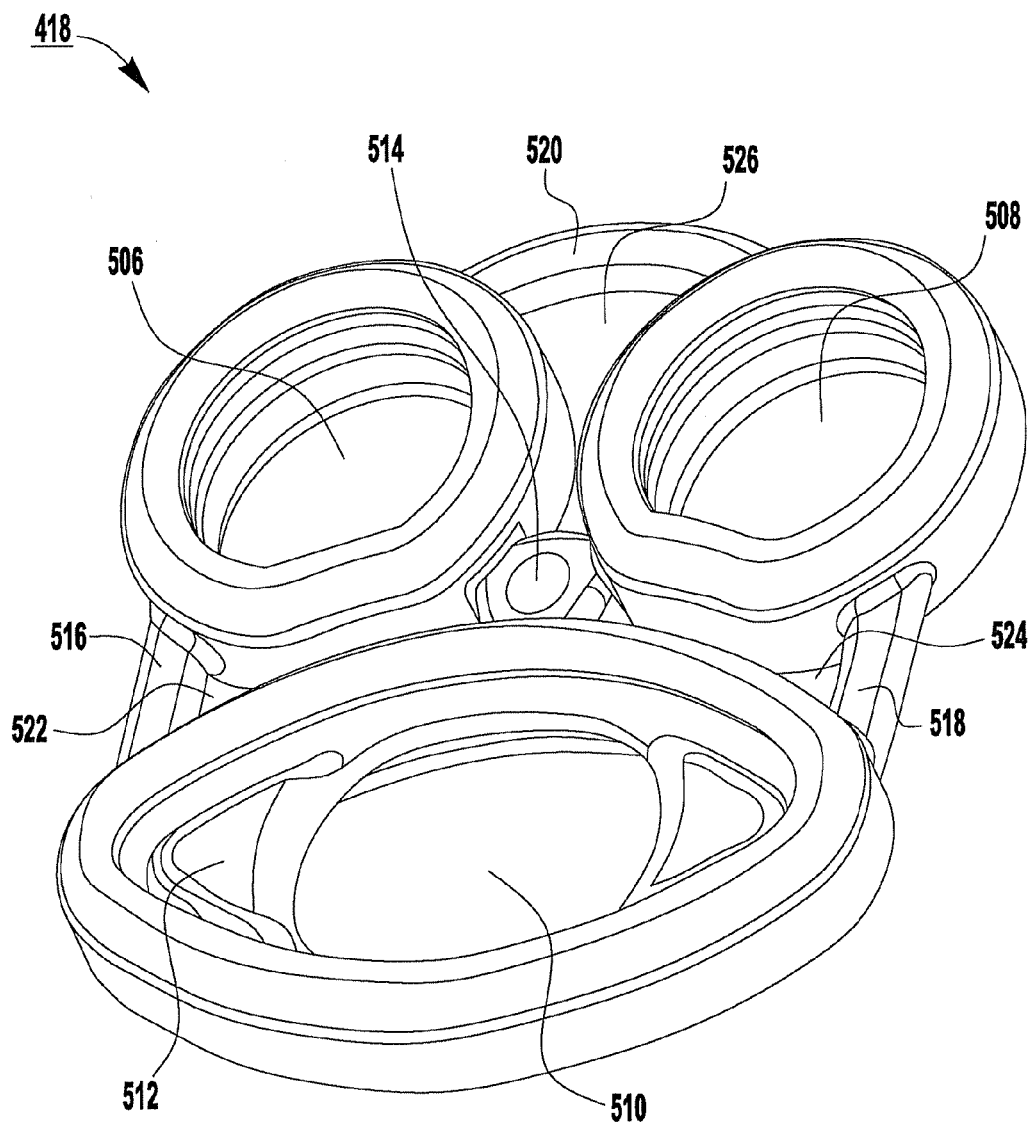
FIGS. 20A-20B show an exemplary base seal used in the exemplary valve cartridge of FIG. 12.
Figure 20B:
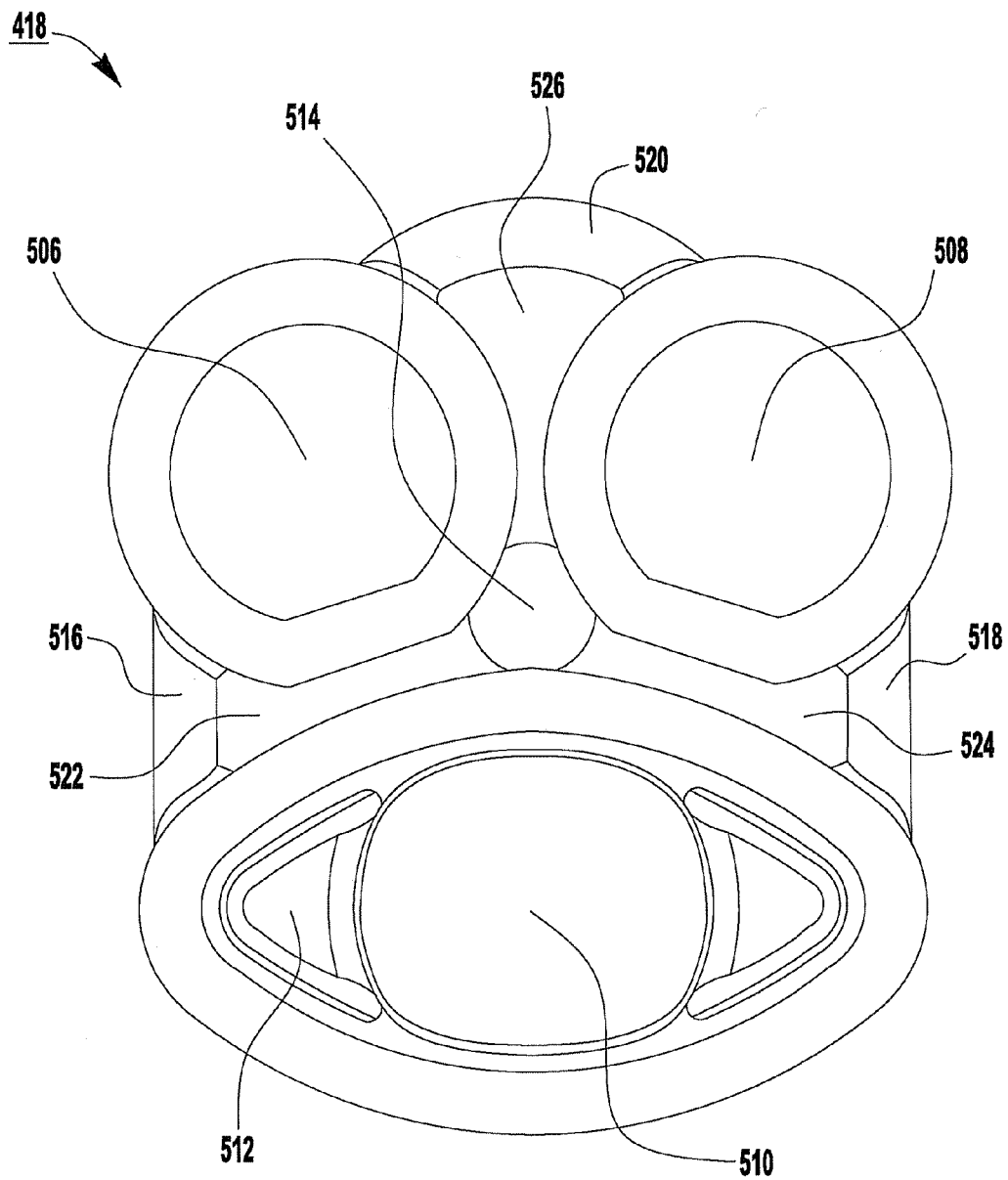
Figure 21A:
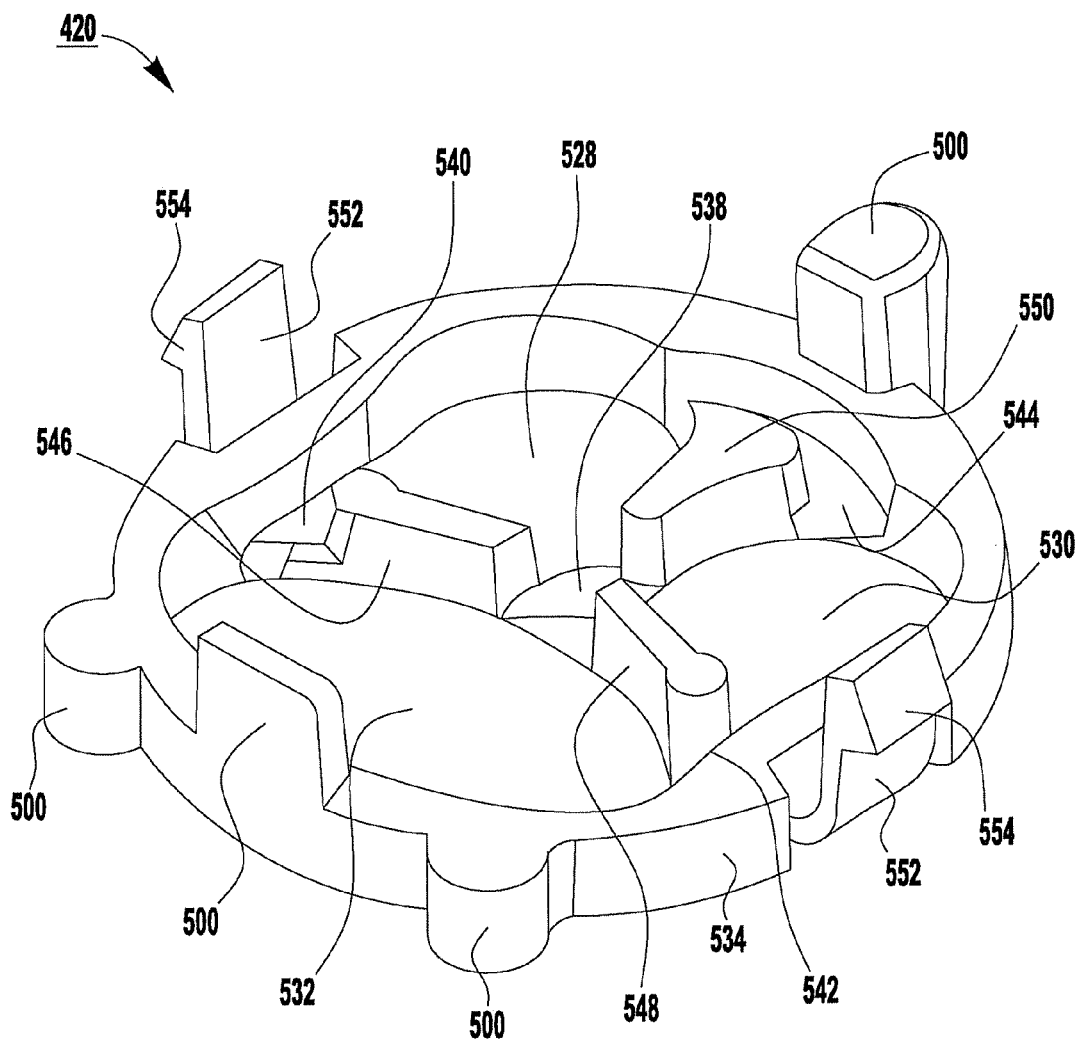
FIGS. 21A-21D show an exemplary lower housing used in the exemplary valve cartridge of FIG. 12.
Figure 21B:
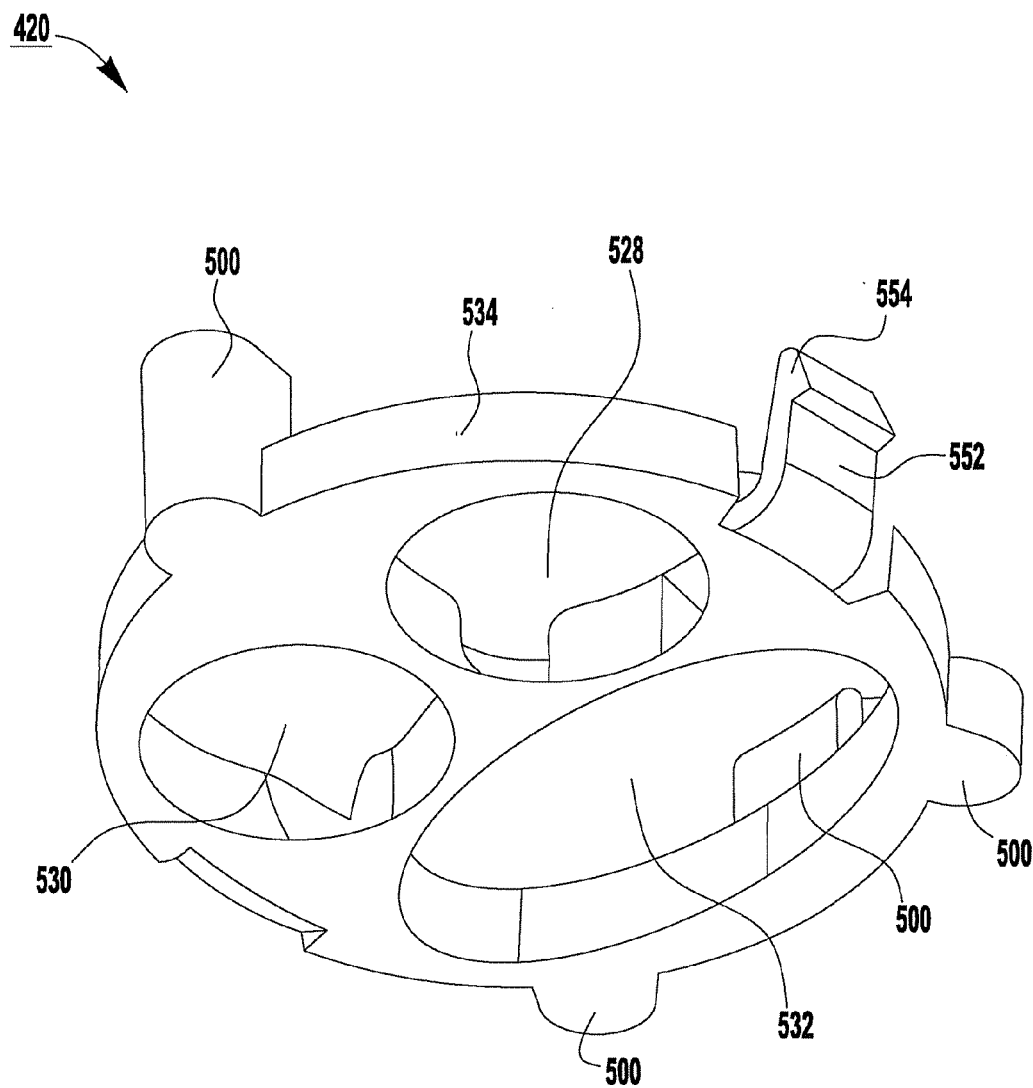
Figure 21C:
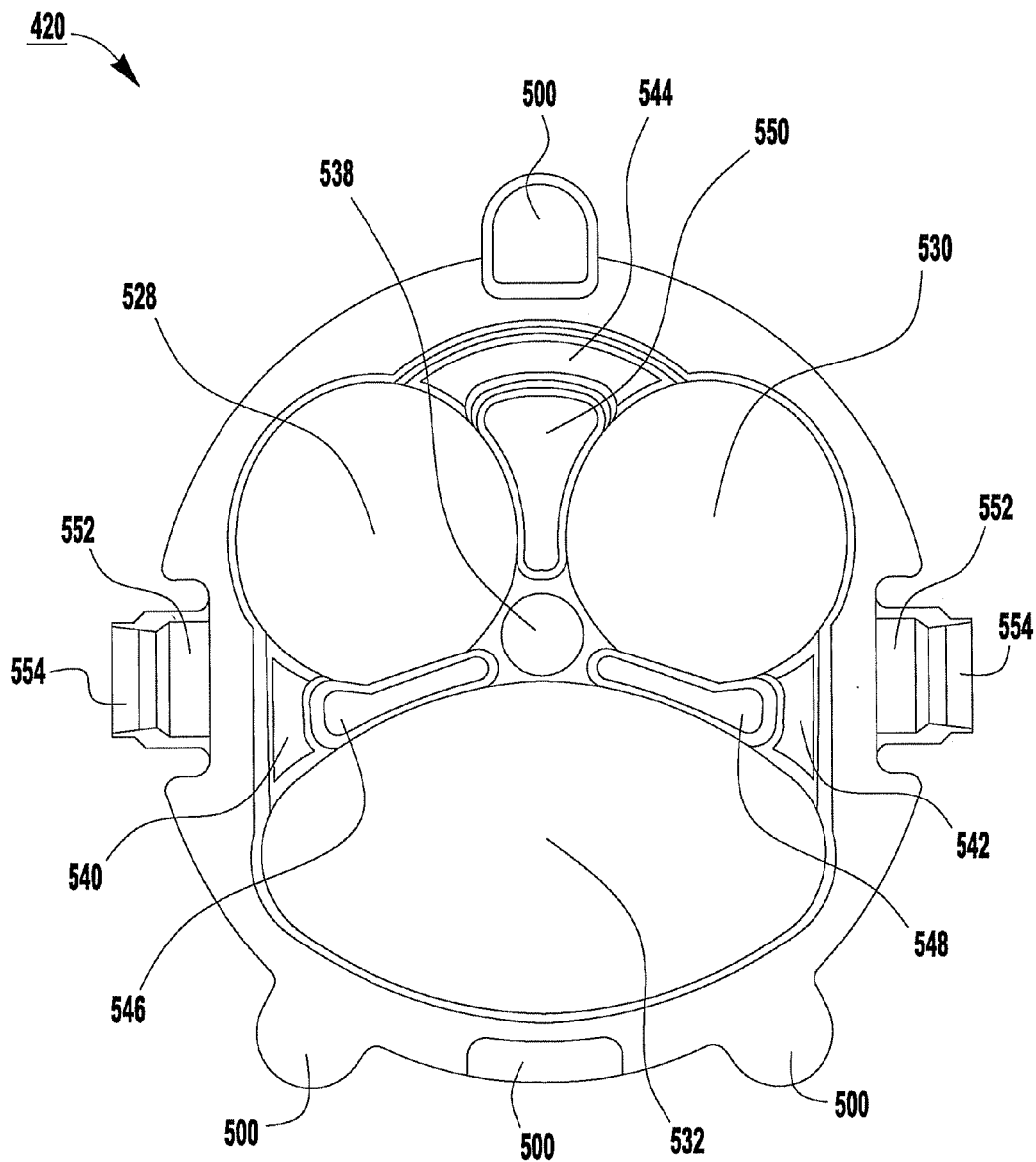
Figure 21D:
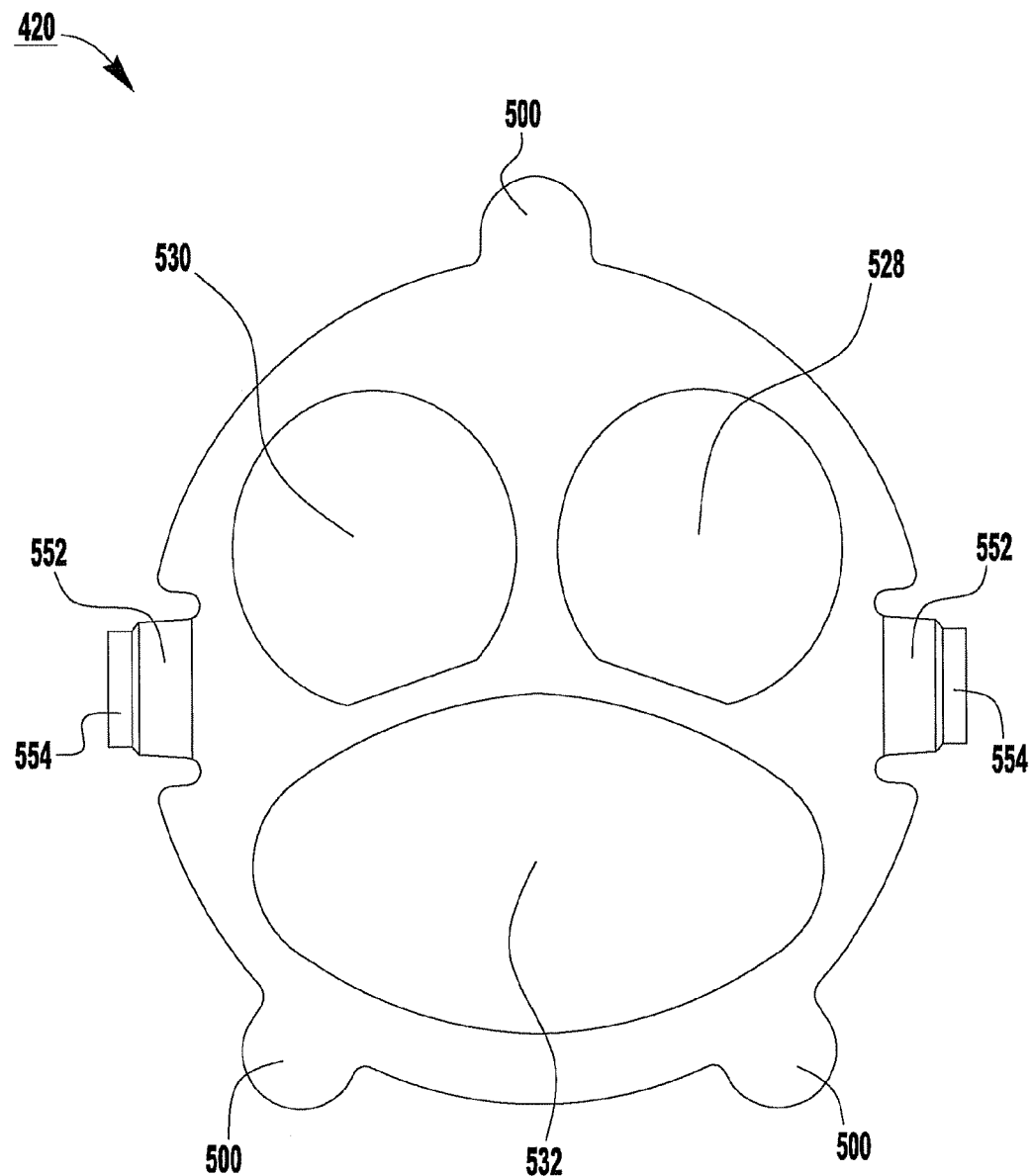

As shown in FIGS. 20A-20B, the base seal 418 is a sealing member formed of an elastic material (e.g., rubber). The base seal 418 forms a watertight seal around the cold water inlet aperture 486, the hot water inlet aperture 488 and the water outlet aperture 490 of the fixed disk 416. Like the fixed disk 416, the base seal 418 has a cold water inlet aperture 506, a hot water inlet aperture 508 and a water outlet aperture 510. In one exemplary embodiment, the water outlet aperture 510 of the base seal 418 is formed by inserting a member 512 (e.g., a plastic insert) having an aperture (i.e., the water outlet aperture 510) therein into an opening in the base seal 418. In another exemplary embodiment, the base seal 418 is formed integrally with the lower housing 420.

The cold water inlet aperture 506, the hot water inlet aperture 508 and the water outlet aperture 510 are all connected by a hub 514 near the center of the base seal 418. Furthermore, the cold water inlet aperture 506 is connected to the water outlet aperture 510 by a first connection 516; the hot water inlet aperture 508 is connected to the water outlet aperture 510 by a second connection 518; and the cold water inlet aperture 506 is connected to the hot water inlet aperture 508 by a third connection 520. The joining of the cold water inlet aperture 506 to the water outlet aperture 510 by the first connection 516 forms a first space 522; the joining of the hot water inlet aperture 508 to the water outlet aperture 510 by the second connection 518 forms a second space 524; and the joining of the cold water inlet aperture 506 to the hot water inlet aperture 508 by the third connection 520 forms a third space 526.

It is important that the apertures 486, 488 and 490 in the fixed disk 416 are aligned with the apertures 506, 508 and 510 in the base seal 418 when the valve cartridge 400 is assembled. Accordingly, as described below, the hub 514, the first connection 516, the second connection 518, the third connection 520, the first space 522, the second space 524 and the third space 526 are used to align the base seal 418 in the lower housing 420 and, thus, with the fixed disk 418.

As shown in FIGS. 21A-21D and 22B-22C, the lower housing 420 interfaces with the upper housing 402 to retain the components (e.g., the bushing 410, the carrier 412, the movable disk 414, the fixed disk 416 and the base seal 418) in the cavity 422 of the upper housing 402 after assembly of the valve cartridge 400. The lower housing 420, for example, can be made of plastic or metal. The lower housing 420 can be formed from the same material as the upper housing 402.

Furthermore, the lower housing 420 functions as a support member to orient and retain the fixed disk 416 and the base seal 418 prior to assembly of the valve cartridge 400. Similar to the fixed disk 416 and the base seal 418, the lower housing 420 includes a cold water inlet aperture 528, a hot water inlet aperture 530 and a water outlet aperture 532 (see FIGS. 21A-21D). As noted above, the lower housing 420 also includes the projections 500. One or more projections 500 can extend above a sidewall 534 of the lower housing 420. In one exemplary embodiment, two projections 500 extend above the sidewall 534. One or more projections 500 can have a height that is substantially the same as a height of the sidewall 534. In one exemplary embodiment, two projections 500 have a height that is substantially the same as the height of the sidewall 534.

One or more projections 500 can fit into openings 536 formed in the upper housing 402 below the keys 436. In one exemplary embodiment, three projections 500 fit into the openings 536. These projections 500 have a shape that is substantially the same as a shape of the keys 436. By fitting into the openings 536 below the keys 436, the projections 500 also function as part of the keys 436, for example, by engaging the complementary-shaped recesses in the valve body.

The size and/or shape of the projections 500 can be varied such that the lower housing 420 will interface with the fixed disk 416 and the upper housing 402 in only one orientation, thereby insuring that the fixed disk 416 will be properly oriented relative to the upper housing 402 and the lower housing 420 when the valve cartridge 400 is assembled. By engaging the notches 496 in the fixed disk 416, the projections 500 also prevent the fixed disk 416 from rotating relative to the lower housing 420 (and, thus, the upper housing 402).

The lower housing 420 includes a first recess 538, a second recess 540, a third recess 542 and a fourth recess 544. The lower housing 420 also includes a first projection 546, a second projection 548 and a third projection 550. The hub 514, the first connection 516, the second connection 518 and the third connection 520, respectively, of the base seal 418 fit into the first recess 538, the second recess 540, the third recess 542 and the fourth recess 544, respectively, of the lower housing 420. Furthermore, the first projection 546, the second projection 548 and the third projection 550, respectively, of the lower housing 420 fit into the first space 522, the second space 524 and the third space 526, respectively, of the base seal 418. Accordingly, the lower housing 420 orients, fixes and retains the base seal 418 in the lower housing 420.

The lower housing 420 also includes a pair of elastic flanges 552 that each have an angled upper portion 554. The notches 496 in the fixed disk 416 allow the elastic flanges 552 to be pressed inward (i.e., toward a central vertical axis of the valve cartridge 400), such that the angled upper portions 552 can enter the cavity 422 in the upper housing 402. When the angled upper portions 552 are aligned with the corresponding openings 556 formed in the upper housing 402, the elastic flanges 548 press outward and the angled upper portions 552 are received in the openings 556. In this manner, the lower housing 420 (including the fixed disk 416 and the base seal 418 interfaced therewith) can be secured to the upper housing 402 (see FIGS. 22B-22C).

It should be noted that although the notches 496 of the fixed disk 416 interface with the projections 500 of the lower housing 420 to prevent the fixed disk 416 from rotating within the lower housing 420 (and, thus, the upper housing 402), the fixed disk 416 is nonetheless allowed to move axially within the lower housing 420 and the upper housing 402. In this manner, compression of the base seal 418 exerts a loading force on the movable disk 414 and the fixed disk 416. Accordingly, the movable disk 414 and the fixed disk 416 are kept in water-tight engagement with one another, after installation of the valve cartridge 400.

The position and the orientation of the movable disk 414 relative to the fixed disk 416 are controlled by the stem portion 428 of the ball-stem 404 projecting out of the upper housing 402 through the upper opening 426. For example, pivoting the stem portion 428 of the ball-stem 404 about a pivot (e.g., the pin 406) changes the position of the movable disk 414 relative to the fixed disk 416, which changes the flow rate of the water. Rotating the stem portion 428 of the ball-stem 404 changes the orientation of the movable disk 414 relative to the fixed disk 416, which changes the temperature of the water.

An operating member (e.g., the operating member 314 shown in FIG. 11) such as a handle, knob or the like can be connected to the stem portion 428 of the ball-stem 404 to facilitate manipulation of the stem portion 428 by a user. Accordingly, after the valve cartridge 400 is installed in the valve body, the user can manipulate the operating member which moves the stem portion 428 of the ball-stem 404 to change the position and/or orientation of the movable disk 414 relative to the fixed disk 416, thereby controlling the flow rate and temperature of the water flowing through the valve cartridge 400 and out a plumbing fixture (e.g., the plumbing fixture 316 shown in FIG. 11).

Pivoting of the stem portion 428 of the ball-stem 404 about the pin 406 can be limited by the stem portion 428 contacting opposing surfaces of the upper opening 426 of the upper housing 402. Thus, the stem portion 428 of the ball-stem 404 contacts a first surface 558 of the upper opening 426 of the upper housing 402 when the valve cartridge 400 is in a fully closed position corresponding to a flow rate of zero (see FIG. 22C). The stem portion 428 of the ball-stem 404 contacts a second surface 560 of the upper opening 426 of the upper housing 402 when the valve cartridge 400 is in a fully open position corresponding to a maximum flow rate.

Rotation of the stem portion 428 of the ball-stem 404 can be limited by the distal ends of the pin 406 contacting end portions 562 of the slots 438 (see FIG. 22A). Accordingly, the length of the slots 438, which function as temperature limit stops, define the range of temperatures for which the valve cartridge 400 can deliver the water.

During assembly of the valve cartridge 400, the spring 408 is connected to the second inner surface 446 of the upper housing 402. In this manner, the spring 408 secures the ball-stem 404 in the upper housing 402 independently of the bushing 410, the carrier 412, the movable disk 414, the fixed disk 416 and the base seal 418 being inserted in the upper housing 402. The spring 408 exerts an upward force (i.e., a preloading force) on the ball-stem 404. As noted above, when the assembled valve cartridge 400 is installed in the valve body by tightening the retention nut down on the upper housing 402 and/or the installation ledge 434 of the upper housing 402, the base seal 418 is compressed. This compression of the base seal 418 results in a loading force being transferred up through the components of the valve cartridge 400. However, because the spring 408 exerts the upward (preloading) force on the ball-stem 404, which is distinct from the loading force, and the projection 440 of the ball-stem 404 does not bottom out in the coupling recess 472, the ball-stem 404 (as the actuating mechanism) is decoupled from the components of the valve cartridge 400 disposed below the spring 408 (e.g., the bushing 410, the carrier 412, the movable disk 414, the fixed disk 416 and the base seal 418). Accordingly, the spring 408 isolates the ball-stem 404 from the loading force attributable to the compression of the base seal 418, such that the ball-stem 404 is influenced primarily by the preloading force of the spring 408. As a result, the user realizes a consistent, precise and smooth feel during operation of the valve cartridge 400. Furthermore, the characteristics (e.g., the resiliency) of the spring 408 can be selected to achieve the desired feel.

Because the spring 408 uniformly surrounds and pushes on a lower portion of the ball portion 430 of the ball-stem 404, the frictional force between an upper portion of the ball portion 430 of the ball-stem 404 and the first inner surface 432 of the upper housing 402 is the same in any direction of movement of the ball-stem 404. Accordingly, the frictional force associated with the actuating mechanism (i.e., the ball-stem 404) is the same for controlling the flow rate and the temperature of the water flowing through the valve cartridge 400, such that the user realizes a consistent, precise and smooth feel during operation of the valve cartridge 400.

Furthermore, as noted above, the spring 408 exerts the preloading force on the ball-stem 404 which decouples the ball-stem 404 from the underlying components of the valve cartridge 400, including the movable disk 414 and the fixed disk 416. As a result, the frictional forces in the valve cartridge 400 below the spring 408 (e.g., the frictional force between the movable disk 414 and the fixed disk 416) are isolated from the frictional forces in the valve cartridge 400 above the spring 408 (e.g., the frictional force between the ball-stem 404 and the first inner surface 432). Accordingly, the frictional force associated with operating the ball-stem 404 is not adversely affected by other frictional forces present in the valve cartridge 400, such that the user realizes a consistent, precise and smooth feel during operation of the valve cartridge 400.

In addition to providing the user with a consistent feel for all movements of the ball-stem 404, the spring 408 insures the user is provided with a consistent feel over time. The dynamic bearing surfaces of the valve cartridge 400, such as the ball portion 430 of the ball-stem 404 and the first inner surface 432 of the upper housing 402, are subject to wear over time from repeated use. The individual elastic flanges 450 of the spring 408 flex to accommodate for changes in the ball portion 430 of the ball-stem 404 and/or the first inner surface 432 of the upper housing 402, such that the user experiences the same feel during operation of the valve cartridge 400 regardless of the wear on the dynamic bearing surfaces.

The above description of specific embodiments has been given by way of example. From the disclosure given, those skilled in the art will not only understand the general inventive concept and its attendant advantages, but will also find apparent various changes and modifications to the structures and methods disclosed. It is sought, therefore, to cover all such changes and modifications as fall within the spirit and scope of the general inventive concept, as defined herein, and equivalents thereof.

The invention claimed is:

1. A valve for controlling a flow rate of a fluid, the valve comprising:

an actuating mechanism including a ball portion;
a fluid control disk; and
an annular spring having a central opening and a plurality of elastic flanges extending around a periphery of the central opening,
wherein movement of the actuating mechanism is operable to move the fluid control disk to vary the flow rate of the fluid,
wherein the annular spring is disposed between the actuating mechanism and the fluid control disk,
wherein the elastic flanges of the annular spring extend below an upper surface of the annular spring, away from the ball portion of the actuating mechanism and toward the fluid control disk,
wherein at least a portion of the ball portion extends through the central opening of the annular spring,
wherein the annular spring maintains contact with the actuating mechanism during movement of the actuating mechanism, and
wherein the elastic flanges of the annular spring deform to exert a substantially uniform force on the ball portion of the actuating mechanism away from the fluid control disk.

2. The valve of claim 1, wherein the actuating mechanism, the fluid control disk and the annular spring are disposed in a housing for installing in a valve body.

3. The valve of claim 2, wherein the annular spring is connected to an inner surface of the housing.

4. A valve for controlling a flow rate and a mixture ratio of cold water and hot water, the valve comprising:
an actuating mechanism including a ball portion;
a movable control disk;
a fixed control disk; and
an annular spring having a central opening and a plurality of elastic flanges extending around a periphery of the central opening,
wherein movement of the actuating mechanism about a first axis is operable to move the movable control disk relative to the fixed control disk to vary the flow rate of at least one of the cold water and the hot water,
wherein movement of the actuating mechanism about a second axis is operable to move the movable control disk relative to the fixed control disk to vary the mixture ratio of the cold water and the hot water,
wherein the annular spring is disposed between the actuating mechanism and at least one of the movable control disk and the fixed control disk,
wherein the elastic flanges of the annular spring extend below an upper surface of the annular spring, away from the ball portion of the actuating mechanism and toward the movable control disk and the fixed control disk,
wherein at least a portion of the ball portion extends through the central opening of the annular spring,
wherein the annular spring maintains contact with the actuating mechanism during movement of the actuating mechanism, and
wherein the elastic flanges of the annular spring deform to exert a substantially uniform force on the ball portion of the actuating mechanism away from the movable control disk and the fixed control disk.

5. The valve of claim 4, wherein the first axis is substantially perpendicular to the second axis.

6. The valve of claim 4, wherein a housing defines a cavity that receives the actuating mechanism, the movable control disk, the fixed control disk and the annular spring,
wherein the housing has an inner surface,
wherein a portion of the inner surface of the housing has a shape that at least partially conforms to a shape of the ball portion,
wherein the annular spring exerts a force on the actuating mechanism away from the movable control disk and the fixed disk, and
wherein the force is operable to urge the ball portion of the actuating mechanism against that portion of the inner surface with the shape that conforms to the shape of the ball portion.

7. The valve of claim 6, wherein a first frictional force encountered by movement of the actuating mechanism about the first axis is substantially the same as a second frictional force encountered by movement of the actuating mechanism about the second axis.

8. The valve of claim 6, wherein the annular spring is connected to the inner surface of the housing.

9. The valve of claim 4, wherein the ball portion of the actuating mechanism includes a projection,
wherein the projection extends through the central opening of the annular spring,
wherein the projection interfaces with a recess formed in the movable control disk and is operable to contact at least one side of the recess to translate movement of the actuating mechanism into movement of the movable control disk, and
wherein the projection does not contact a bottom surface of the recess during movement of the actuating mechanism.

10. The valve of claim 4, further comprising a carrier,
wherein the carrier interfaces with the movable control disk,
wherein the actuating mechanism includes a projection,
wherein the projection extends through the central opening of the annular spring,
wherein the projection interfaces with a recess formed in the carrier and is operable to contact at least one side of the recess to translate movement of the actuating mechanism into movement of the carrier, and
wherein movement of the carrier results in movement of the movable control disk, and
wherein the projection does not contact a bottom surface of the recess during movement of the actuating mechanism.

11. A valve cartridge for controlling a flow rate of a fluid, the valve cartridge comprising:
an actuating mechanism including a ball portion;
a fluid control disk;
an annular spring having a central opening and a plurality of elastic flanges extending around a periphery of the central opening; and
a housing for installing in a valve body,
wherein the actuating mechanism, the fluid control disk and the annular spring are disposed in the housing, with the annular spring disposed between the actuating mechanism and the fluid control disk,
wherein the annular spring is connected to an inner surface of the housing,
wherein movement of the actuating mechanism is operable to move the fluid control disk to vary the flow rate of the fluid,
wherein the annular spring maintains contact with the actuating mechanism during movement of the actuating mechanism, and wherein the elastic flanges of the annular spring deform to exert a substantially uniform force on the ball portion of the actuating mechanism away from the fluid control disk.

12. The valve cartridge of claim 11, wherein the annular spring is welded to the inner surface of the housing.

13. The valve cartridge of claim 11, wherein the annular spring is threaded to the inner surface of the housing.

14. The valve cartridge of claim 11, wherein a plurality of notches are formed on an outer periphery of the annular spring,
   wherein a plurality of tabs are formed on an inner surface of the housing, and
   wherein the notches interface with the tabs to connect the annular spring to the inner surface of the housing.

* * * * *